United States Patent [19]

Solimeno et al.

[11] Patent Number: 4,517,656
[45] Date of Patent: May 14, 1985

[54] PROGRAMMABLE GAME WITH VIRTUAL CPU'S SHARING ALU AND MEMORY FOR SIMULTANEOUS EXECUTION OF INDEPENDENT GAME INPUTS

[75] Inventors: Duane Solimeno, Newington, Conn.; Peter L. Koeppen, Houston, Tex.; Gerald Rogers, Sugarland, Tex.; Sammy K. Brown, Midland, Tex.

[73] Assignee: Texas Instruments Incorporated, Dallas, Tex.

[21] Appl. No.: 262,278

[22] Filed: May 11, 1981

[51] Int. Cl.³ .......................................... G06F 15/44
[52] U.S. Cl. ............................ 364/900; 273/85 G; 273/DIG. 28; 364/410
[58] Field of Search ... 364/200 MS File, 900 MS File, 364/410, 412, 411; 273/138 A, DIG. 28, DIG. 85 G

[56] References Cited

U.S. PATENT DOCUMENTS

| | | | |
|---|---|---|---|
| 3,720,920 | 3/1973 | Watson et al. | 364/200 |
| 3,943,493 | 3/1976 | Shelton | 364/200 |
| 4,026,555 | 5/1977 | Kirschner et al. | 273/85 R |
| 4,051,605 | 10/1977 | Toal et al. | 434/201 |
| 4,058,316 | 11/1977 | Miller | 273/121 A |
| 4,123,795 | 10/1978 | Dean, Jr. et al. | 364/200 |
| 4,247,925 | 1/1981 | Meshi et al. | 364/900 |
| 4,301,503 | 11/1981 | Frederiksen | 364/200 |
| 4,339,798 | 7/1982 | Hedges et al. | 364/412 |
| 4,340,370 | 7/1982 | Marshall et al. | 434/22 |
| 4,348,744 | 9/1982 | White | 364/900 |
| 4,363,315 | 12/1982 | Jamnik | 364/900 |
| 4,363,485 | 12/1982 | Edwall | 273/121 A |
| 4,373,719 | 2/1983 | Nelson et al. | 273/1 E |
| 4,430,711 | 2/1984 | Anderson et al. | 364/200 |

OTHER PUBLICATIONS

U.S. Dept. of Commerce Patent & Trademark Office, *Coding Sheet: General Purpose Programmable Computer Systems*, Form PTO-1261 (Rev. 8/81).

J. L. Rosenfeld et al., Micromultiprocessing: An Approach to Multiprocessing at the Level of Very Small Tasks; IEEE Transactions on Computers, (vol. C-22, No. 2), Feb. 1973; pp. 149-153.

W. J. Kamisky et al., Developing a Multiple-Instruction-Stream Single-Chip Processor; Computer, (vol. 12), Dec. 1979, pp. 66-76.

Primary Examiner—James D. Thomas
Assistant Examiner—A. E. Williams, Jr.
Attorney, Agent, or Firm—Thomas E. Tyson; Leo N. Heiting; Melvin Sharp

[57] ABSTRACT

A two player game apparatus includes the inputs for the first and second player, together with display for each player with a common display for providing the game status connected to a single electronic digital processor. The processor system further includes two central processing units where one central processing unit performs the game algorithm for one player and the second central processing unit performs the game algorithm for the second player. Each individual's central processing unit provides individual player status for its player input. Both central processing units provide data for the common display.

4 Claims, 59 Drawing Figures

✶ UNKNOWN

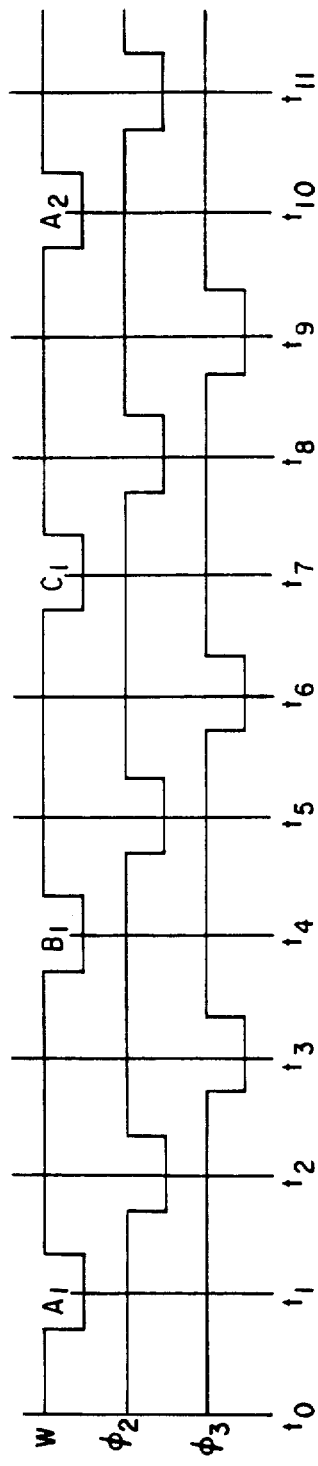

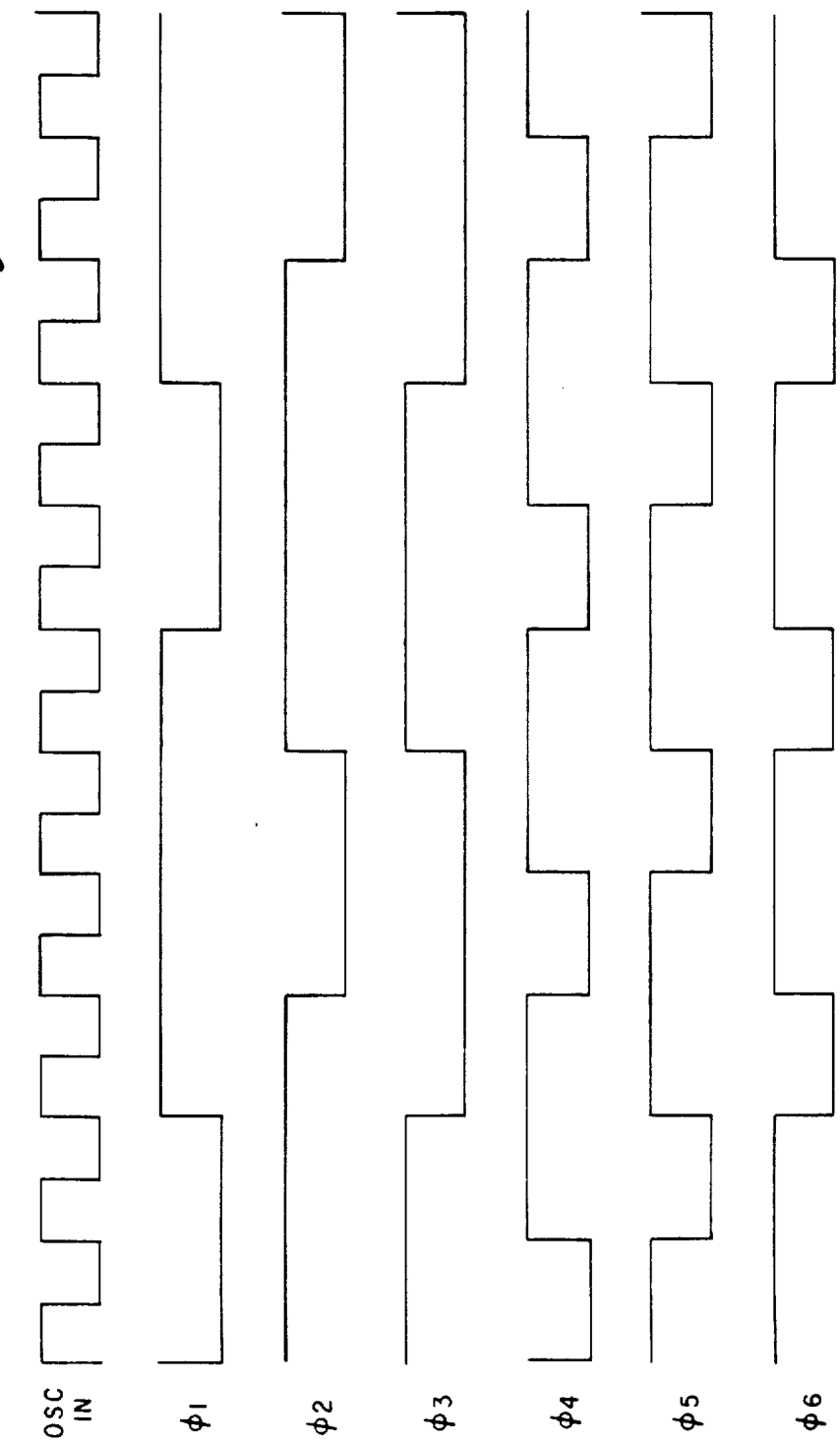

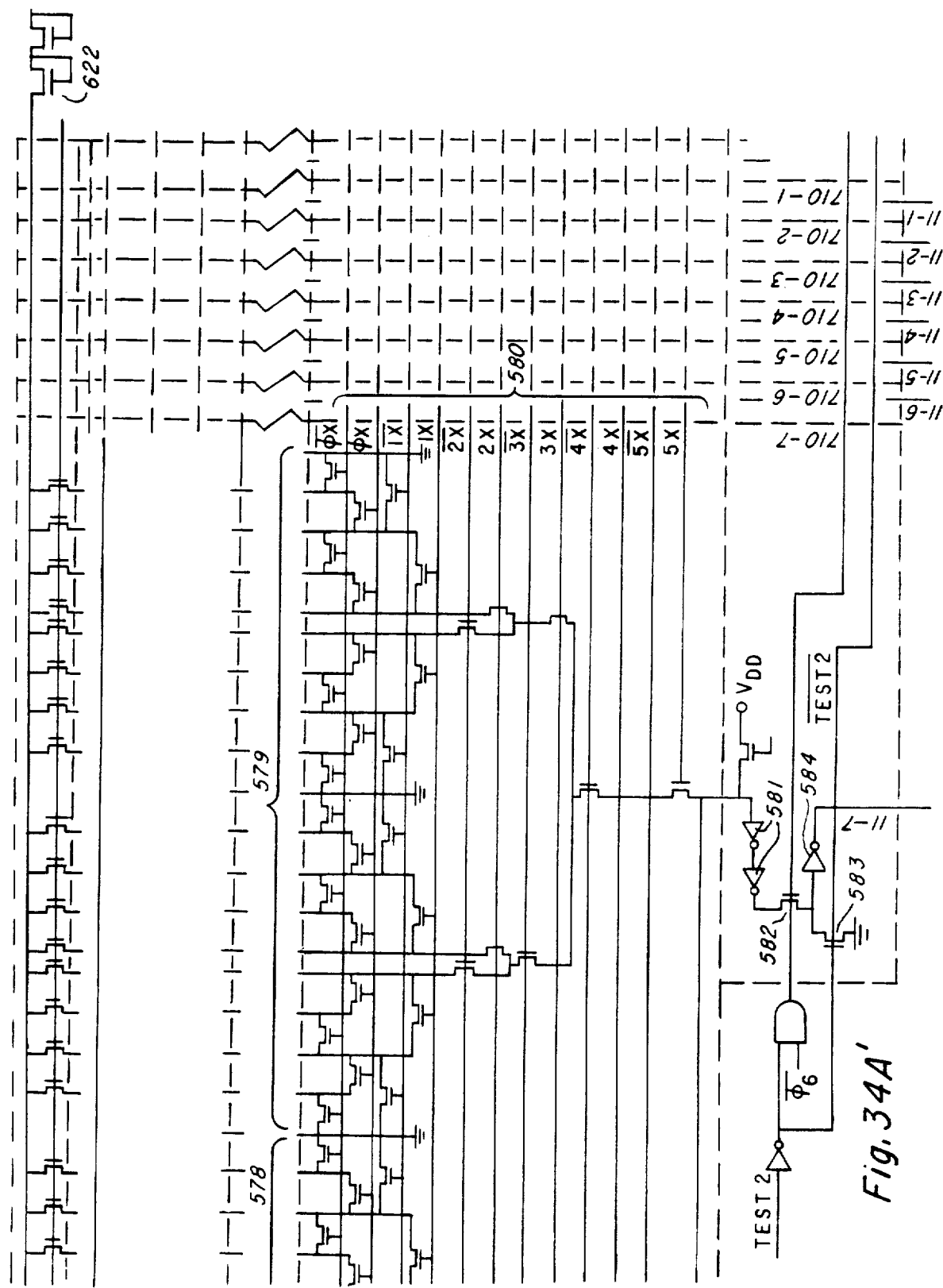

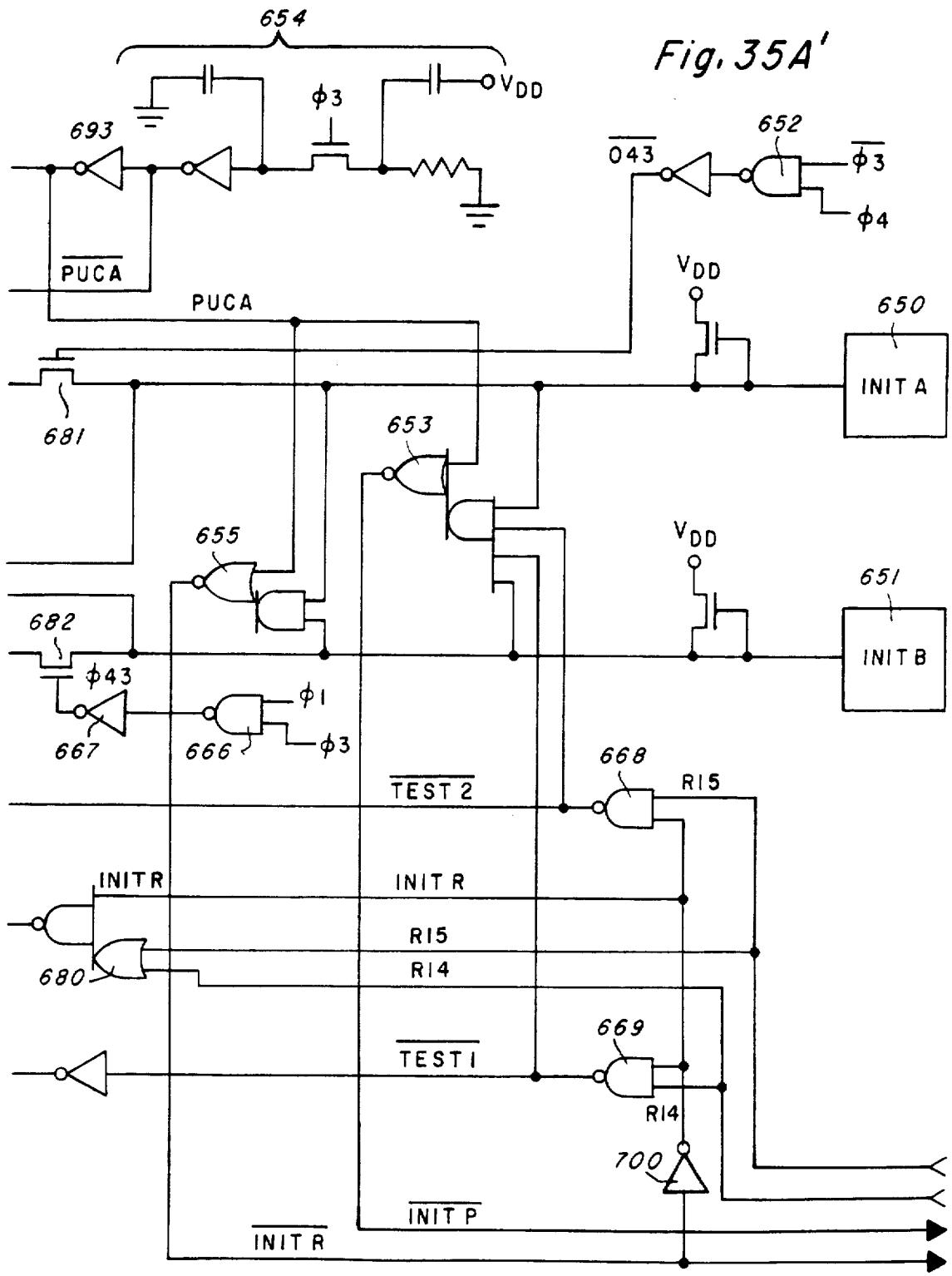

PROGRAMMABLE GAME WITH VIRTUAL CPU'S SHARING ALU AND MEMORY FOR SIMULTANEOUS EXECUTION OF INDEPENDENT GAME INPUTS

CROSS REFERENCE TO RELATED PATENT APPLICATIONS

This application is related to the following applications: Ser. No. 216,237 (now U.S. Pat. No. 4,390,970), Ser. No. 216,717, Ser. No. 216,584, Ser. No. 216,113 and Ser. No. 217,480 (now U.S. Pat. No. 4,446,514).

BACKGROUND

This invention relates to electronic devices for executing game algorithms. More specifically, the invention relates to a two player game apparatus.

An electronic game device has three basic requirements. The first requirement is that the electronic device receives an input from a person who is playing the game. If two or more people are playing the game, the electronic device must have capability to receive the inputs from these additional game players. The second requirement is that the electronic device must provide output information to inform the player or players of the player status and of the game status. The third requirement is that the electronic device must actually execute the game algorithm.

Electronic game devices that use one microprocessor may encounter disadvantages. A single microprocessor device would not allow both players to play the game simultaneously. Rather using a single microprocessor device, the microprocessor must scan one player's input for input data and at a later time, scan the second player's input for the input data. Thus the second player cannot input information while the microprocessor is reading input data from the first player. In games involving a player's reaction time, this disadvantage would prevent the second player from responding quickly to the first player's actions. In addition, if the game device includes individual player status displays and an overall game status display. A single microprocessor would not be allowed to simultaneously update player displays and game displays at the same time. Furthermore, the single processor would not be able to read the input data and provide output data at the same time that the microprocessor is executing the game algorithm. Therefore, the simultaneous game playing capabilities of a single processor gaming device is limited.

If two or more microprocessors are used, some of the above-mentioned problems would be solved but other difficulties may be encountered. One problem encountered when instructing a game playing device wth two or more microprocessors is interfacing the two microprocessors. This type of problem is the same problem in interfacing any type of processor network and requires the device designer to determine how data is transferred between microprocessors, partitioning of the input/output functions between microprocessors and determining which microprocessor performs the supervision function over the game device. In effect, the additional microprocessors require not only additional software for the extra microprocessor, but also the additional software for the interface of the microprocessors.

The invention disclosed herein avoids many of the above-mentioned problems by disclosing a multiprocessor system that can share the same semiconductor chip.

SUMMARY OF THE INVENTION

In accordance with the present invention, a two player game apparatus is provided which includes game display, player inputs connected to a digital processor system further including two independent and separably operable central processing units sharing a single memory, an arithmetic and logic unit and control circuitry for controlling the operation of the two processing units. Using the two independent central processing units with shared memory, the game algorithm may be executed in such a manner that both players may provide inputs to the game simultaneously.

One embodiment of the invention includes a two player game apparatus which includes first and second player inputs, first and second player displays, and a game display all connected to a single electronic digital processor system further including two independent and simultaneously operable central processing units. The electronic digital processor system further includes a single shared memory for the storage of game data and the storage of the game program, an arithmetic and logic units for use by both central processing units and control circuitry for the operation and control of the two central processing units. The first central processing unit includes a connection to a player input and a connection to that player's display. Likewise, the second central processing unit includes a connection to its player's input and its player's display. In addition, both central processing units can display data on a common game status display. The digital processor system further includes data paths for the transfer of data in the central processing units and between the inputs and display outputs for the central processing units. This dual processor arrangement allows for the simultaneous and independent execution of game algorithms for a simultaneous two player game operation.

BRIEF DESCRIPTION OF THE DRAWINGS

The novel features believed characteristic of the invention are set forth in the claims. The invention itself, however, as well as other features and advantages thereof will be best understood by reference to detailed descriptions will follow when read in conjunction with the accompanying drawings, wherein:

FIG. 2b is a timing diagram for the register in FIG. 2a;

FIG. 2c is a table diagram showing the contents of the devices in FIG. 2a in accordance with the timing diagram in FIG. 2b;

FIG. 2d is a schematic diagram of an additional embodiment of the register in FIG. 2a;

FIG. 2e is a timing for the register in FIG. 2d;

FIG. 2f is a table diagram depicting the contents of the register in FIG. 2d in accordance with the timing diagram in FIG. 2e;

FIG. 2g is an additional embodiment of the register in FIG. 2a;

FIG. 2h is a schematic diagram of a combination of registers as in FIG. 2a;

FIG. 3d is a timing diagram in voltage versus time for the clocks in the system herein described;

DETAILED DESCRIPTION OF SPECIFIC EMBODIMENT

The following two player game apparatus description includes a discussion of the two player inputs with three common game display outputs that are connected to an electronic digital processor system including two central processor units. Each central processing unit is dedicated to the execution of an algorithm for its individual player. The following detailed description shall first discuss the operation and configuration of the electronic digital processor system. A description of the player inputs and game display outputs will then be described including two preferred embodiments.

Figure 1:
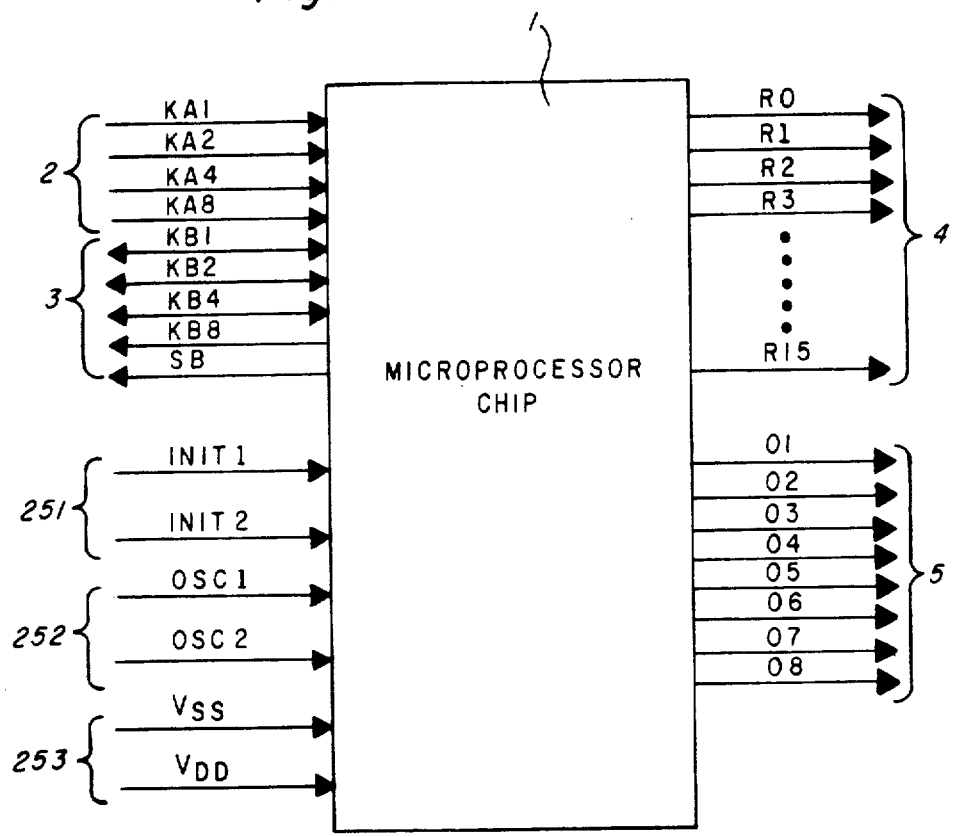
FIG. 1 is a block diagram of a microprocessor chip detailing the input and output.

FIG. 1 illustrates a dual microprocessor single semiconductor integrated chip arrangement. Microprocessor chip 1 contains the dual microprocessor system. The dual microprocessor will be referred as as CPU A and CPU B. Signal group 2 consist of four input lines connected to the CPU A. KA1 is the least significant bit and KA8 is the most significant bit. Signal group 3 consist of four lines KB1 through KB8 which are connected to CPU B and act as either inputs or outputs. KB1 is the least significant bit. Also included is SB which is an output signal from CPU B. Signal group 4 are the 16 register discrete outputs R0 through R15. These discrete outputs may be set or reset by either CPU A or CPU B. Signal group 5 is eight lines used to output encoded 8 bit data from the output latch for CPU A. Signal group 251 contains the INIT 1 and INIT 2 inputs which are initialization inputs for both CPU's. These inputs will be used in conjunction with the power up sequence to increase the power up time as required by any power supply constraints. Signal group 252 contain the oscillator 1 and oscillator 2 inputs for the chip clocking circuitry. Signal group 253 contains the Vss and Vdd. Vdd is the supply voltage which is normally set at 9 volts. Vss is the reference voltage for the chip.

Figure 2A:
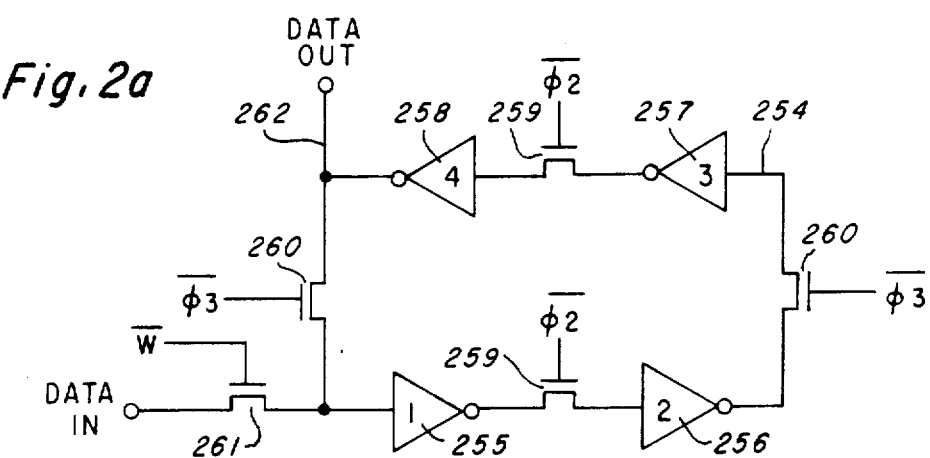
FIG. 2a is a schematic drawing of a register.
Figure 2B:
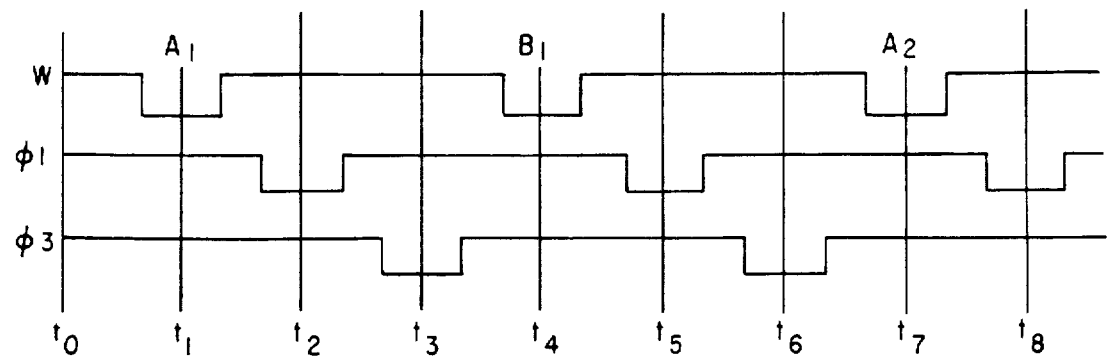
Figures 2C, 2D:
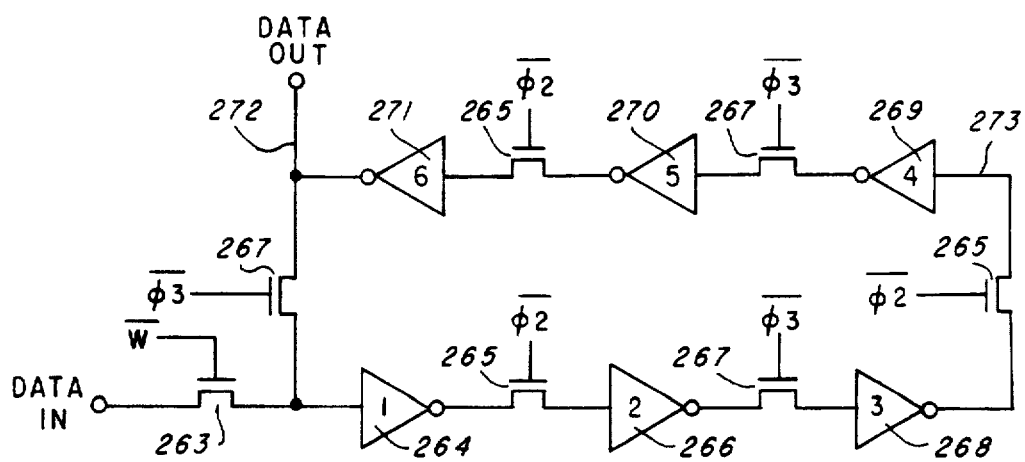

FIG. 2 illustrates the circuit arrangement that allows a register to contain bit information for both CPU A and CPU B. FIG. 2a is a basic design of this circuit. FIG. 2b illustrates the timing applied the circuit in FIG. 2a. FIG. 2c illustrates the contents of the different storage elements in FIG. 2a according to the timing diagram in FIG. 2b. The circuit in FIG. 2a contains four MOS inverters, 255, 256, 257, and 258. For the purpose of illustrating the contents during execution, these inverters are numbered 1, 2, 3, 4, respectively. The circuit in FIG. 2a also contains two sets of devices numbered 259 and 260. Devices 259 are triggered by $\overline{\phi 2}$ such that when $\overline{\phi 2}$ is low, the data is allowed to flow in a counterclockwise direction, i.e., from inverter 1 to inverter 2 and from inverter 3 to inverter 4. Likewise, devices 260 are triggered by $\overline{\phi 3}$ such that when $\phi 3$ is low data from inverter 4 is transferred to inverter 1 and data from inverter 2 is transferred into inverter 3. This circuit also contains device 261 which is triggered by "W". When "W" is low, the device is conductive such that data from the Data In terminal is input into the inverter 1. Referring now to FIG. 2b when at T0, $\overline{W}$ and $\overline{\phi 2}$, and $\overline{\phi 3}$ are high, in FIG. 2c we see that the contents of the four inverters in the circuit in FIG. 2a are unknown. At T1 the input A1 is placed at the Data In terminal and when W falls is loaded into inverter 255 as illustrated in FIG. 2c labeled T1. At T2 $\overline{\phi 2}$ falls allowing the A1 input data which in inverter 255 is stored as $\overline{A1}$ to be passed to inverter 256 and is stored as A1. At T3, $\overline{O3}$ falls and allows the contents of inverter 256 to be passed to inverter 257. Therefore, the A1 in 256 is now an $\overline{A1}$ in 257. At T4 a new input, B1, is present at the Data In terminal and is passed to inverter 255 which is stored as $\overline{B1}$. When $\overline{\phi 2}$ falls again at T5, the $\overline{B1}$ in inverter 255 is passed to inverter 256 as B1 and the contents of inverter 257 which is $\overline{A1}$ is passed to inverter 258. It should be noted now at the end of T5 or the rising of $\overline{\phi 2}$ that the lower two inverters, 255 and 256, contain bit inputs for CPU B and the upper inverters, 257 and 258, contain inputs for CPU A. At T6 $\overline{\phi 3}$ falls and the contents of the inverter 258 is passed to inverter 255 and complemented and the contents of 256 is passed to inverter 257 and complemented. At T7 a new input to CPU A register, A2 is present at the Data In terminal and is loaded into the inverter 255. At T8 the contents of inverter 255 or $\overline{A2}$ is passed to inverter 256 where it is complemented as A2. If no data was input at T7, the data in the upper two inverters would be allowed to rotate into the data in the lower two inverters and likewise for the data in the lower two inverters at T7. Therefore, this loop illustrated in FIG. 2a allows for a circular storage of data for both CPU A and CPU B simultaneously. For the circuit shown in FIG. 2a, data can be output on line 262 on the fall of $\overline{\phi 2}$.

Another embodiment of this circuit arrangement in FIG. 2a is illustrated in FIG. 2d, together with the timing diagram FIG. 2e and contents table FIG. 2f. The circuit 273 contained in FIG. 2d consist of data input through a device 263 triggered by $\overline{W}$, six MOS inverters, numbered 264, 266, 268, 269, 270 and 271 and three devices, number 265, and three devices, number 267, together with the data outline 272. Circuit 273 allows the storage of bits for three CPUs, CPU A, CPU B and CPU C. The actual data stored will rotate through the six inverters shown and in a similar fashion to the circuit in FIG. 2a. Referring now to the timing diagram, FIG. 2e and the contents table FIG. 2f, at T0 the contents of the six inverters is unknown. Then at T1, A1 is placed on the Data In terminal and allowed to be loaded into inverter 264 at the fall of W. Therefore, inverter 264 contains $\overline{A1}$. AT T2, $\overline{\phi 2}$ falls and allows the transfer of the contents of inverter 264 to inverter 266. Therefore, inverter 266 now contains A1. At T3, $\overline{\phi 3}$ falls and allows the transfer of contents of inverter 266 to inverter 268. Therefore, the A1 in inverter 266 is complemented and stored in as $\overline{A1}$ in inverter 268. At T4, B1 is available at the Data In terminal and is loaded into the inverter 264 at the fall of $\overline{W}$. Inverter 264 now stores $\overline{B1}$. At T5, $\overline{\phi 2}$ falls and the inverter and information in 264 is transferred to inverter 266, i.e., $\overline{B1}$ and 264 becomes B1 and 266. The contents of inverter 268 $\overline{A1}$ is loaded into inverter 269 as A1. At T6, $\overline{\phi 3}$ falls again allowing the rotation of the data as shown. At T7, C1 is now loaded as $\overline{C1}$ into inverter 264 as previously discussed. AT T8 $\overline{\phi 2}$ falls allowing the rotation of the data as shown. It should be noted now at the rise of $\overline{\phi 2}$ that the contents of circuit 273 is the three bits for CPU A CPU B or CPU C. A1 is available for output on line 272 at the data out terminal. At T9 data is circulated as shown. At T10, A2 is input into the Data In terminal and loaded into inverter 274 at the fall of W. The contents of 264 is now $\overline{A2}$. At T11, the contents of 264 is loaded into 266 so now that 264 contains $\overline{A2}$, 266 contains A2. The contents of 268, $\overline{C1}$ is loaded into inverter 269 as C1. The contents of inverter 270, $\overline{B1}$, is loaded into inverter 271 as B1. It should be apparent to one skilled in the art that additional inverter pairs and clocking device pairs can be added to this circuit as shown to increase the storage capability for additional CPUs.

A further embodiment of this circuit in FIG. 2a is illustrated in FIG. 2g. Circuit 274 contains basically the same elements as those contained in the circuit illustrated in FIG. 2a. However, additional input and output terminals are provided. For inverter 276 the input is terminal 275 and output is 277. This arrangement is similar for the other inverters, 280, 284 and 287, as shown. The input and output of data from circuit 274 can be accomplished with devices similar to device 261 in FIG. 2a which are not shown in FIG. 2g. The architecture in FIG. 2g allows the parallel architecture illustrated in FIG. 2h. This type of arrangement allows the parallel storage of data for two CPUs in a register, that is, for each bit stored in a register for the two CPUs, a loop must be provided. It should be apparent to those skilled in the art that different arrangements are possible for a circuit shown in FIG. 2h, i.e., the interconnection between the loops can be varied to allow the loading of one inverter into any of the inverters in the next adjacent loop.

THE DIGITAL PROCESSOR SYSTEM

Figure 3A:
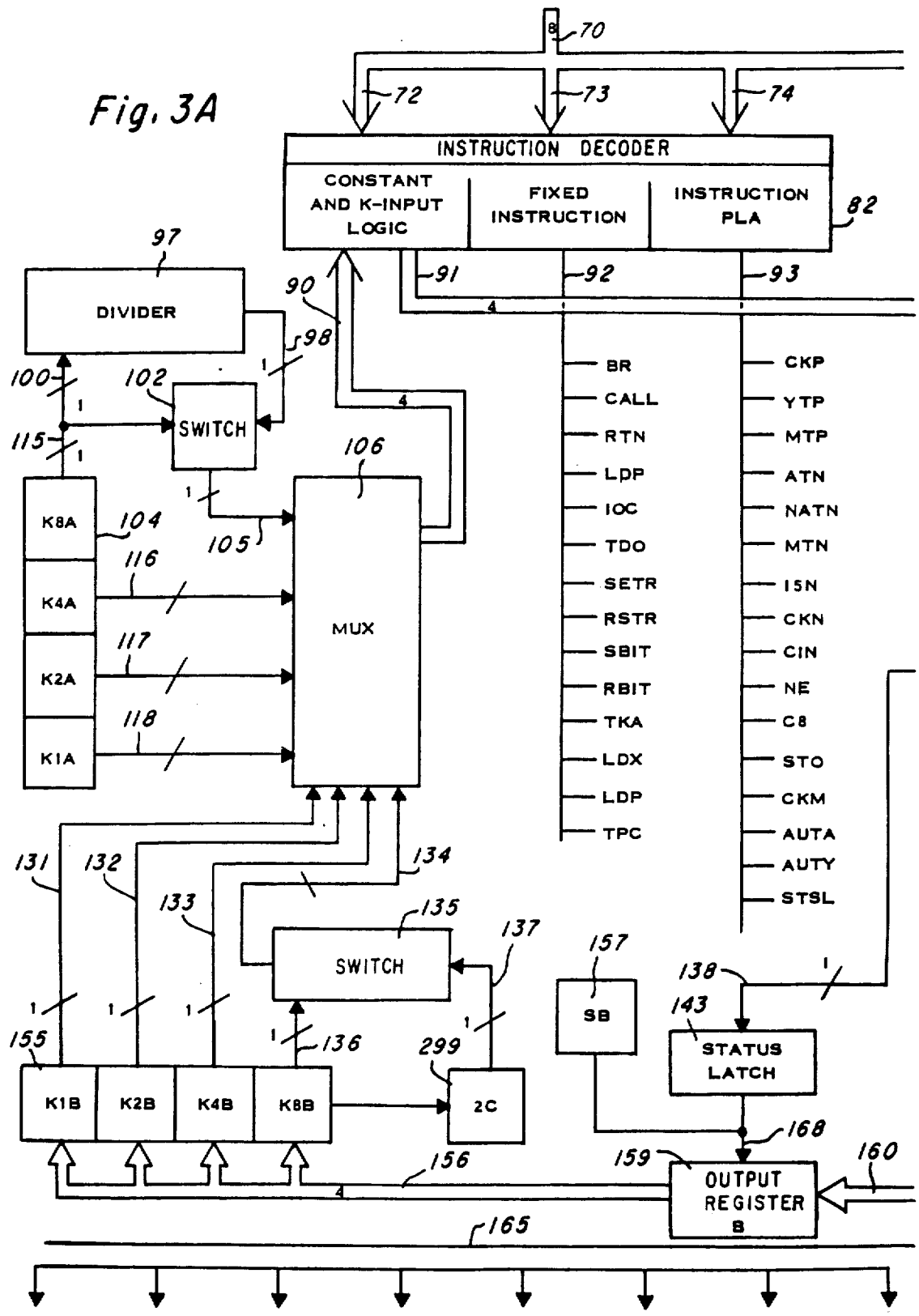
FIG. 3a and 3b are a block diagram of the digital processing system of the invention.
Figure 3A:
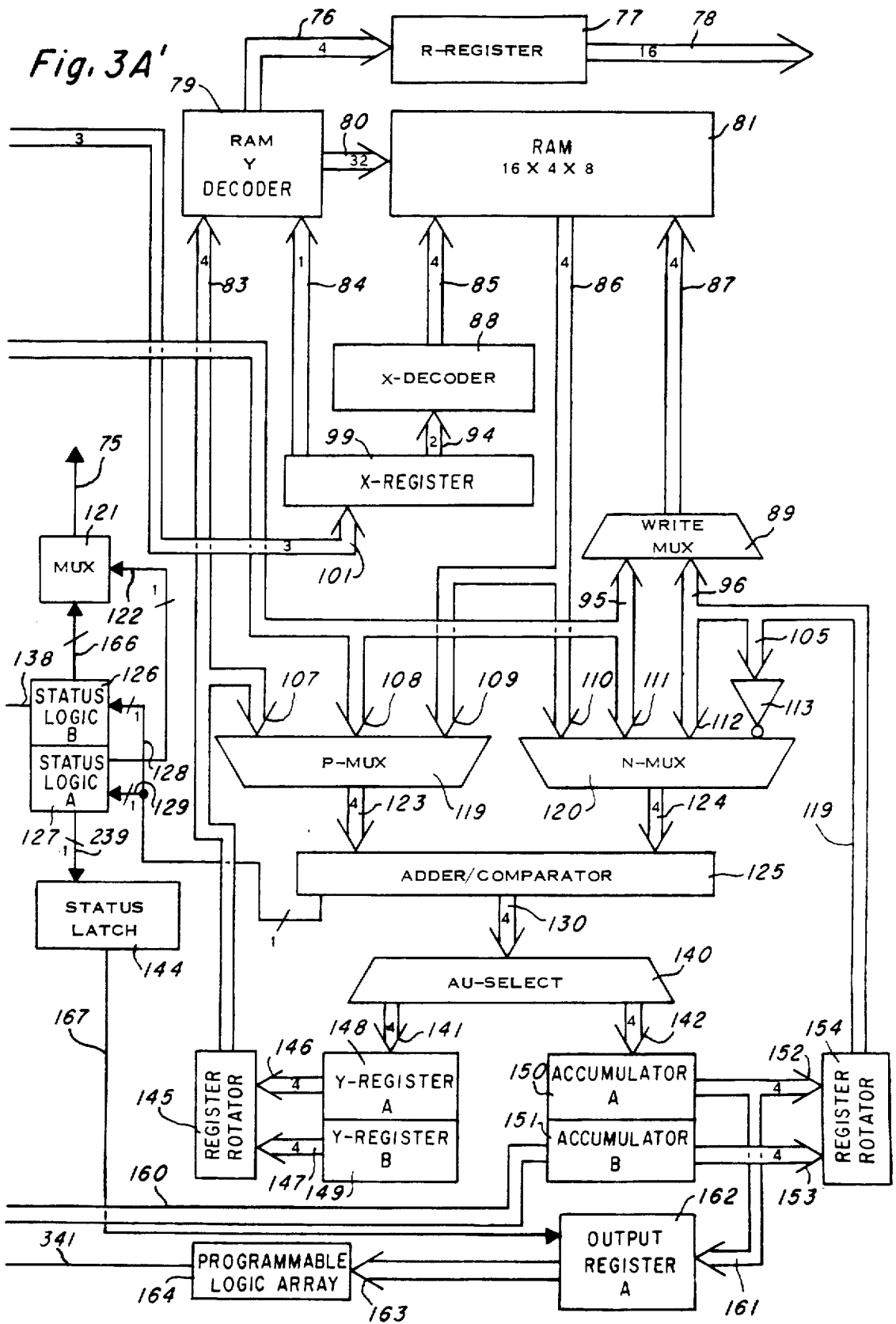
Figure 3B:
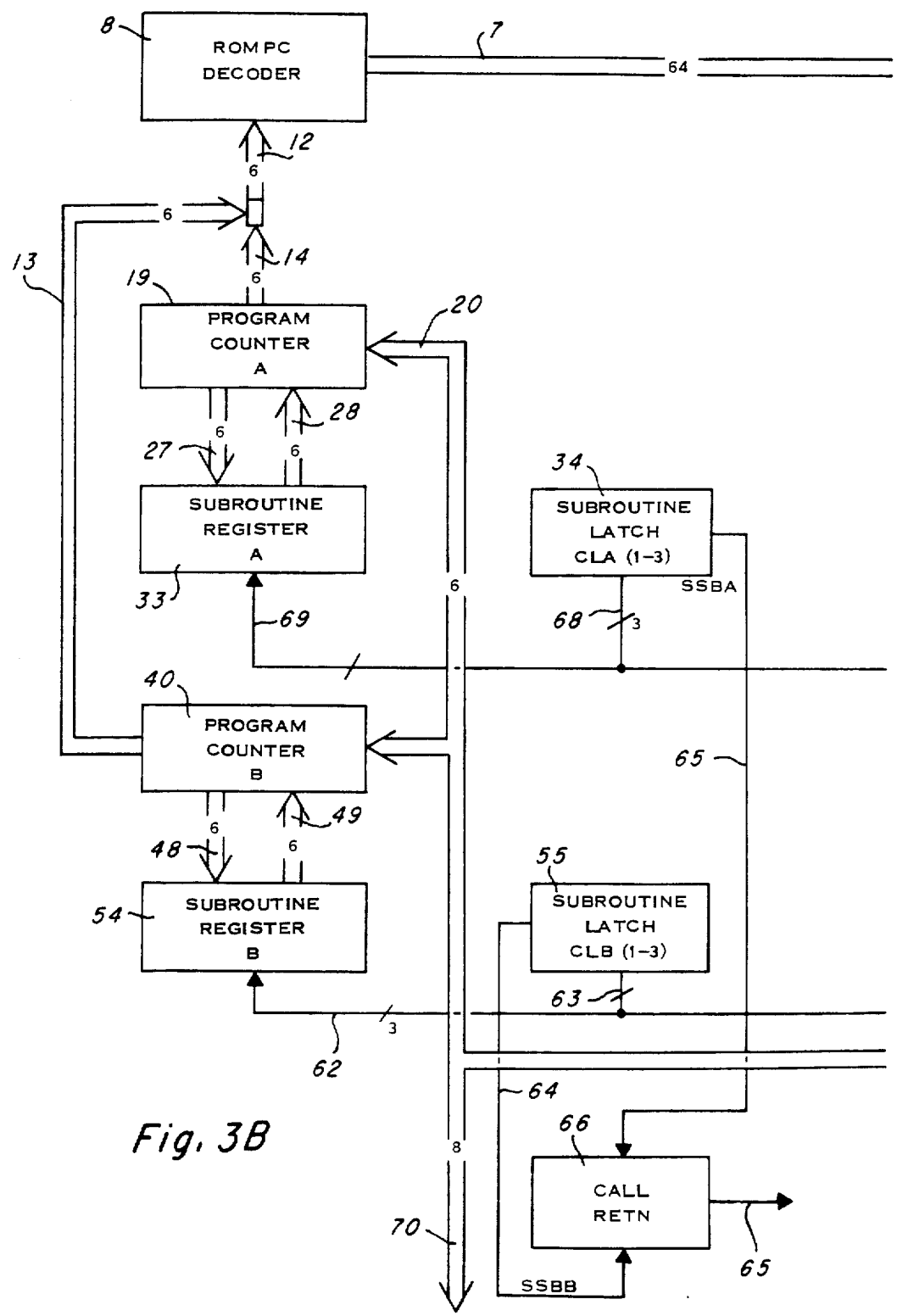
Figure 3B:
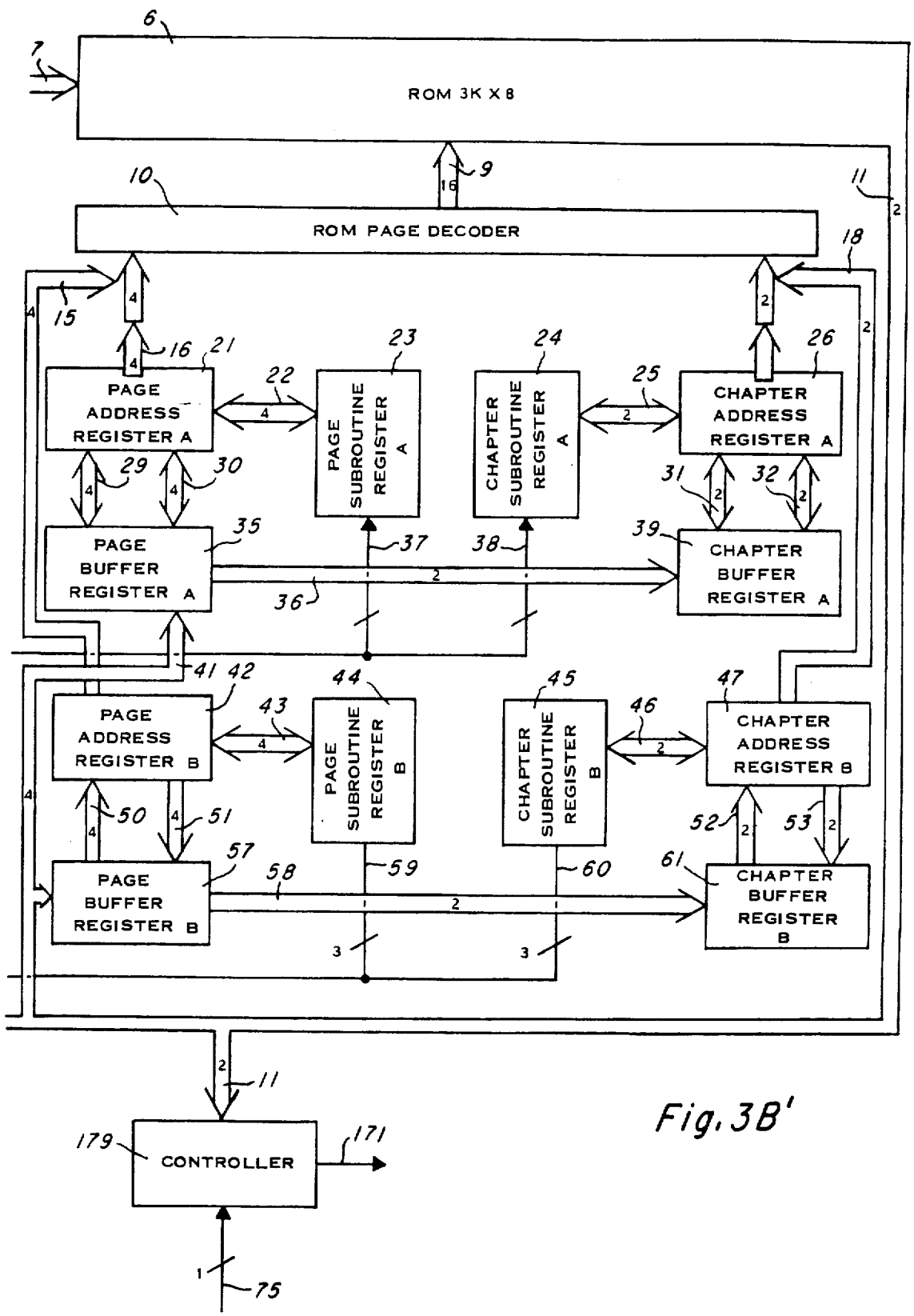

FIG. 1 illustrates an embodiment of this invention in a single semiconductor integrated chip. A block diagram of the system within the microprocessor chip 1 of FIG. 1 is shown in FIGS. 3a and 3b. This system is a modification of the digital processor chip described in U.S. Pat. No. 3,991,305 by Edward R. Caudel and Joseph H. Raymond, Jr. assigned to Texas Instruments. The system is centered around a ROM (read-only-memory) 6 and a RAM (random-access-memory) 81. This architecture gives the user the flexibility to partition memory for each processor. In addition, each processor can share program routines contained in the ROM. The third advantage to this architecture is that the processors may communicate with each other through RAM memory since the memory RAM is common to all processors. The ROM 6 contains a large number, in this case 3072 instruction words of 8 bits per word, and is used to store the program which operates the system. The RAM 81 contains 512 self-refresh memory cells software organized as 8 files of 16 words for 4 bits per word. The number of words in the ROM or cells in the RAM depends upon the desired complexity of the digital processor functions. Numerical input data is stored in the RAM 81, along with intermediate and final results of calculations, as well as status information or "flags," decimal point position and other working data. The RAM 81 functions as one of the working registers of the processor system, although it is not organized in a hardwre sense as separate registers as would be true if shift registers or the like were used for this purpose. The RAM 81 is addressed by a word address on lines 80, i.e., one out of thirty-two address lines in the RAM is selected by means of a RAM Y decoder 79, by an address signal on lines 85 applied from an X-decoder 88. For a given word address on lines 80 and address on lines 85, four specific bits are accessed and read out on RAM lines 86. Alternatively, data is written into the RAM 81 via the X decoder 88 from a write MUX 89 via four lines 87.

Figure 3C:
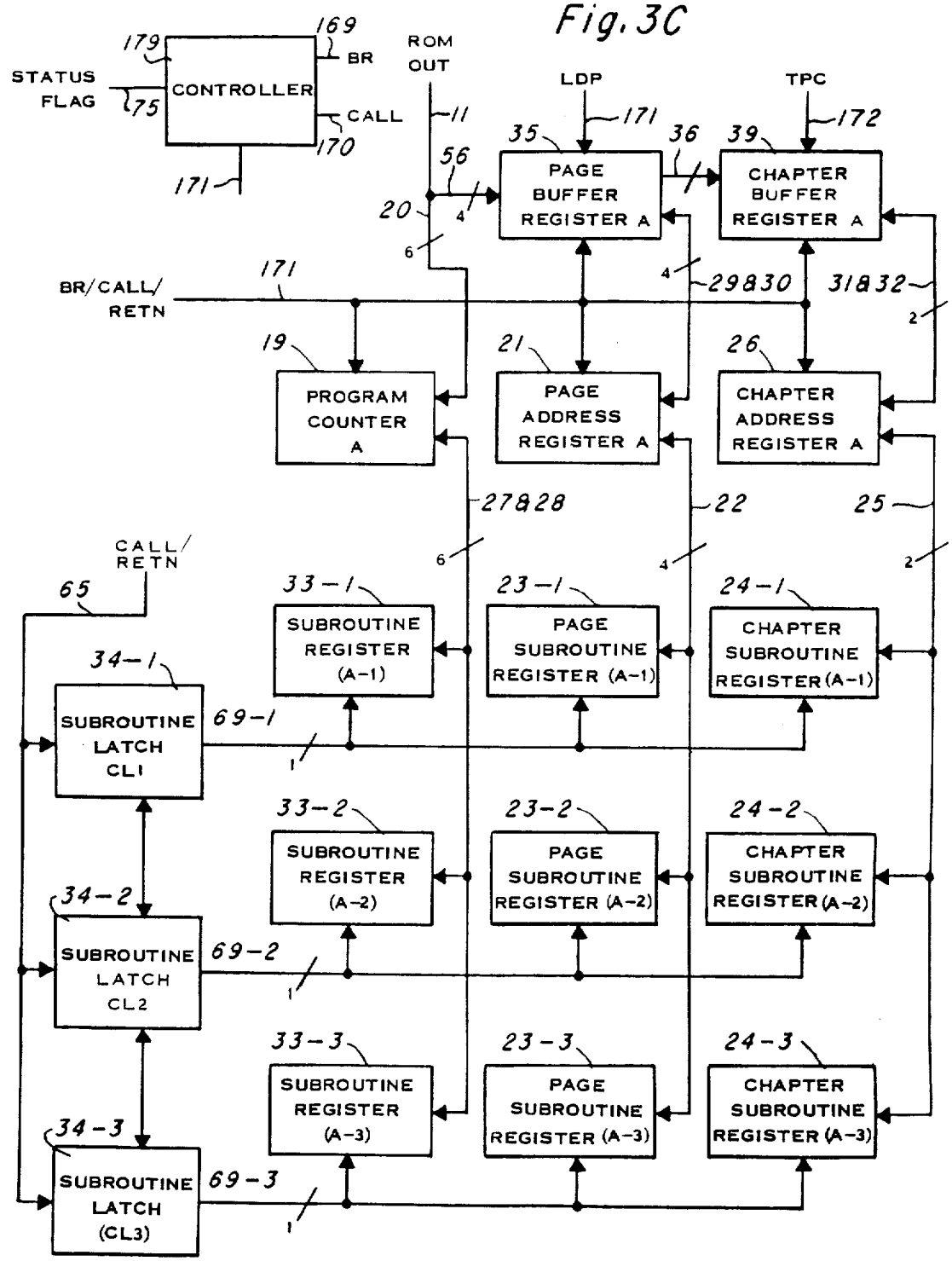
FIG. 3c is a block diagram of the branching and subroutine addressing circuitry.

The ROM 6 produces an eight-bit instruction word on ROM output lines 11 and 70 during each instruction cycle. The instruction is selected from 24,576 bit locations in the ROM, organized into 3,072 words containing eight bits each. The ROM is portioned or divided into three chapters, each chapter containing sixteen groups or pages of sixty-four words each. A specific instruction in the ROM is addressed by a ROM word address on one of 6 lines 7, a page address on four lines 16 or 15, and chapter address on two lines 17 or 18. The ROM word address on line 7 is generated in a ROM PC decoder 8. The encoded ROM word address is produced in either program counter (A) 19 or program counter (B) 40 which are multi-stage exclusive- or feedback shift registers that may be incremented after an instruction cycle, or may have an address loaded into them via lines 20 from ROM output lines 11 for a call or branch operation. The ROM PC decoder 8 receives an encoded address on six lines 13 or 14, through lines 12. Two three-level subroutine registers (A) 33 and (B) 54 are respectively associated with the program counters (A) 19 and (B) 40 to serve as a temporary storage for the return address during call or subroutine operations. The incremented program address is stored in the subroutine registers (A) 33 or (B) 54 via lines 27 or 48 respectively when a call instruction is initiated so that this incremented address may be copied back into the program counters (A) 19 or (B) 40 via lines 28 or 49 respectively when execution of the subroutine has been completed. The subroutine registers (A) 33 and (B) 54 also receive inputs from subroutine latches CLA 34 and CLB 55 via lines 68, 69 and 63, 62 respectively. Subroutine latches CLA 34 and CLB 55 are three stage latches that enable the subroutine registers (A) 33 and (B) 54 to execute of up to three levels of subroutines. FIG. 3c illustrates interconnection of subroutine latches CLA 34 and CLB 55 with subroutine registers (A) 33 and (B) 54 to be described.

The ROM page address on lines 9 is produced in a ROM page decoder 10 which receives a four-bit encoded address on lines 16 or 15 from page address registers (A) 21 or (B) 42 respectively which also have page buffer registers (A) 35 and (B) 57 associated with them for branch or subroutine call (BR/CAL) purposes. Page address registers (A) 21 or (B) 42 will always contain the current four-bit page address for the ROM 6, and directly accesses the ROM page decoder 10. The page buffer registers (A) 35 and (B) 57 are multifunction buffers and temporary storage registers, the contents of which can be the present ROM page addresses, or the page addresses during BRNCAL operations. The page buffer registers (A) 35 and (B) 57 are loaded with a 4-bit code from the ROM word field during the load page instruction (LDP). These registers then transfer their contents to the page address registers (A) 21 and (B) 42 respectively upon execution of a valid branch or call instruction. The page buffers registers (A) 35 and (B) 57 receive their inputs from either the ROM 6 via lines 11 and 56 or from the page address registers 21 and 42 via lines 30 and 51 respectively. Their contents are loaded in the page address registers (A) 21 and (B) 42 via lines 29 and 50 respectively. Associated with the page address registers (A) 21 and (B) 42 are page subroutine registers (A) 23 and (B) 44. Each page subroutine register actually contains three levels of subroutine storage capability. The page subroutine registers (A) 23 and (B) 44 receive inputs from subroutine latch A (1-3) CLA 34 and subroutine latch B (1-3) CLB 55 respectively via lines 68, 37 and 63, 59 respectively. The subroutine latches (1-3) CLA 34 and CLB 53 designate the current subroutine level. The contents of the page subroutine registers A 23 and B 44 are loaded with the contents of the page address registers A 21 and B 42 respectively via lines 22 and 43 respectively during successful call instruction executions. During the execution of valid return instructions, the page address register A 21 and B 42 and the page buffer Registers A 35 and B 57 will be loaded with the contents of the page subroutine registers A 23 and B 44 respectively.

In addition to the page address input the page decoder 10 also receives a chapter input from the chapter address registers A 26 and B 47 via lines 17 and 18 respectively. The chapter address registers A 26 and B 47 receive their contents from the chapter buffer registers A 39 and B 61 respectively via lines 31 and 52 respectively. The chapter buffer registers A 39 and B 61 receive their contents from the page buffer registers A 35 and B 57 respectively via lines 36 and 58 respectively or from the chapter address registers A 26 and B 47 via lines 32 and 53 respectively. Associated with the chapter address registers A 26 and B 47 are chapter subroutine registers A 24 and B 45 respectively. Each chapter subroutine register actually contains three levels of subroutine storage capability. The chapter subroutine registers 24 and 45 also receive inputs from the subroutine latches a (1-3) 34 and b (1-3) 55 respectively via lines 68,38 and 63,60 respectively. Upon execution of a call instruction, chapter subroutine registers A 24 and B 45 will receive the contents of the chapter address registers A 26 and B 47 respectively via lines 25 and 46 respectively. Upon execution of a Return instruction, the contents of the chapter subroutine Registers A 24 and B 45 will be copied into the chapter address Registers A 26 and B 47 and into the chapter Buffer Registers A 39 and B 61.

The page address may remain constant while program counters A 19 or B 40 are being sequenced or are branching within a page. Calling or branching to another page requires an instruction which loads a new page address into registers A 35 or B 57 via lines 56, i.e. the LDP instruction.

The contents of the ROM 6 are then transferred via lines 11, 70, 72, 73, and 74 into the instruction decoder 82 via lines 72, 73, and 74. The instruction decoder 82 decodes the instructions and produces control signals which activate the selected components of the microprocessor chip 1. Example instructions are represented by the instruction mnemonics 92 and 93.

Numerical data and other information is operated upon in the system by an adder/comparator 125 which is a bit-parallel adder having a precharged carry circuit. The inputs to the adder/comparator 125 are determined by a P-MUX 119 and an N-MUX 120 which receive four-bit parallel inputs from several sources and select from these what inputs are applied to the adder on input lines 123 and 124. First, the memory read or recall lines 86 from the RAM 81 provide one of the alternatives for both P and N inputs. Four registers receive the adder output 130, these being the Y registers (A) 148 and (B) 149 and accumulators (A) 150 and (B) 151. The two Y registers A 148 and B 149 have output lines 146 and 147 respectively that input into Register Rotator 145 which selects one of the two to be transmitted on lines 107 into the P-MUX 119. The N-MUX 120 also receives the accumulator outputs 152 and 153 which are rotated via Register Rotator 154 on lines 114 to the input lines 112. The complement of the accumulator outputs 152 and 153 are received by the N-MUX 120 via lines 103 through inverter 113. Thus, the P adder input 123 is selected from the following sources: data memory or RAM 81 on lines 86 and 109, Y registers (A) 148 or (B) 149 via lines 146 or 147 and 107, constant and K-input or "bit" information from the instruction decoder 82 on lines 91 and 108. The N adder input 124 is selected from the following: the output from the accumulator (A) 150 or (B) 151 via lines 152 and 153 through 154, the complement of the accumulator output via lines 103 and inverter 113, the instruction decoder 82 output on lines 111, and the ROM output on lines 110.

The output from the adder/comparator 125 through lines 130 is applied to either the Y registers (A) 148 or (B) 149 via lines 141 and the accumulators (A) 150 or (B) 151 via lines 142 through AU-select 140. All of the operations of the adder/comparator 125 and its input P-MUX 119 and N-MUX 120, etc., are controlled by the instruction decoder 82. The instruction decoder is responsive to instruction words on line 71 from ROM 6.

The four bits of the accumulator (A) 150 output are also applied to Output A Register 162 for the output signals via lines 161, and the output of the Output Register (A) 162 is applied via lines 163 to an output Programmable Logic Array 164 which merely encodes a five-bit segment identification to a user specified one-of-eight representation on eight lines 165. The four bits of the accumulator (B) 151 output are applied to Output Register (B) 159 via lines 160 for output via lines 156 into the output lines 155. The fifth bit of the Output Register (B) 159 is the status which is output to the SB pad 157 via line 158.

The R-register 77 is a random access register where all bits are separately, independently, and mutually exclusively addressed. When one of the bits in the R-register 77 is addressed from the RAM Y decoder 79, either a "1" or "0" may be entered into the address cell of the Register 77 under control of the SETR or RSTR instructions on line 76 from the current instruction word, as determined by the output of the RAM Y decoder 79 in the output arrangement. This bit will remain in the defined state until again specifically addressed and changed; meanwhile any or all of the other bits may be addressed and set or reset in any order. It is possible to have any combination of R-register 77 bits set or reset, providing $2^{16}$ or 65,536 code combination (for a sixteen-digit output) on the output lines 78. Ordinarily, however, a routine is used whereby the sixteen stages of the R-register 77 are addressed in descending order, MSD to LSD repetitively, to provide a scan cycle. During power-up or hardware-clear, all the bits of the R-register 77 are unconditionally set to "0".

Similar to the R-register 77, the other output via register A 162 is static in that the contents once entered will remain until intentionally altered. The register A 162 functions as an output buffer, remaining latched while the accumulator (A) 150 is being manipulated.

The data sources for the Y register (A) 148 and (B) 149 are the following: a four-bit constant stored in the ROM 6 as part of an instruction word; a four bit constant input to instruction decoder 82 from either input keyboard K1A through K8A104 or A1B through K8B155 via line 90; the accumulators 150 and 151 transferred to the Y registers (A) 148 and (B) 149.

Status logic B 126 and A 127 provide the function of examining the AU MSB carry output C3, or a compare COMP output from the adder/comparator 125 on lines 128 and 129, and producing a status generate signal on lines 138 and 139 and a delayed status on lines 166 and 122 that is selected by a multiplexer, MUX 121 which is sent via line 75. BRNCAL via line 172 is input to CALL/BR logic 67 which in turn produces a signal to indicate address copying between program counters (A) 19 or (B) 40 and the subroutine registers (A) 33 or (B) 54, for example. Thus, the status logic B 126 and A 127 always function to set up the validity for a BRNCAL branch. The status generate signals 128 and 129 provide inputs to the status latches 143 and 144 via lines 139 and 138 respectively. These status latches in turn input a bit into the two output registers A 162 and B 159 via lines 167 and 168 respectively.

A right MUX 89 determines what and when data is written into or stored in the RAM 81 via lines 87. This right MUX 89 receives inputs from either the accumulators via lines 96 or the instruction decoder 82 via lines 95, and this circuit produces an output on lines 87 which go to the RAM 81. Selection of what is written into the RAM is made by the instruction word. Constants or keyboard information, from CKB lines 95, as well as the adder output via the accumulator, may be written into the RAM, via the write MUX 89, and further the CKB lines 95 can be used to control the setting and resetting of bits in the RAM, via the write MUX 89.

The RAM page address location into which data is written is determined by three bits of the instruction word on lines 101 as applied via lines 94 to a RAM file address register X-decoder 88 and thus to lines 85. The RAM Y address in the decoder is of course selected by the contents of Y registers (A) 148 and (B) 149 via lines 83, and X register 99 via lines 84.

The two four keyboard inputs 2 and 3 appear internal to the chip 1 on lines 104 and 155. The multiplexer 106 determines which of the four inputs 104 or 155 will be input via lines 90 to the constant and K-input logic of the instruction decoder 82. The A inputs K1A, K2A, K4A, and K8A are input to th multiplexer 106 through lines 105, 116, 117, and 118. K8A is input to a divider 97 through line 100 and user defined switch 102 through line 115. Divider 97 also outputs 1 bit into user defined switch 102 via line 98. Divider 97 is used as a divide down counter. The B inputs K1B, K2B, K4B, and K8B are input to the muliplexer 106 through lines 131, 132, 133, and 134 respectively. K8B is input through a user defined switch 135 via line 136 which places K8B directly on the input line 134 or inputs the K8B pad signal through zero detect circuitry 299.

Four bit inputs are shown, although some systems may need only three inputs. It is seen that a keyboard input may be applied via instruction decoder 82, lines 91 and the adder/comparator 125 to the accumulators (A) and (B) 150 and 151.

BRANCH and Subroutine Call

FIG. 3c is an illustration of the program counter, the page address register, page buffer register, chapter address register, chapter buffer register and the three levels of the program subroutine register, page subroutine register and chapter subroutine register. The architecture in FIG. 3c is repeated for both the A and B sets of registers in FIGS. 3a and 3b.

If the status line 75 is "1" and the next instruction is a branch signified by line 169 being a "1", then the controller 179 via line 171 causes the page address register A 21 to be loaded with contents of the page buffer register B 35 via lines 29. The page buffer register B 35 may be previously loaded with the branch page address by use of the LDP instruction if the branch is a long branch. A long branch is defined as a branch that requires a page and/or chapter address change. If the branch is to generate a change in chapter and page, the chapter buffer register B 39 must be loaded by use of the TPC instruction via line 11 in addition to the LDP instruction loading the page address. The LDP instruction is executed which cause four bits of page address to be loaded from the ROM 6 over lines 11 and 56 into the page buffer register B 35. If the chapter address is to be changed, then the execution of the TPC instruction will cause the least significant two bits of the address in the page buffer register B 35 to be loaded via lines 36 into the chapter buffer register B 39. When the actual branch instruction is executed, line 169 is a "1" and if the status 75 is "1" then line 171 is activated which causes the copying of page address over lines 29 and copying of the chapter address over lines 31.

For a call to be executed, the call line 170 and status line 75 must be both "1". When these conditions occur, CL1 34-1 is set to "1" via line 65 to signify that the first subroutine level is in use. Line 171 is set to "1" which causes the present incremented address of the program counter A 19 to be stored in the first subroutine Register A 33-1 via line 27; the subroutine address is then placed in the program counter A 19 from the ROM 6 via lines 11 and 20. If a return is executed then CL1 34-1 is reset to 0 via line 65 and the incremented address now stored in the first subroutine Register A 33-1 is moved into the program counter A 19 via line 28. If the first subroutine register loaded, i.e. the processor is executing instructions in the first subroutine level and another subroutine call instruction is encountered then CL2 34-2 is set to 1 via line 65 and the incremented address of program counter A 19 is loaded into the second subroutine Register 33-2 via line 27. The new subroutine address is then loaded into the program counter from ROM 6 via lines 11 and 20. If a third call instruction is encountered, then CL3 34-3 is set in a similar manner and the incremented address in the program counter A 19 is stored in the third subroutine Register A 33-3 via line 27. If a fourth call instruction is encountered, it is treated as a branch and the integrity of the three subroutine registers is maintained.

A long call, defined as a call to a subroutine located off the current page address, and/or chapter address is also possible. If the call is also off the current chapter the following sequence occurs. The subroutine chapter is first loaded into the page buffer register A 35 from ROM 6 via lines 11 and 56 upon execution of the LDP instruction. The chapter buffer register A 39 is next loaded from the page buffer register A 35 via line 36 upon execution of the TPC instruction. The subroutine page is loaded into the page buffer register A 35 from the ROM 6 via lines 11 and 56 upon executing the LDP instruction. When the call instruction is executed, subroutine latch CL1, 34-1 is set to 1 via line 65. Line 171 and 69-1 cause the incremental address in the program counter A 19 to be stored in the first subroutine register 33-1 via line 27. The page address is in page address Register A 21 is to be stored in the first page subroutine register 23-1 via line 22, the chapter address in the chapter address Register A 26 is to be stored in the first chapter subroutine register 24-1 via line 25. The subroutine address is loaded into program counter A 19 from the ROM 6 via lines 11 and 20. The subroutine page is loaded in the page address Register A 21 from the page buffer Register B 34 via line 29. The subroutine chapter is loaded in the chapter address Register A 26 from the chapter buffer Register B 39 via line 31. If addition long call instructions are executed, each call must be preceeded by LDP and TPC instructions, if required, CL2 34-2 will be set to signify loading of the second subroutine level and the CL3 34-3 will be set to signify the loading of the third subroutine level. The remaining program counter subroutine register 33-2 and 33-3, together with the page subroutine register 23-2 and 23-3 and chapter subroutine Registers 24-2 and 24-3 are loaded in a similar manner as before. When a return instruction is executed, the highest level CL latch that is "1" is set to "0" via line 65 and the corresponding program counter subroutine Registers 33 contents is loaded into the program counter A 19 via line 28, the contents of the corresponding page subroutine Registers 23 is loaded into the page address Register A 21 via line 22 and into the page buffer Register B 35 via line 30. The contents of the corresponding chapter subroutine Registers 24 is loaded into the chapter address Register A 26 via line 25 and into the chapter buffer Register B 39 via line 32. Each successive return instruction is executed in the same way. After all subroutine latches CL 34 are set to "0", any further encountered return instructions will be treated as a No-op.

SYSTEM TIMING

FIG. 3d illustrates the system timing for the microprocessor system in FIGS. 3a and 3b. These processors will operate synchronously with the external oscillator but will operate in phases that are skewed with each other. The timing for this architecture may be viewed as two macroinstruction per machine cycle where each macroinstruction generates its own unique set of microinstructions. All of the timing signals of through $\phi 6$ are derivations of the oscillator which input into the circuitry for the system. $\phi 1$ is down for two complete oscillator cycles and up for four. $\phi 2$ is down for two and up for four, offset from $\phi 1$ by one complete oscillator cycle. φ3 is up for three and down for three. φ4 is down for one, up for two. φ5 is offset from φ4 by one complete oscillator cycle and is down for one, up for two. Likewise, φ6 is offset from φ5 by one complete cycle and is down for one and up for two. φ1 and φ2 are used for memory fetching in the ROM 6 for both CPU A and CPU B, for instance, during the first cycle that φ1 is low, this period is used to fetch the instruction for CPU A. Likewise during the first low period for φ2, this time period is used to fetch the first instruction for CPU B and then during the down part of φ2, the CPU A instruction word is executed. It will be noted that the execution of the CPU A instruction occurs at the same time that the CPU B instruction is being fetched. Likewise when φ1 goes low, the CPU B instruction is then executed and the next instruction for the CPU A is then fetched. This allows the processor to use both the ROM and the arithmetic unit at the same time (1) for executing the instructions and (2) for fetching the instructions. Therefore, the processor system is used efficiently since the ROM does not have to await the execution of the instruction and the logic to execute the instruction such as the arithmetic unit does not have to wait for the fetching of the instruction from the ROM.

φ3 is used for multiplexing data through the circuitry. Normally when φ3 is down, inputs to CPU A are input into the circuitry. Likewise when φ3 is high, the inputs for CPU B are placed on input lines. φ4, 5 and 6 are used to precharge, conditionally discharge and examine the ratioless circuitry and clock all dual purpose logic (RAM, AU). The timing for the adder/comparator unit 125 and the ROM 6 are discussed in the descriptions of these sections.

The Adder Input Select

Figure 4A:
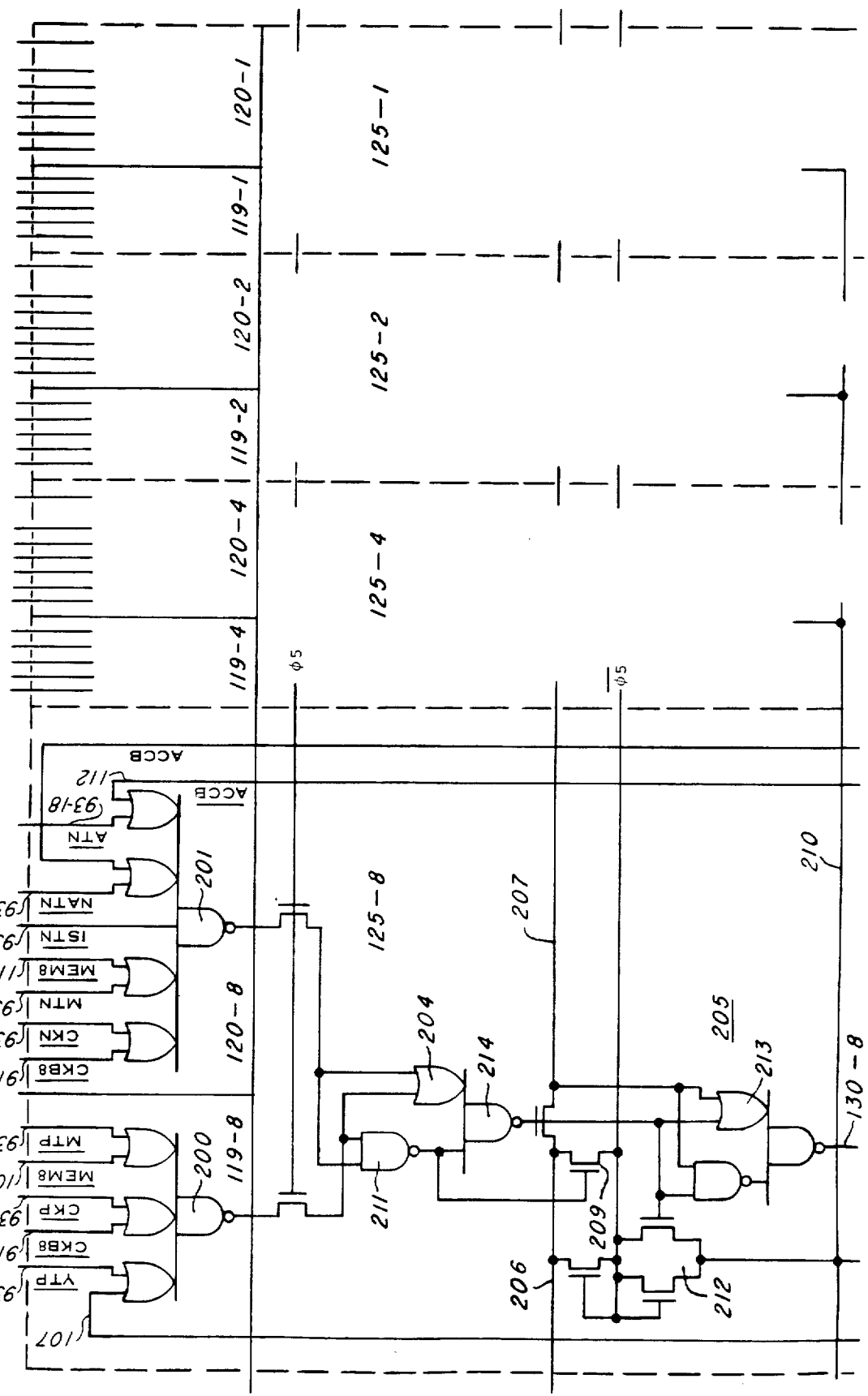
FIG. 4a is a schematic diagram of the positive selector 119 and negative selector 120 together with the adder 125.

As shown in FIG. 4A the P-MUX 119 and N-MUX 120 include for each bit of the adder comparator two sets of complex gate arrangements 120-1, 119-1, etc, each consisting of complex OR/NAND gates 200 and 201, respectively. Gate 201 receives five inputs from the instruction decoder 82, referred to as 15 TN, CKN, MTN, ATN, and NATN, which determine which of the data input lines will be activated. ATN activates gates 120 for inputting the output from the accumulator 150 or 151. NATN is the control line for inputting of the complement of the accumulators 150 or 151. MTN is the control line for the input from the RAM 81. CKN is the control line for the constant input, CKB, received from the constant and K input logic of the instruction decoder 82.

P-MUX 119 is shown with three control inputs and three data inputs for complex gate 200. MTP is the control signal for the input from RAM 81. CKP is the control line for the input from the constant and K-input logic instruction decoder 82. YTP is the control line for the input of the Y Register A 148 or B 149.

The Adder/Comparator

As shown in detail in FIG. 4A, the adder/comparator 125 consist of a set of four parallel adder stages 125-1, 125-2, 125-4 and 125-8; all four of these stages are basically the same. Considering the MSB stage 125-8, each stage consist of a first complex gate 204 and a second complex gate 205 and a carry input 207 and a carry output 206. The complex gate 204 receives two inputs, 120-8 and 119-8 from the P-MUX 119 and the N-MUX 110 when clocked in during $\overline{\phi 5}$ and produces an output on line 130-8 which is the or equivalence function of the inputs on 119-8 and 120-8. A carry output is produced on the line 206 by first precharging the line 206 to a "0" or Vdd on $\overline{\phi 5}$, then conditionally discharging when $\overline{\phi 5}$ goes to Vss, depending on the output of a gate 211. When both inputs 119-8 and 120-8 are "1", one of the generate conditions for generating a carry is satisfied so the output of gate 211 causes a device 209 to be conductive after $\overline{\phi 5}$ goes high, discharging line 206 to Vss or "1". A carry signal is produced on line 206 if both inputs 119-8 and 120-8 are "1", or if either of these is "1" and "carry in" or line 207 is "1", or if both inputs 119-8 and 120-8 are "1" and carry-in on line 207 is "1"; for all other situations, the line 206 remains at "0" or Vdd after $\overline{\phi 5}$ ends. A signal on line 207 "carry-in", CIN, not comes from the previous stage 125-4 which in turn comes from the preceeding stage and the preceeding before that. The carry-in signal is also produced by the instruction decoder 82. The carry-out line 206 is sent to the two status logic B 126 or A 127. The adder/comparator 125 provides a "compare" function wherein a compare output is produced on line 210. It also goes to the status logic B 126 and A 127. The line 210 is charged by $\overline{\phi 5}$ to Vdd by any of the two devices 212 which are conductive then conditionally discharged on $\overline{\phi 5}$ by any of the device 212 turned on by the outputs 214 of the complex gates 204. Conditional discharge occurs if line 214 goes to Vdd which occurs if the inputs to the complex gate 204 at 119-8 and 120-8 are not the same. Where all of the inputs 120-8 are the same as the inputs 119-8, line 210 will be "0", otherwise "1".

Outputs from the adder stage 125-1, 125-2, 125-4 and 125-8 are produced on lines 130 of which line 130-8 is the output of complex gate 205. The complex gates 205 receive inputs from line 214 and "carry-in", CIN not for that bit on line 206. The complex gate 205 produces a "equivalence" function of the ouputs on line 214 and carry-in. During $\overline{\phi 5}$, these outputs 130 are not valid, because the carry circuit is being precharged. Carry is not valid so the outputs 130 are not valid, until after $\overline{\phi 5}$ ends. The adder output 130 is an input to the arithmetic unit AU-select 140 shown in FIG. 5.

Figure 4B:
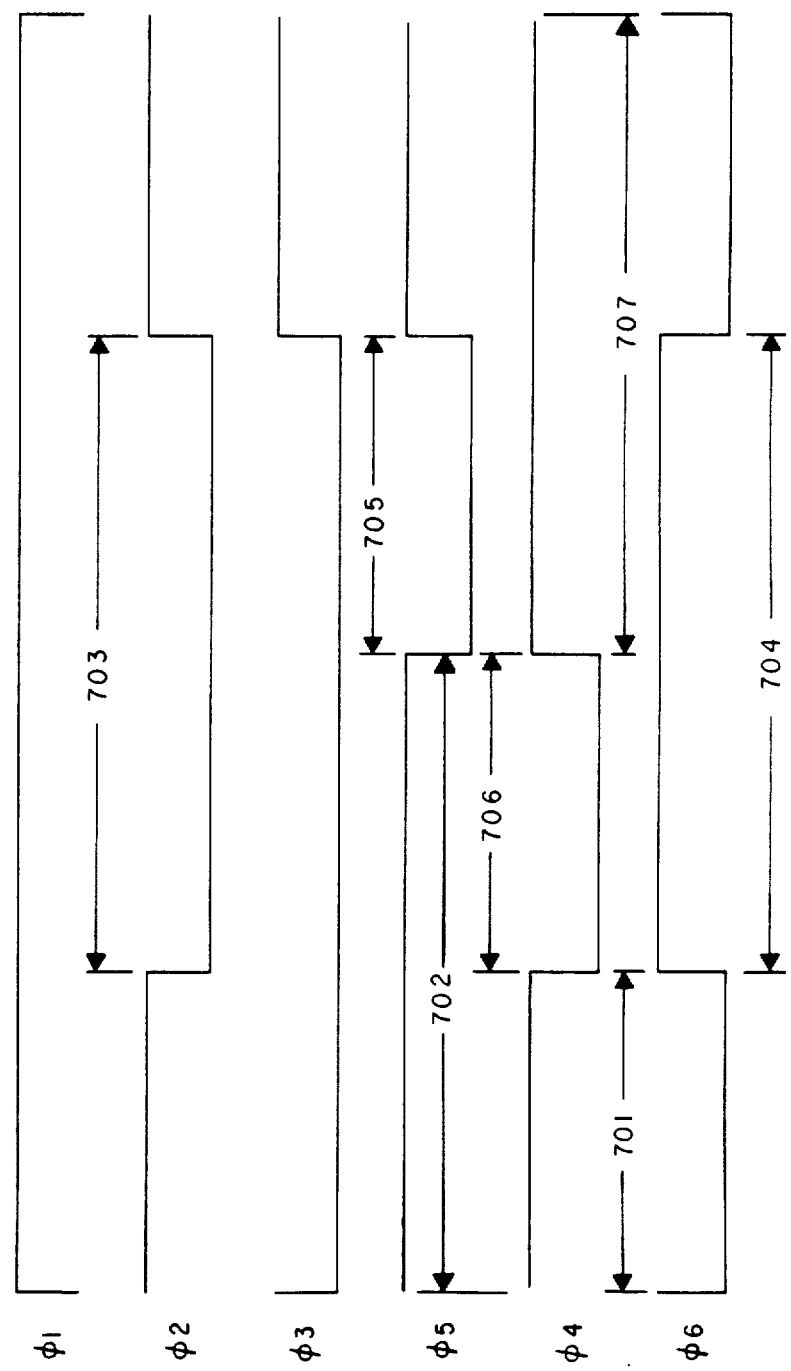
FIG. 4b is a timing diagram for the operation of the adder 125.

FIG. 4b illustrates the timing for the arithmetic logic unit for CPU A. The operation of the logic unit for CPU B is identical as that for CPU A except where φ2 is low in CPU A. φ1 is low in CPU B. The operation of the arithmetic logic unit for CPU A starts and is completed during the time that φ1 is high. The microcontrols are precharged during the fall of φ6, 701, for initialization. At this same time, φ5 is used to time the precharging of the carry and compare logic, 702. When φ6 is high, φ2 and φ4 fall, the C8 and NE microcontrols sample the carry out line 206 and compare lie 210 as shown in 706. At the fall of φ2 703, the status generated is coupled into the status circuits and into the status latch A. This operation is timed by the down portion of φ2. Also at the rise of φ6, 704, during this same time slot, the microcontrols are validated and the arithmetic operations are begun. The next time slot is defined by the fall of φ5, 705, and the rise of φ4. During the fall of φ5, the adder is isolated from the data multiplexer and the carry and compare circuits are evaluated. The results are written into the working registers or into the RAM 81. During the low time of φ5, 705, the status is generated and the operation of the arithmetic is complete.

The Accumulator and RAM Y Register

Figure 5:
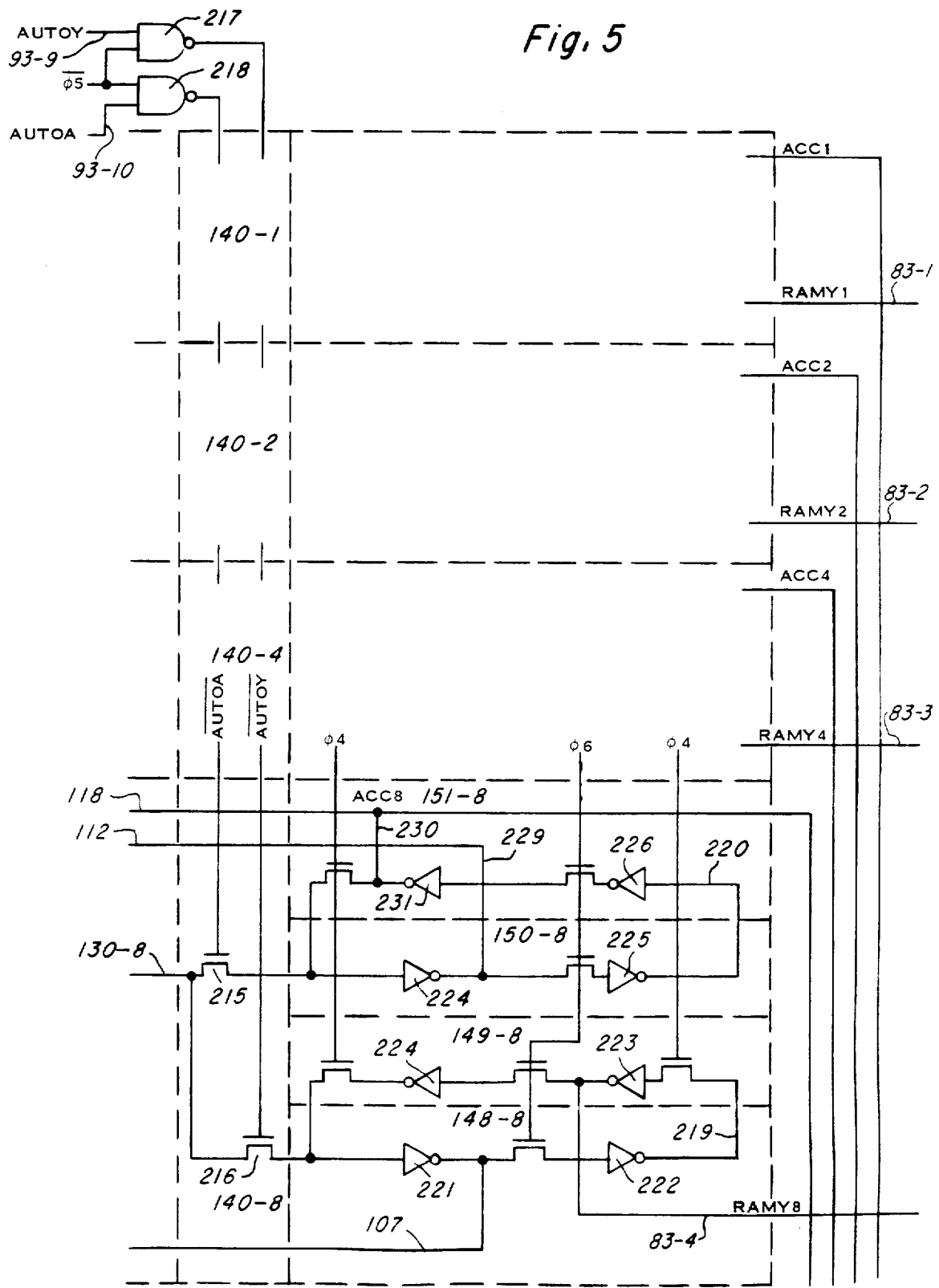
FIG. 5 is a schematic of the Y registers 148 and 149 and the accumulators 150 and 151.

FIG. 5 shows the four sections of the AU-select 140 and accumulators A 150 and B 151 and Y Registers A 148 and B 149. The arithmetic unit select circuitry is shown in Sections 140-1, 140-2, 140-4, and 140-8 where the actual circuitry contained within the section is illustrated in 140-8 and is similar in the other sections 140-1, etc. In section 140-8 the output from the adder/comparator 125 on line 130-8 is selectively directed to either the Y Register or the accumulator by devices 215 and 216. Device 215 receives a signal $\overline{\text{AUTOA}}$ from gate 218. Device 216 receives this signal $\overline{\text{AUTOY}}$ from gate 217. Both gates 217 and 218 receive their signals AUTOY and AUTOA from the instruction decoder 82 together with a $\phi 5$ such that for either $\overline{\text{AUTOA}}$ or $\overline{\text{AUTOY}}$ to be $-\text{Vdd } \overline{\phi 5}$ must be $-\text{Vss}$; thus the accumulators A 150 and B 151 or Y Register A 148 and B 149 can only be loaded during $\phi 5$.

Y Registers A 148 and B 149 are actually one circuit containing a single loop 219 of four inverters. Data for CPU A and data for CPU B are contained in loop 219. When device 216 conducts, then the data from the adder/comparator 125 is conducted by a line 130 into register A 148 inverter 221. The operation of the RAM register Y loop 219 is similar to that which is illustrated in FIG. 2A. On the occurrence of $\phi 6$, the inverted data in 221 is transferred to the inverter 222. On the occurrence of $\phi 4$, the data in 222 is inverted and stored in inverter 223 in the upper part of the loop in 149-8. In actuality, the contents of 149-8 and 148-8 can be either the contents of the CPU A or the CPU B data, depending on the clock cycle timing. The operation of the accumulators A 150 and B 151 is similar in that there exist a four inverter loop 220 which receives the data from the adder/comparator 125 and first loads it into an inverter 224 and on the occurrence of $\phi 6$ that data is transferred to inverter 225. The ouput of the Y Register A 148 or B 149 is taken from inverter 223 on line 228 or from inverter 221 on line 227. Likewise, the output of the accumulators A 150 and B 151 is taken from inverter 224 on line 229 or from inverter 231 on line 230.

Status Circuitry

Figure 6:
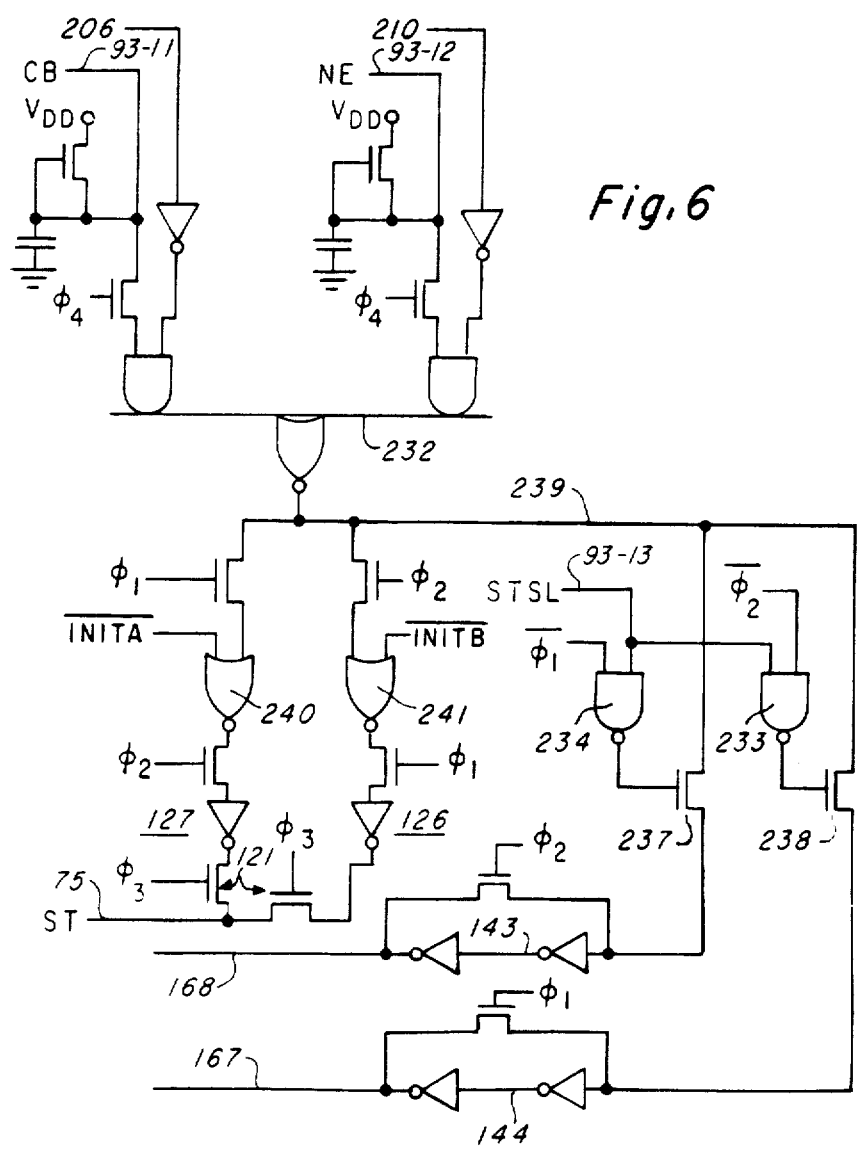
FIG. 6 is a schematic diagram of the status circuitry 126 and 127 and the status latches 143 and 144.

FIG. 6 illustrates the status circuitry. Complex gate 232 receives four inputs; 210 which is the compare line from the arithmetic unit 125, NE which is the not-equal control line from the instruction decoder 82, line 206 which is the carry output from the adder 125 and C8 which is the carry control line from the instruction decoder 82. If the compare line is to be sent to the status NE is set high and thus line 210 is transmitted through to line 239. If the carry bit is to be sent through, then C8 is high and line 206 is transmitted to 239. Status logic A 127 receives the signal from 239 through a NOR gate 240 clocked in by both $\phi 1$ and $\phi 2$, likewise status logic B 126 receives its input from line 239 through NOR gate 241 which is clocked in by $\phi 2$ and then $\phi 1$. There is a single output from these two circuitries 126 and 127 that is clocked by $\phi 3$ and is known as a status line "ST". Both gates 240 and 241 receives inputs from the initialization circuitry. The status latches 143 and 144 are set from line 239 through gates 233 and 234 and devices 237 and 238. When the status latch for CPU A is to be set, the instruction line set status "ST" is high and when $\phi 1$ is high gate 234 activates device 237 which allows the information on line 239 to be transmitted to the status latch 143. Likewise when the "ST" line is high and the $\phi 2$ line is high, gate 233 activates device 238 and the information on 239 is transferred to the status latch 144. Status latch 143 is refreshed by $\phi 2$ and status latch 144 is refreshed by $\phi 1$. The output of the status latch is line 168 and the output of the status latch 144 is the output 167.

Control Keyboard Bit Logic

Figure 7:
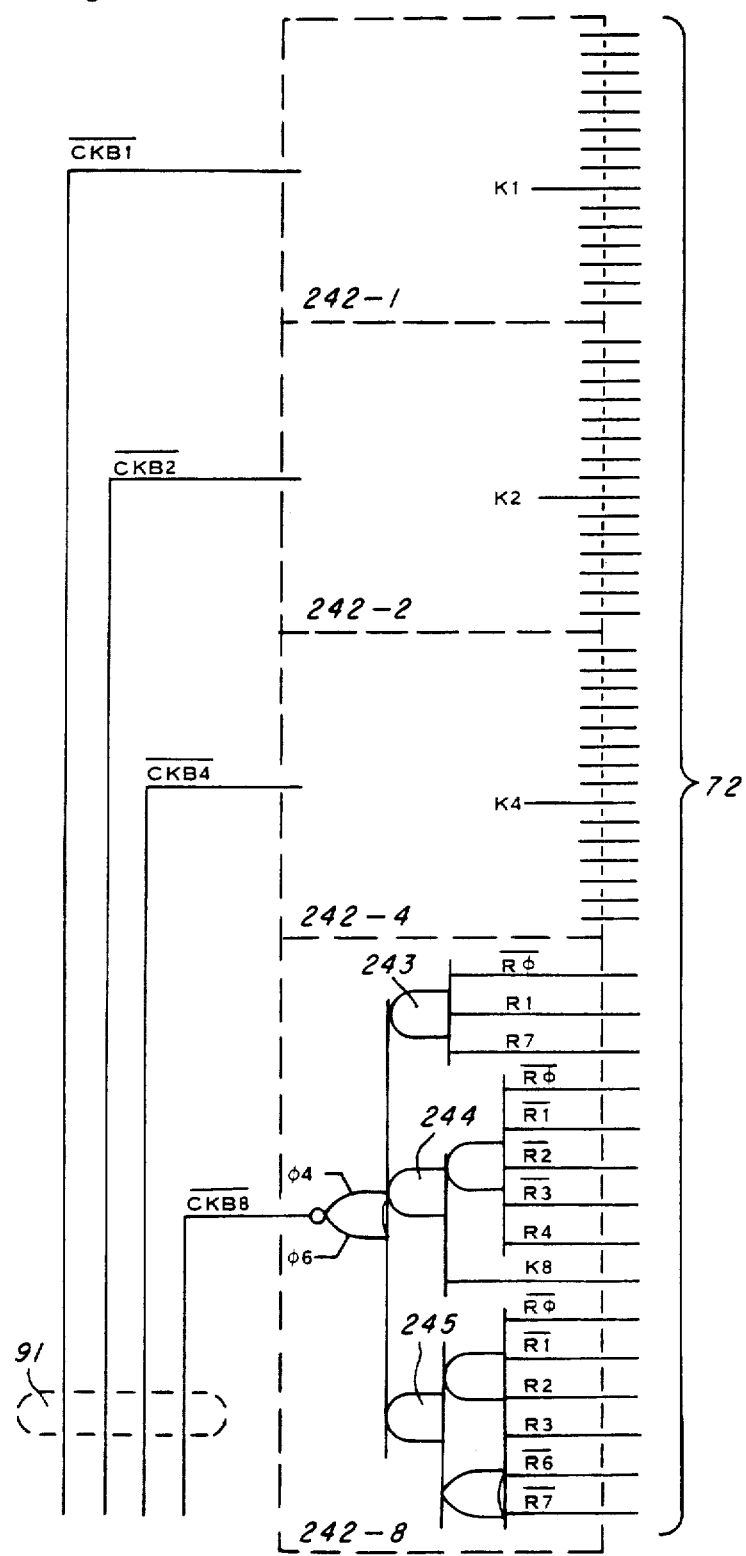
FIG. 7 is a schematic diagram of a constant and K input logic portion of block 82.

The constant and K-input logic portion of the instruction decoder 82 is shown in FIG. 7 and it consists of four complex identical gates 242-1, 242-2, 242-4 and 242-8 which produce a $\overline{\text{CKB 1}}$ and $\overline{\text{CKB 8}}$ outputs on lines 91. The CKB outputs 91 are applied to the P-MUX 119 and N-MUX 120 and to the write MUX 89 as explained. Each of the four complex gates 242-1-242-8 contain three separate gating arrangements 245, 244 and 243, each of which will produce a CKB output under certain conditions, dependent upon the current instruction words on line 72. The gating arrangement 243 receives $\overline{\text{R0}}$, R1, and R7 into an AND gate. R4 replaces R7 for complex gate 242-1, R5 for 242-2, and R6 for 242-4. The purpose of this gating arrangement is to place R4, R5, R6 and R7 onto $\overline{\text{CKB 1}}$ through $\overline{\text{CKB 8}}$ respectively. When the instruction code 01XXXXXX is executed. The gating arrangement 244 receives $\overline{\text{R0}}$, $\overline{\text{R1}}$, $\overline{\text{R2}}$, $\overline{\text{R3}}$ and $\overline{\text{R4}}$ from lines 90 and K8 from the input keyboard multiplexer MUX 106. The purpose of this arrangement is to output the keyboard inputs from lines 90 onto lines 91 when the instruction word 00001XXX is encountered. The gating arrangment 245 functions in setting and resetting bits in the RAM 81, and receive $\overline{\text{R0}}$, $\overline{\text{R1}}$, R2 and R3 from lines 72 and input to an AND gate, so this part will be responsive to an instruction word 0011xxxx while the remaining part of the gate is responsive to R6 or $\overline{\text{R6}}$ or $\overline{\text{R7}}$ or R7 so that only one of the four gates 242-1 to 242-8 will produce a CKB output of "1". This serves to select one of the four bits for a bit operation. The overall function of the CKB logic 242 is thus three-fold. First, a four-bit constant appearing in the R5 to R8 field on the instruction code may be applied to the lines 91. Second, the keyboard or external inputs on lines 90 may be applied to lines 91. Third, one of the four lines 72 may be selected for addressing one of four bits of a digit in the RAM 81. All of these functions are under control of the current instruction words on line 71.

The Instruction Decoder

Figure 8A:
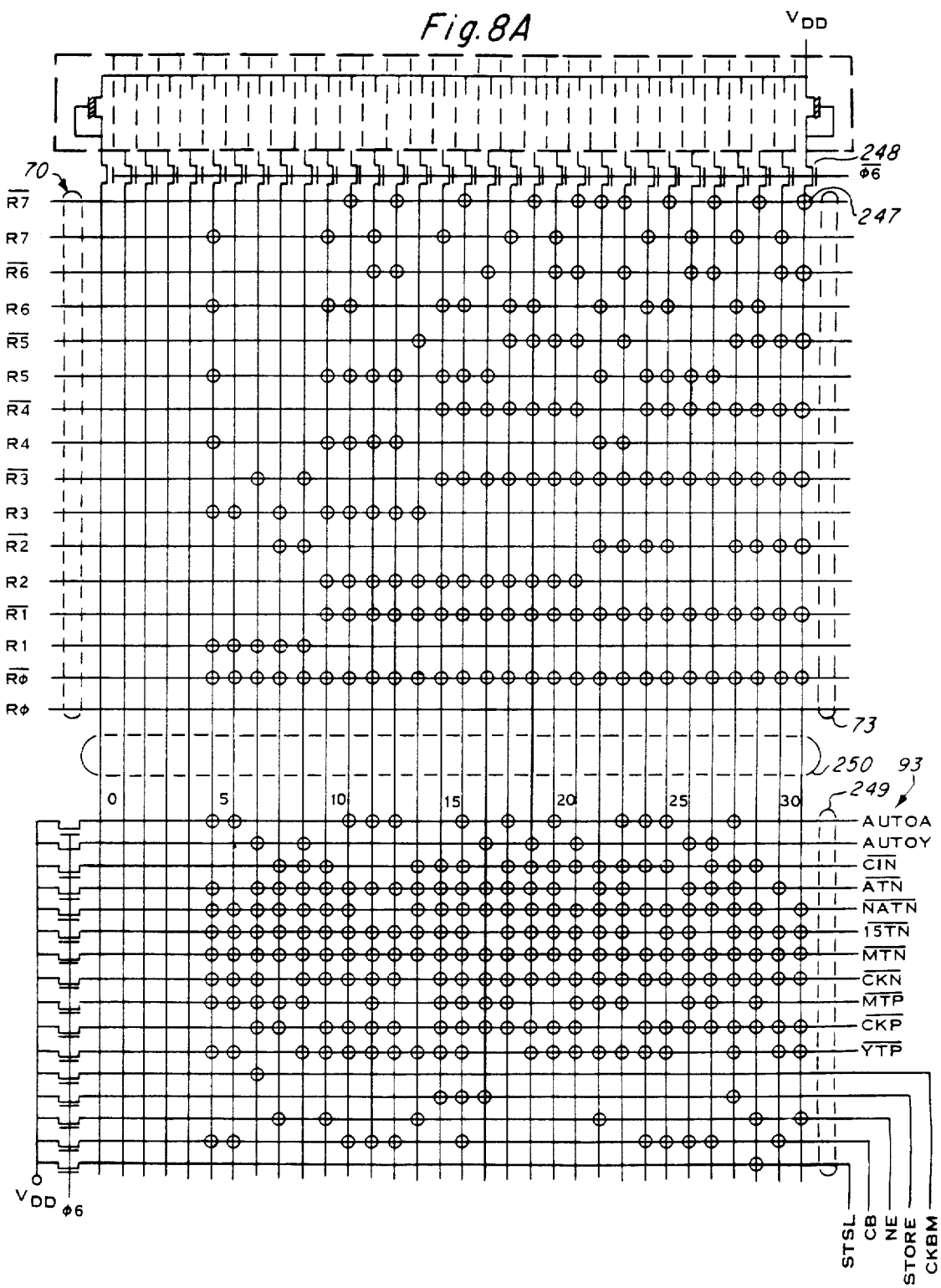
FIG. 8a is a schematic diagram of a portion of the programmable logic array for the instruction decoder.
Figure 8B:
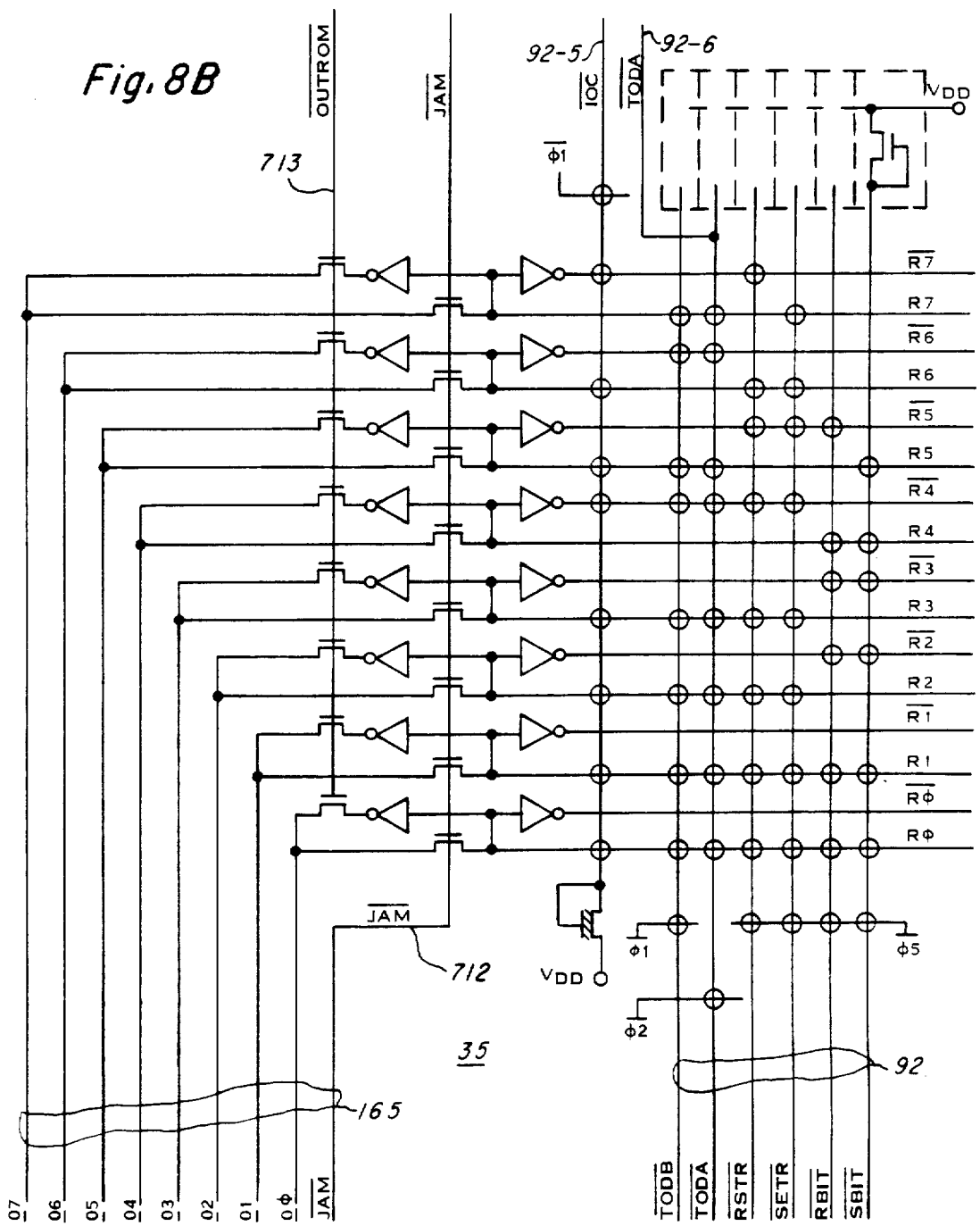
FIG. 8b is the remaining portion of the instruction decoder.
Figure 9A:
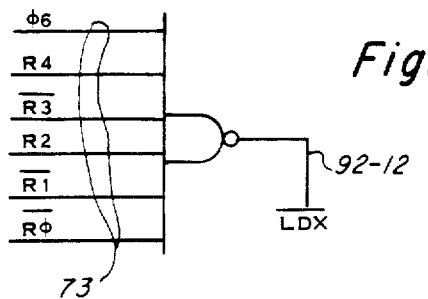
FIG. 9a is a schematic diagram of the "load X register with a constant" instruction decoder.
Figure 9B:
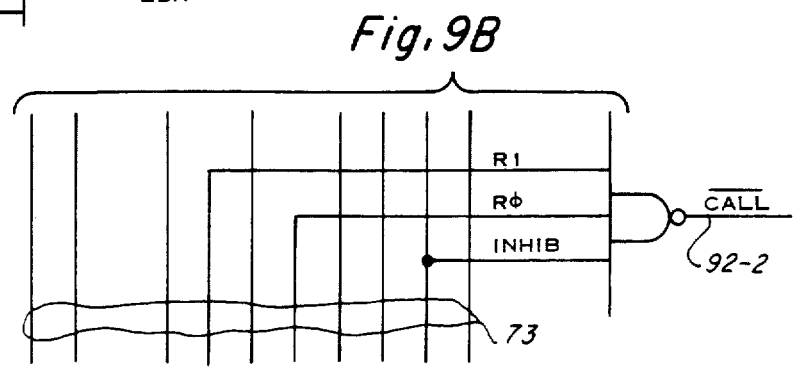
FIG. 9b is a schematic diagram of the call instruction decoder.
Figure 9C:
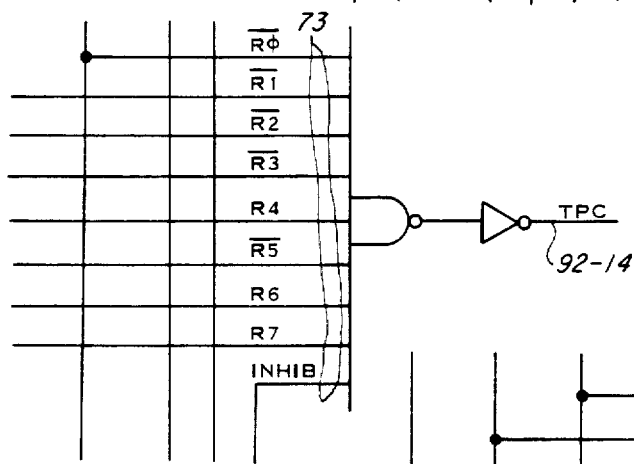
FIG. 9c is a schematic of the transfer page to chapter instruction decoder.
Figure 9D:
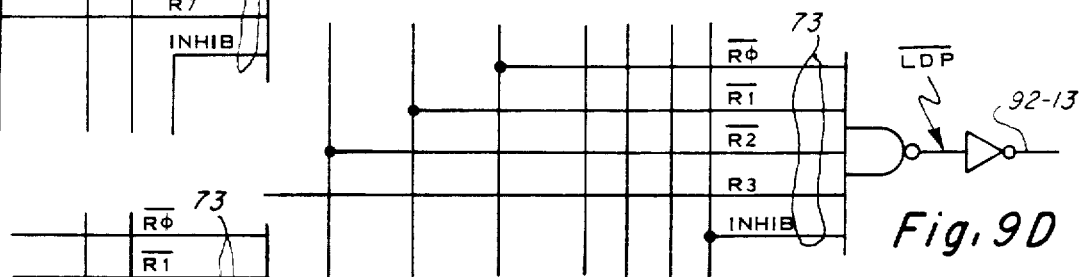
FIG. 9d is a schematic diagram of the load page instruction decoder.
Figure 9E:
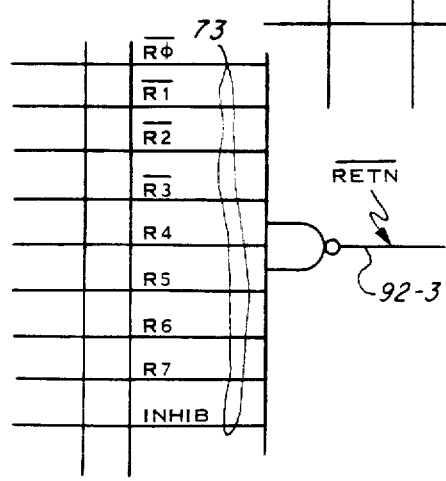
FIG. 9e is a schematic of a return instruction decoder.
Figure 9F:
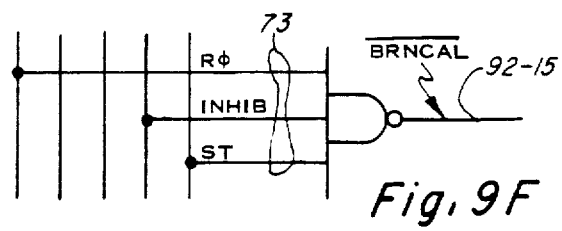
FIG. 9f is a schematic of the branch instruction decoder.

FIGS. 8a and 8b illustrate the instruction decoder portion of the instruction decoder 82 which contain both the fixed instruction and instruction PLA. Referring to FIG. 8A, lines 73 are input into the instruction decoder 82 and consist of the 8 lines from ROM 6 in true and complement form. These lines are transformed into lines 250. The actuation of the selected line in 250 is valid at $\overline{\phi 6}$ due to device 248. A pattern of gates 247 are shown which are thin oxide areas represented by circles connected to the P diffusion lines 250 and to the interleaved P diffused lines Vss not shown and thus form MOS transistors at each circle. Each line 249 therefore functions to produce a Vss or "1" output if any line 250 which crosses it has a circle or a gate over it and is activated by Vdd; otherwise each line 249 will be at Vdd during the period $\phi 6$. When the instruction bus 73 (data and its complement) is active and in the case where in one of the gates such as gate 247 turns on in the macroinstruction section of the PLA, a particular line of the macroinstruction lines 250 will remain at logic zero or charged at Vdd and the respective macroinstruction will be executed. In most cases, at least one gate such as gate 247 will turn on thus providing a discharge path for most of the macroinstruction lines 250 and these lines will be at a logic "1". One of the macroinstruction lines 250 will remain charged and the respective macroinstruction will be executed. FIG. 8B illustrates another portion of the instruction decoder 82 which produces 7 instructions. $\overline{SBIT}$, $\overline{RBIT}$ and $\overline{RSTR}$ are all activated when the respective lines 73 from ROM 6 are activated and when $\overline{\phi 5}$ is high. $\overline{TODA}$ is low when $\overline{\phi 2}$ is high. $\overline{TODB}$ is low when $\phi 1$ is high. $\overline{IOC}$ is low when $\overline{\phi 1}$ is high.

The $\overline{JAM}$ line 712 is used in a testing mode to input instructions on the instruction line 71 via 73 from the output pads 165. This enables the user to execute instructions from a separate memory. The $\overline{OUTROM}$ line is also used in a testing node to download the contents of ROM 6 to the Output Pads 165. This enables the user to examine the contents of ROM 6.

The remaining instructions are produced by logic that is illustrated in FIG. 9. $\overline{LDX}$ is produced by $\overline{\phi 4}$ being high and an instruction 00101XXX as illustrated in 9A. The call instruction is generated by 11xxxxxx instruction as shown in FIG. 9B. The inhibit line is also introduced to restrict the call signal from being activated during a system test. FIG. 9C illustrates the TPC instruction which is activated on an instruction of 00001011 and no inhibit instruction as previously mentioned. LDP is generated by 0001 and no inhibit as shown in FIG. 9D. FIG. 9E illustrates the generation of the return signal. The return signal is the complement of the return bar and is generated by a 1111000 without an inhibit. The $\overline{BRNCAL}$ signal is generated by the logic illustrated in FIG. 9F whereby a 10xxxxxx instruction with the status line high and the inhibit line high. The inhibit line is used during the testing modes to prevent the branching, calling of subroutines, or returning from subroutines during the downloading of ROM 6 as previously discussed.

INPUT

Figure 10:
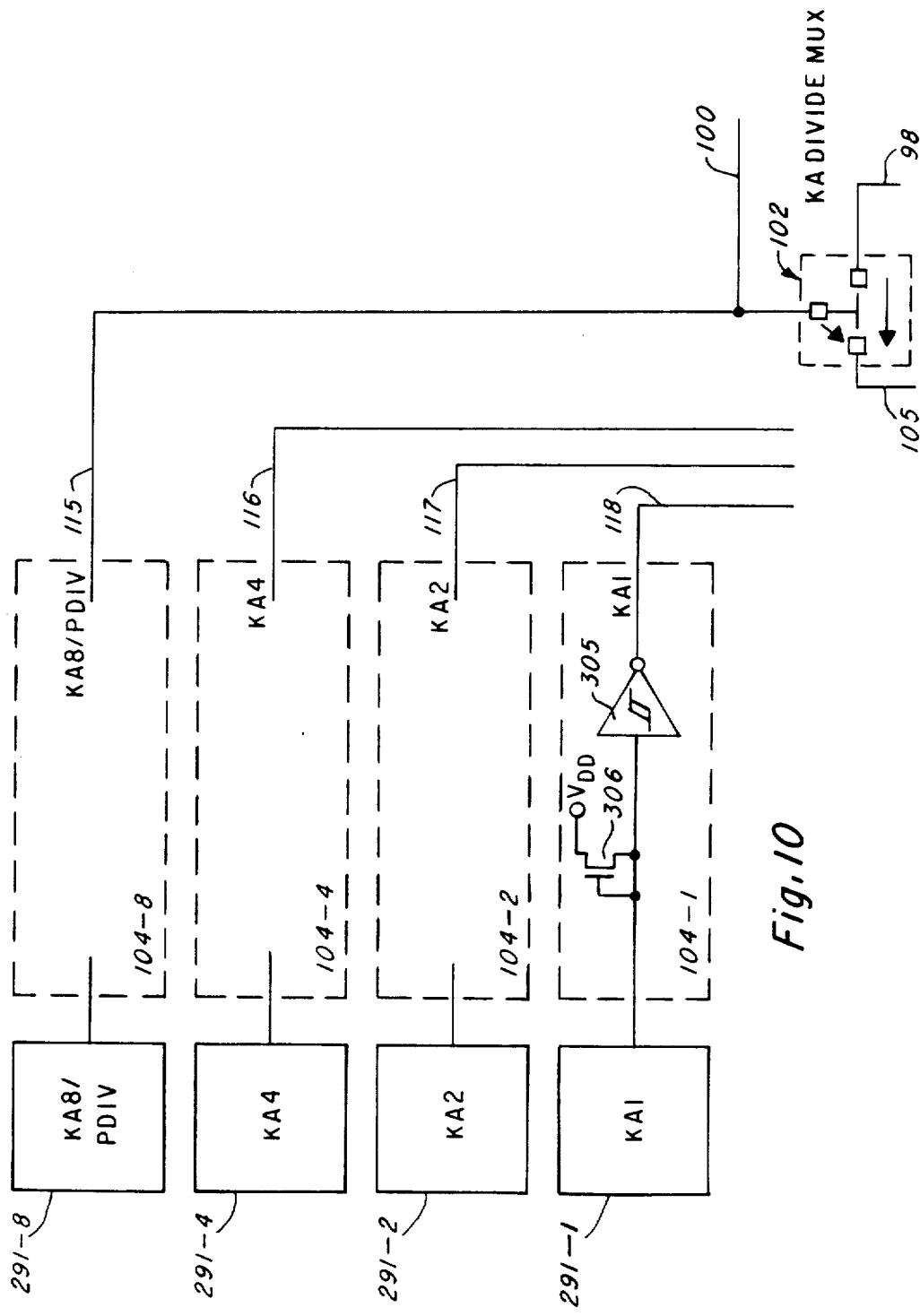
FIG. 10 is a schematic diagram of the CPU A inputs 104 and K input multiplexer 102.

Referring to FIG. 3a, the CPU A keyboard inputs 104 and CPU B keyboard inputs 155 provide the input data for the multiprocessor. FIG. 10 is an expanded view of CPU A keyboard logic 104. CPU A keyboard logic consists of four similar input blocks, 104-1, 104-2, 104-4 and 104-8. Referring now to block 104-1, the CPU A keyboard input least significant bit KA1 is input on pad 291-1 and enters block 104-1 which contains a Schmitt trigger 305 for squaring the waveform of the input signal and the associated circuitry 306 to provide the data on line 118. Likewise, input pads 291-2, 291-4 and 291-8 provide input data onto lines 117, 116 and 115, respectively. Line 115 enters a switch 102 and also provides information on line 100. Switch 102 is user programmable and allows the user to either input data directly from pad 291-8 or to use divider 97 by sending information obtained on pad 291-8 to the divider via line 100 and receiving the output from the divider via line 98 input into the switch 102 as shown. Line 105 is the output of this switch and provides this input information to the multiprocessor unit.

Figure 11:
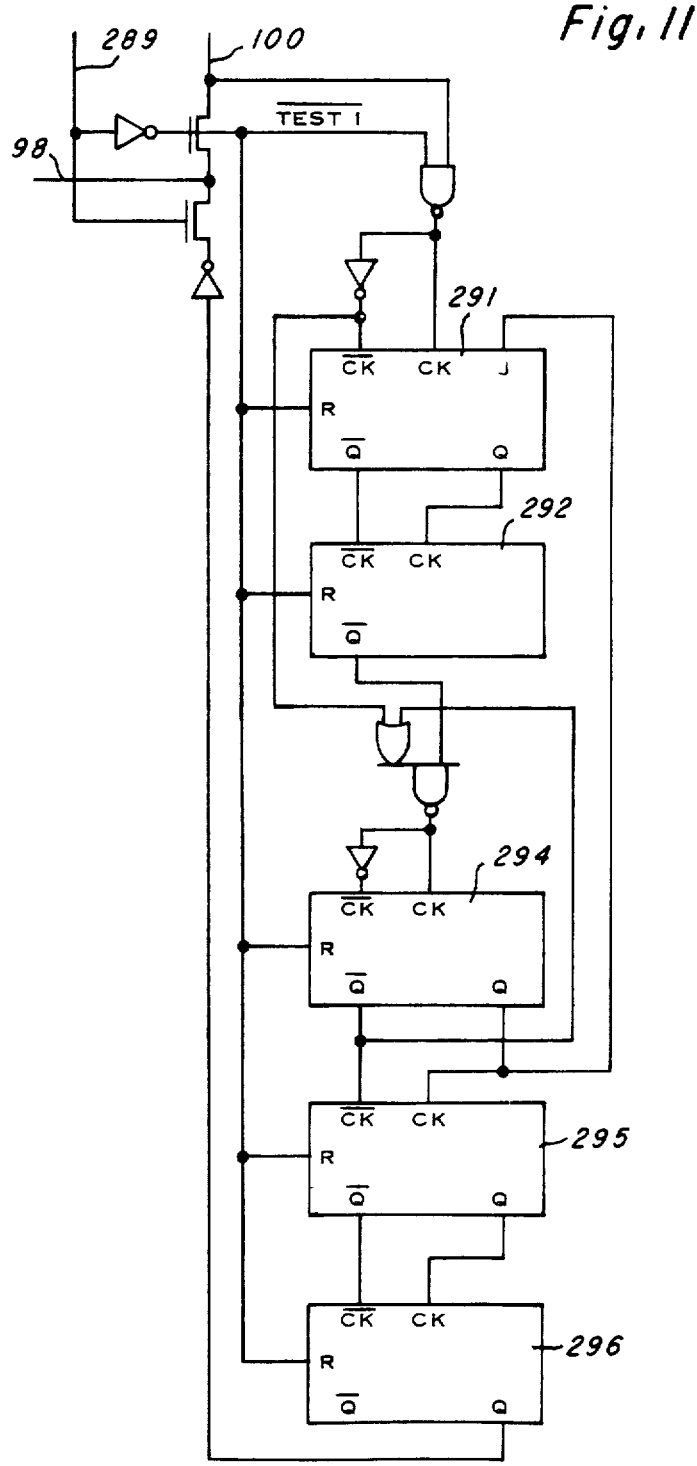
FIG. 11 is a schematic of the CPU A K input divider circuitry 97.

Referring now to FIG. 11, the divider 97 is shown. The input to the divider is provided by line 100 which is referred to earlier and originates from input pad 291-8. The output divider is a simple divider circuit made up of flip-flops 291, 292, 294, 295 and 296. This divider provides the divide by 2, divide by 10 or divide by 20 signal over the output line 98. Also provided is an input line 289 which resets divider 97 to 0 during initialization and bypasses divider 97 during tests.

Figure 12:
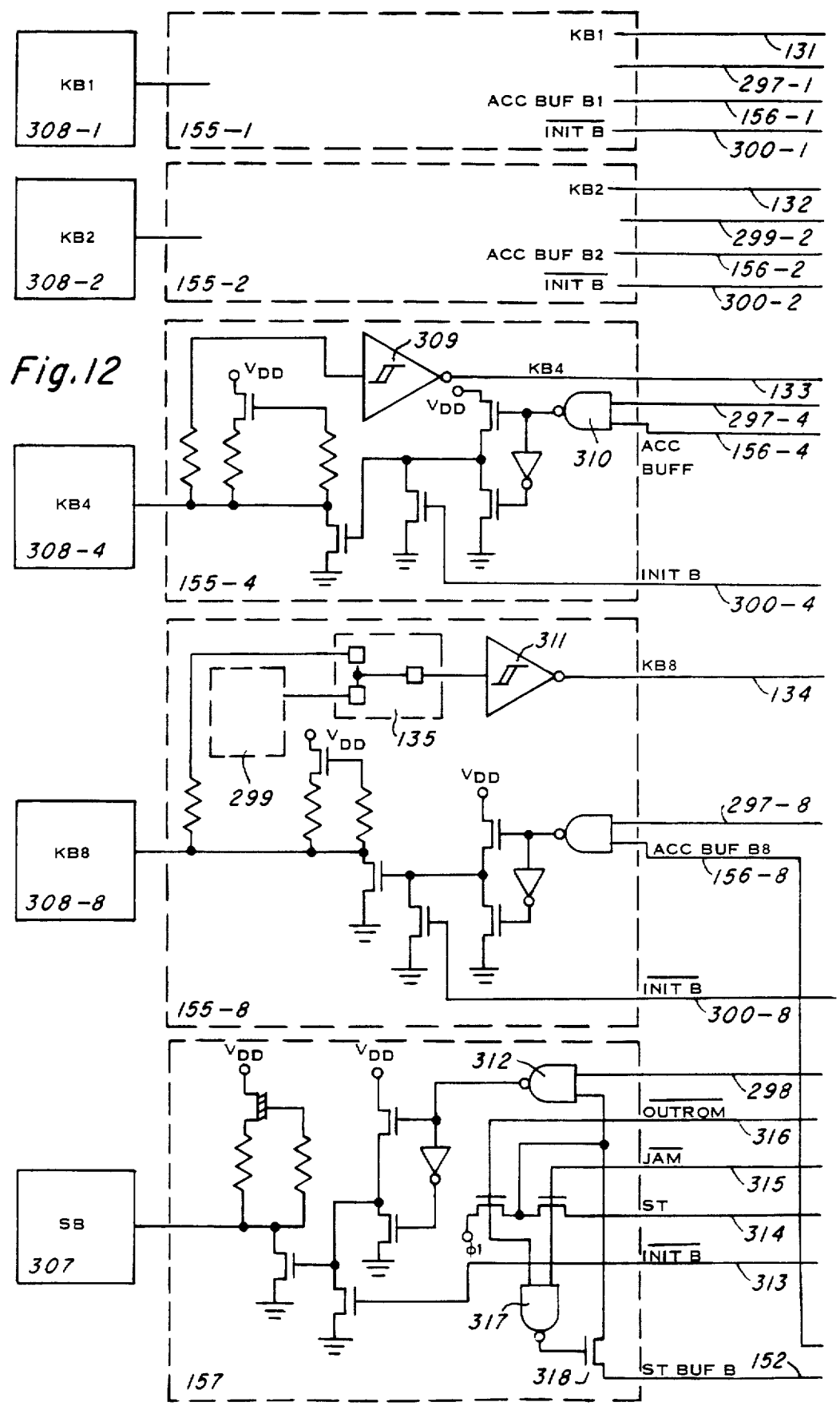
FIG. 12 is a schematic diagram of the CPU B inputs 155 and status bit circuitry 157.

Referring now to FIG. 12, the CPU B keyboard input 155 is shown together with the status bit output block. CPU B keyboard inputs are shown in FIG. 12 as four component blocks, 155-1, 155-2, 155-4 and 155-8. Blocks 155-1, and 155-2 and 155-4 are similar as shown in 155-4. Block 155-4 receives an input signal from the keyboard input pad 308-4 and transmits that input signal through a Schmitt trigger 309 onto line 133. A special design feature of this multiprocessor allows the keyboard inputs to CPU B to also be used as outputs. The determination of whether the pads 308-1 to 308-8 are input or output are made under program control using instructions TDO and IOC. TDO forces the input/output blocks 155-1 to 155-8 into an output mode such that output data can be provided on pads 308-1 to 308-8. Under the output conditions, blocks 155-1 to 155-8 receive the output information over lines 156 as shown in FIG. 3A. Referring back to FIG. 12, lines 156-1, 156-2, 156-4 and 156-8 are illustrated as inputs into blocks 155-1 to 155-8, respectively. Referring now to block 155-4, this input signal from the output register B 159 (as shown in FIG. 3A) is input into a gate 310 via line 156-4 together with the control line 297-4 which originates from a switch illustrated in FIG. 13. This signal switches the block 155-4 into the output mode when it is high allowing line 156-4 to output the bit information through pad 308-4. Block 155-4 also receives an input 300-4 which is the initialization signal and zeros the contents of this block. Block 155-8 includes another option available to the user. That option is a zero cross detection circuitry contained in block 299. The user has the option to either select the input directly from the pad 308-8 or the input from this zero cross detection circuitry. This zero cross detection capability allows the user to make the 60 Hz power signal a basis for system timing. The user choses either option by programming switch 135 to either select the input from pad 308-8 or to zero cross circuitry detection 299. Whichever signal is selected is then transmitted through Schmitt trigger 311 to line 134. The remaining circuitry in block 155-8 is as explained in block 155-4.

Block 157 serves two purposes. The first purpose under normal conditions is that it provides status latch information from Output Register B 159. This information is provided over line 158 and is gated with line 298 in gate 312. Line 298 contains the output command from the switching circuitry shown in FIG. 13. During test mode if line 316 is active, then $\phi 1$ will be output on the SB pad 307. If line 315 is active which implies in turn that line 316 is inactive, then the status (ST) will be output on SB pad 307. During test mode, either lines 316 or line 315 will remove line 158 containing CPU B status information and substitute line 314 which contains status of both CPU A and CPU B during test. Line 313 is an initialization line that zeros the contents of block 157 during initialization.

Figure 13:
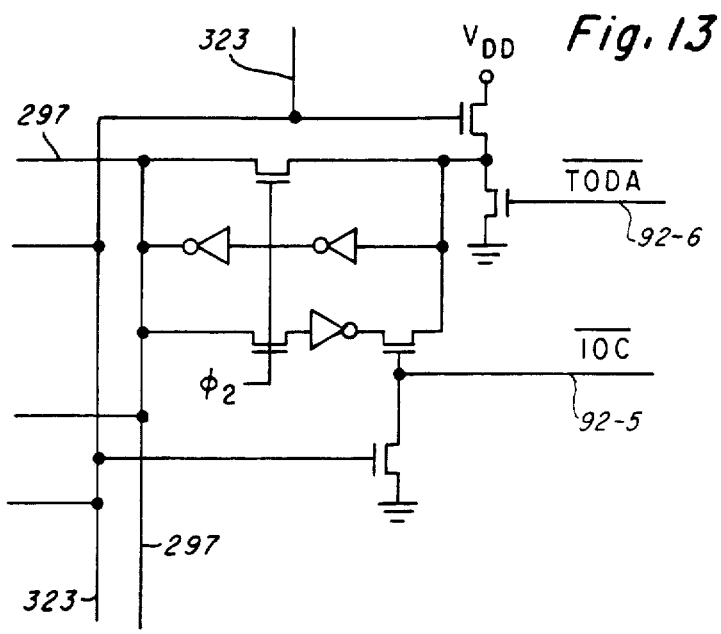
FIG. 13 is a schematic diagram of the switch which changes the CPU B inputs to the CPU B outputs.

FIG. 13 illustrates the switch used to change the keyboard input logic 155 to output logic for CPU B. This circuitry receives an input signal on line 320 which is activated when the TDO instruction is executed. This signal will force the switch to force the keyboard CPU B keyboard input 155 into an output mode. The circuitry in FIG. 13 also receives input 321 which is a signal that becomes active when the IOC instruction is executed. This instruction causes the circuitry to toggle from either input to output or output to input. The output of this switch is transmitted on line 297. Line 323 is also provided for initialization which will force the circuitry into the input mode.

Figure 14:
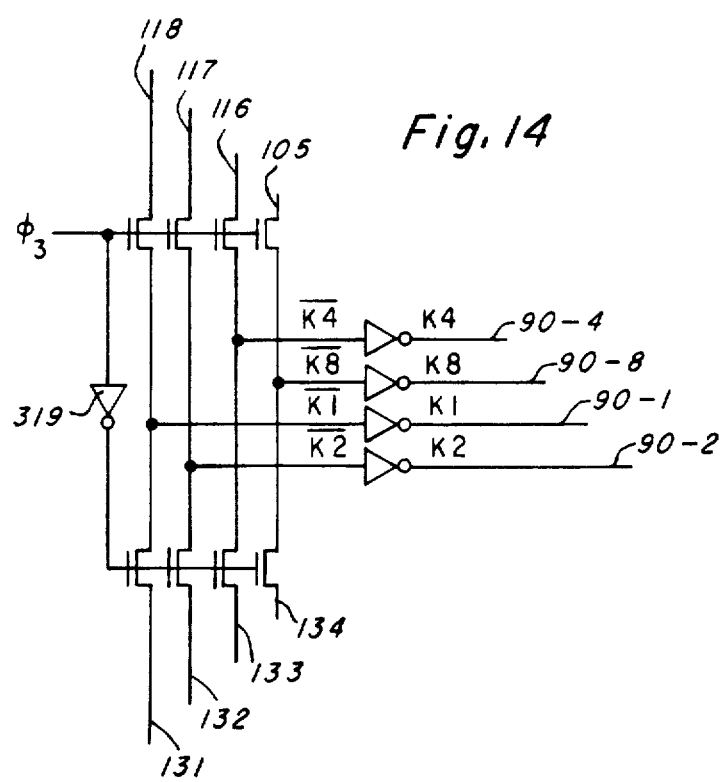
FIG. 14 is a schematic diagram of the K input multiplex circuitry 106.

FIG. 14 illustrates the MUX 106 shown in FIG. 3A. This circuitry receives lines 118, 117, 116 and 105 from the CPU A keyboard input circuitry 104 as discussed earlier and lines 131, 132, 133 and 134 from the CPU B keyboard input 155. The timing signal $\phi 3$ selects the inputs from the CPU A keyboard input circuitry 104 when $\phi 3$ is low and when $\overline{\phi 3}$ is high, the inverter 319 selects the inputs from CPU B circuitry 155. The selected lines are output via lines 90-1, 90-2, 90-4 and 90-8.

OUTPUT

Figure 15:
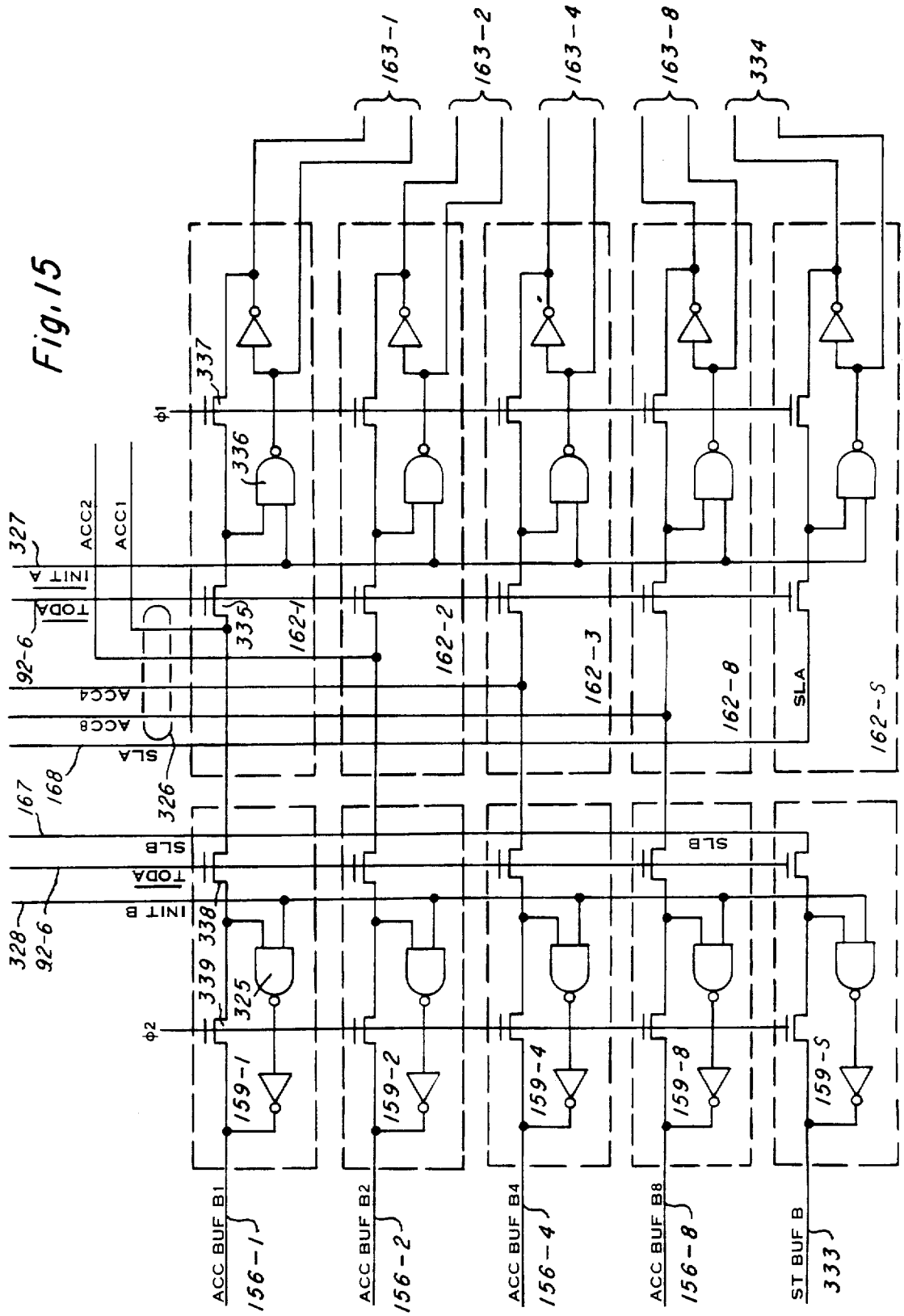
FIG. 15 is a schematic diagram of the CPU A output buffers 162 and the CPU B output buffers 159.

FIG. 15 illustrates the output registers A 162 and B 159. Output register A 162 contains the outputs for CPU A and output register B 159 contains the outputs for CPU B. Included are buffers for the status latch data for both CPU A and CPU B. The buffer for CPU A 162 can be divided into five parts labeled 162-1, 162-2, 162-4, 162-8 and 162-S. Sections 161-1–162-8 are dedicated to the outputting of the accumulator via lines 326 which in the CPU A mode corresponds to line 161 in FIG. 3a. Section 162-S transmits the status latch data of CPU A. In Section 162-1 the accumulator bit is input from the line group 326 through a clocking device 335. Device 335 is active when the TDO instruction is executed in CPU A. This line is then clocked into gate 336 when line 327 equals "1". Line 327 becomes active when CPU A is initialized thus zeroing out the output buffer 162. The accumulator data input is clocked in through device 337 when $\phi 1$ becomes active and the output is upper line of pair line 163-1. The remaining four sections of 162 work in a similar manner. Section 162-2 transmits the second accumulator line over line pair 163-2. Section 162-4 transmits the fourth accumulator line over line pair 163-4. Section 162-8 transmits the eighth line from the accumulator over line pair 163-8. Section 162-S then transmits the status latch data of CPU A over line pair 334. Adjacent to block 162 in FIG. 15 is block 159 which contains the output buffer for CPU B. The output buffer for CPU B 159 can be divided into five sections. The first section 159-1 is typical of all five and receives an input from the accumulator. Section 159-1 receives input from the first accumulator line in the group lines 326 which is transmitted through device 338 when the TDO instruction is executed in CPU B. This data is further gated through device 339 when $\phi 2$ is low. Gate 325 is connected to this accumulator line and a line 328 which becomes active when the CPU B is initialized. When gate 325 becomes inactive, the CPU B outputs are zeroed. The operations of the other five sections of ths output buffer 159 are similar. In particular section 159-S outputs the CPU B status latch data obtained from line 167 to line 333 in a manner similar to the output of the accumulator information in 159-1. Lines 156-1 to 156-8 are then output to CPU B keyboard blocks 155-1 to 155-8, respectively. The status latch data output on line 333 is transmitted to status pad SB 157.

Figure 16:
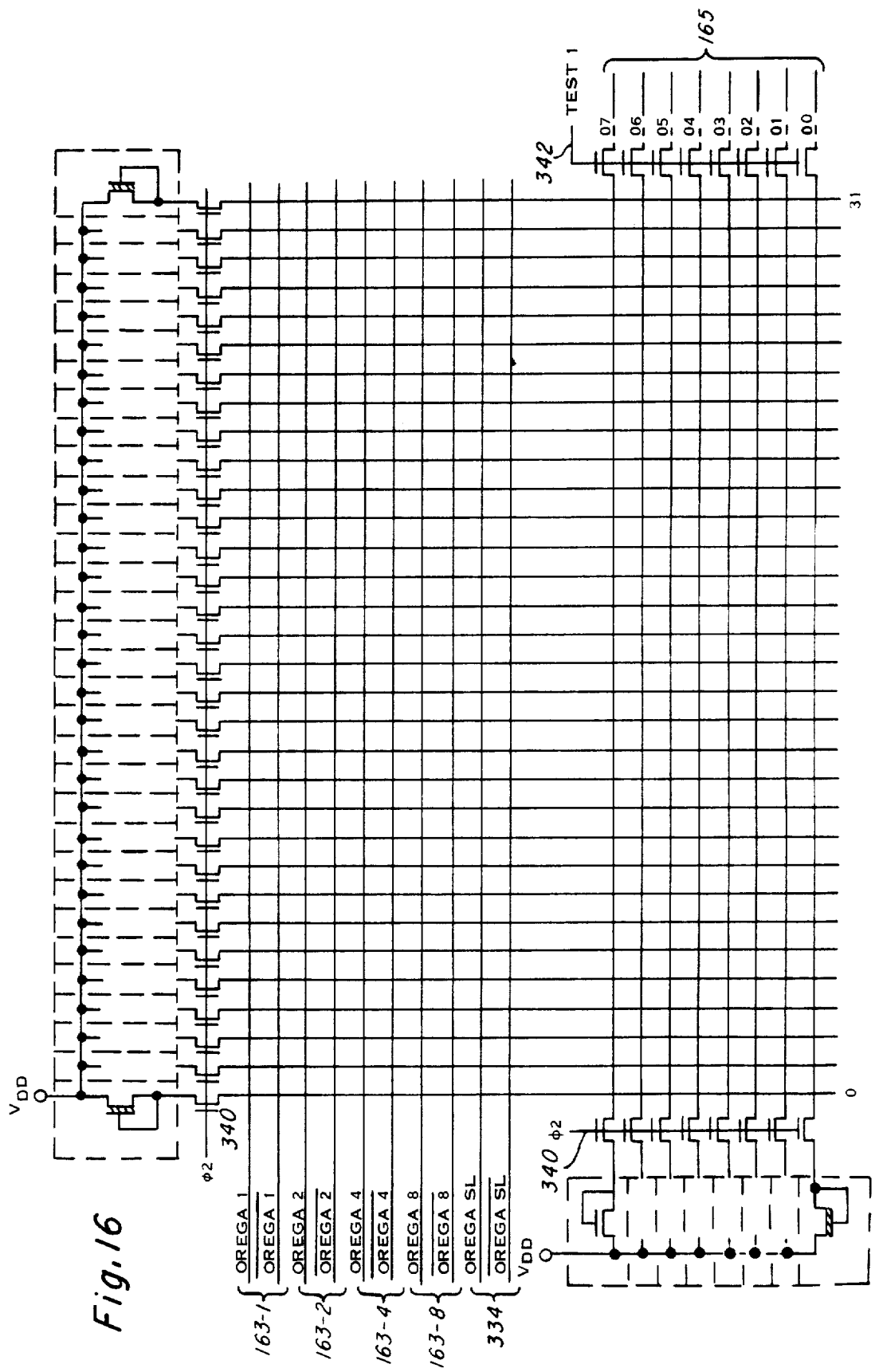
FIG. 16 is a schematic diagram of the CPU A output programmable logic array 164.

FIG. 16 illustrates the programmable logic array 164. The programmable logic array is a 32 term segment device which will be programmed by the user and provide the 8 outputs on lines 341 when $\phi 2$ is low on line 340. Line 342 is provided to disconnect the programmable logic array 164 during the test mode which down-loads the ROM contents to the output pads 165 and also during the random logic test which converts output pads 165 to the random logic input.

Figure 17:
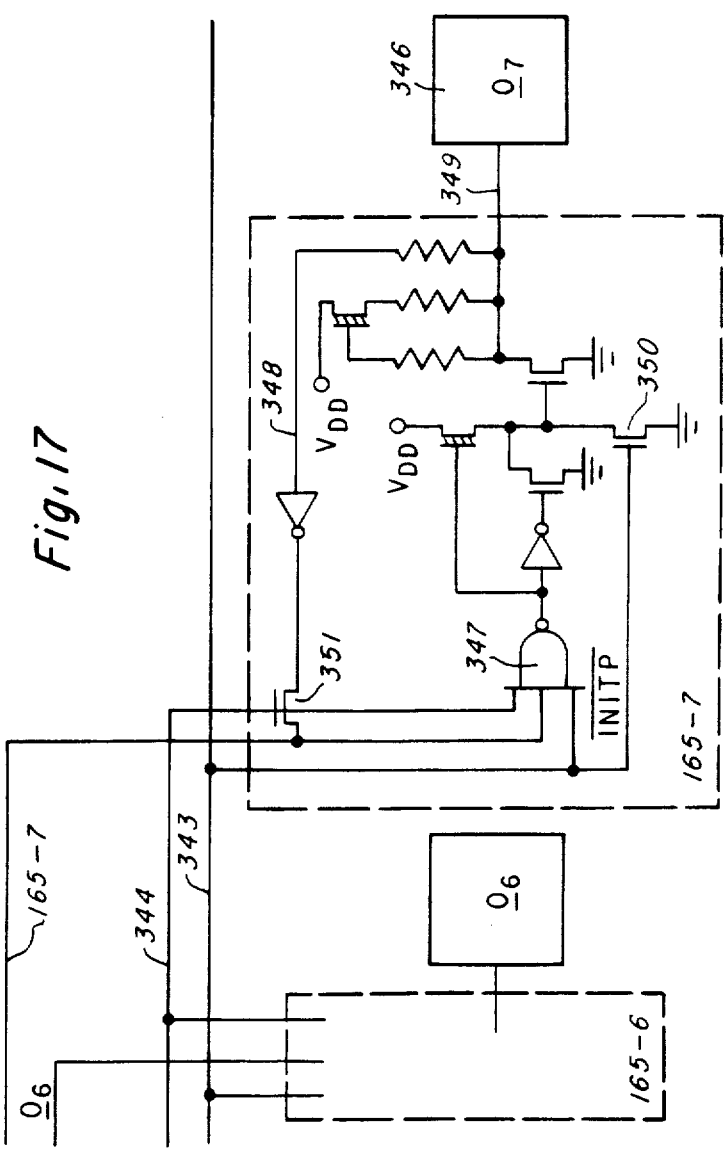
FIG. 17 is a schematic diagram of the CPU A output circuitry 165.

FIG. 17 illustrates 2 of the 8 CPU A output ports 165. Output pads 341-7 receives three input signals, 341-7, 344 and 343. All three inputs are coupled to gate 347 which allows the signal on line 341-7 to be output when the system is not under test per line 344 or the system is not under initialization per line 343. When line 343 is active under initialization, it also zeros the output via device 350. The output pads 165 have a special function during test. Under one test, they are used as output ports to download the ROM 6. In one mode of the second test, they are used to load instructions over the instruction bus. When the first part of the second test is performed, line 344 becomes active thus blocking any output to section 165-7 through gate 347 as previously mentioned and allows for the inputting of information from pad 346 via line 349 into line 348 to line 341-7 as controlled by device 351. All other sections in output pad 165 operate in a similar manner. During the second phase of this second test the output pads 165 are returned to the output mode.

PROGRAM COUNTER

Figure 18:
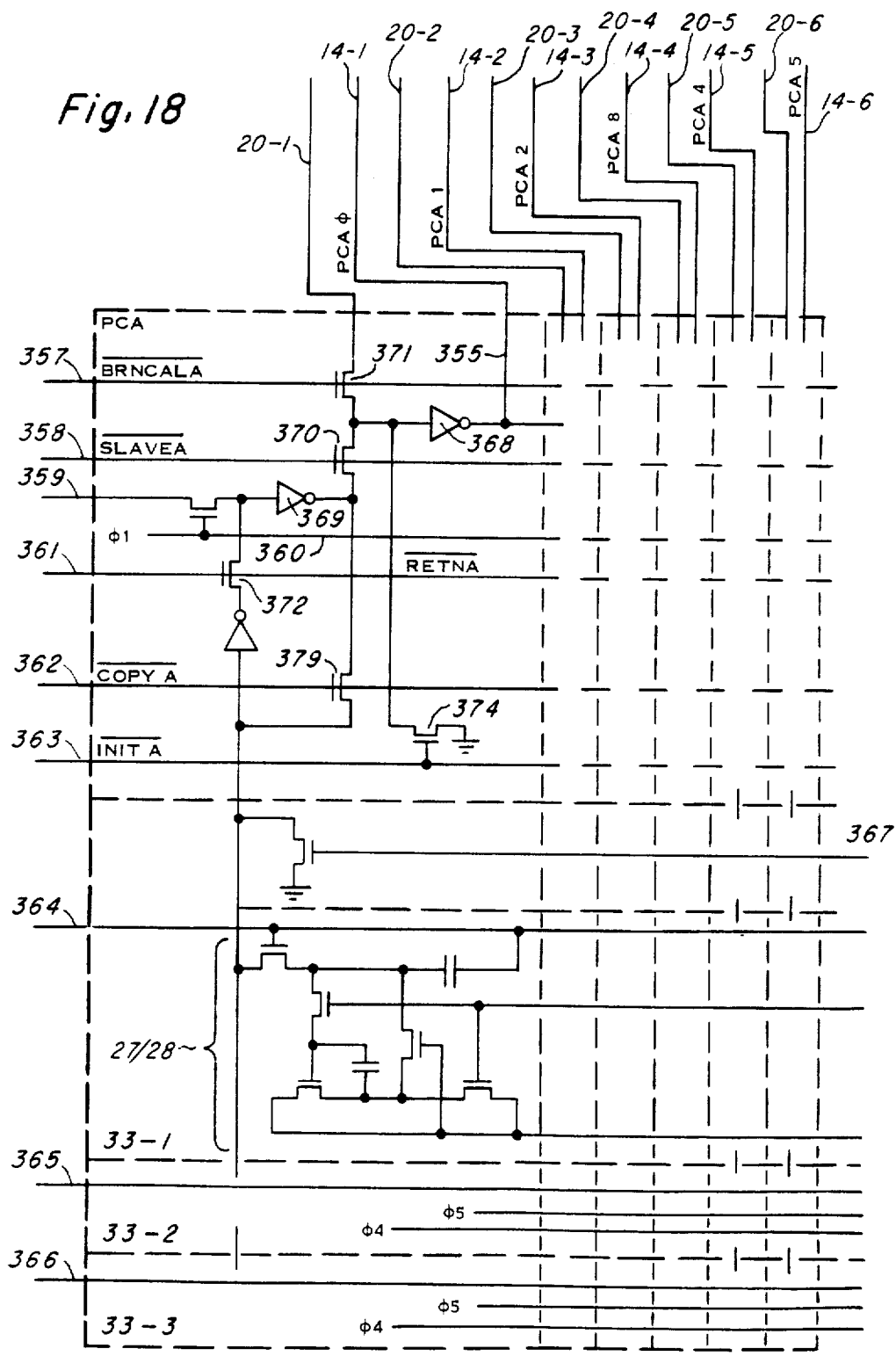
FIG. 18 is a schematic diagram of the CPU A program counter 19.

FIG. 18 illustrates program counter 19 as illustrated in FIG. 3B. The program counter A 19 is identical to program counter B 40 except that program counter A 19 contains the program counter for CPU A and program counter B 40 contains the the program counter for CPU B. In addition, $\phi 1$ signal is for program counter A 19 and $\phi 2$ is for program counter 40. Otherwise the internal architecture is the same. Therefore, only program counter A 19 will be illustrated and discussed. FIG. 18 also illustrates subroutine register A 33 and its relationship with program counter A 19. It should be noticed that subroutine register A 33 is divided up into three sections, 33-1, 33-2 and 33-3; 33-1 contains a RAM cell 376 for storage of the program counter during the execution of a subroutine. Sections 33-2 and 33-3 have similar architectures. It should also be noted that both the program counter and the subroutine register are divided into six vertical sections representing the six bits of information output from the program counter A 19. Only the left-most section for both the program counter and the subroutine register are shown since the remaining sections are similar. The program counter A 19 has four basic modes of operation-normal, branch, subroutine and initialization. In the normal mode, the program counter receives signal 358 which allows the information contained in inverter 369 to be input into inverter 368 by device 370. The bit information contained in 368 is then output on line 355 which is the output for the program counter A 19. The information on line 355 goes to both the ROM PC decoder A during $\phi 1$ ($\phi 2$ for CPU B) and the feedback circuitry shown in FIG. 19 in order to access the next instruction. Under normal operations, the instruction counter outputs illustrated as PCA0 through PCA5 which are fed through the feedback circuitry illustrated in FIG. 19 in order to provide the next instruction address by line 359. Upon the occurrence of $\phi 1$, the information on 359 is then loaded into gate 369 and at the occurrence of the next $\phi 2$ clock, the line 358 is activated allowing device 370 to pass the data in from device 369 to 368. It should be noted that this is a feedback register and does not count in the normal binary fashion, i.e., 00,01,10,11 etc. Rather, it is a pseudo random program counter which shifts a 1 through the shift register and then shifts a 0 and so forth. The sequential count for the shift register is 000,001,011,111, etc. Therefore, as long as the program counter is in normal operation, the feedback register will provide the additional bit to the program counter to increment the address.

The next mode that the program counter operates in is the branch mode. Upon the occurrence of the branch mode, a signal on line 357 activates device 371 which allows the new branch address contained in the instruction from the ROM to be input into the program counter or more specifically into inverter 368. The ROM loaded program address then appears on the program counter lines PCA0 through PCA5. Therefore, upon the activation of φ1 the information contained on line 359 will be the new branch address plus 1, resulting from being transmitted through the feedback circuitry. This new address is then stored in inverter 369 and upon to normal operation, the activation of line 358 will cause the new program address to be loaded into inverter 368. Therefore the execution of a branch instruction will cause the new address to be loaded directly from the ROM and from that point on, under normal operations, the program counter will be incremented from the new address.

The next mode of operation is on the execution of a call instruction where the program counter must store its incremented address into one of the subroutine registers in 33. When a call is executed, line 357 becomes active upon φ2 and allows the address from the ROM to be loaded into the program counter via line 356 and the remainder of lines 375. At the same time, the old address plus 1 which was contained in inverter 369 is loaded into the subroutine register 33-1 through device 373 which has been activated by line 362 which becomes low when the call instruction is executed. This allows this bit of information to be stored in the RAM cell 376. This RAM cell is identical to the one in U.S. Pat. No. 3,958,818, assigned to Texas Instruments which is hereby incorporated by reference. Concurrent with the old address being destroyed, the old address incremented is stored in the RAM and the new address is stored. The execution continues at the new subroutine address and this address is fed through the feedback circuitry as in a normal operation. When a return statement is encountered and executed, the old address incremented then stored in cell 376 is then loaded into inverter 369 through gate 372 which is activated by the return signal on line 361. On the execution of the next φ2, line 358 activates device 370 and the incremented old address is then loaded into inverter 368. The determination of which RAM cell, 33-1, 33-2 or 33-3, is to contain the old program address is determined by lines 364, 365 and 366 which are output from the subroutine latches 34 to be discussed later. These three lines represent the three levels of subroutine capability available. A "1" in either 364, 365 or 366 will determine which of the RAM cells will contain and store the old incremented program address.

The remaining mode of operation for the program counter is the initialization mode. During initialization line 363 becomes active thus allowing device 374 to ground the contents of inverter 368. Initialization is required to take such time as to allow inverter 369 to be initialized. This is accomplished through the feedback circuitry operation on line PCA0 through PCA5 and the occurrence of φ1 which in turn loads the incremented initialization address into inverter 369.

Figure 19:
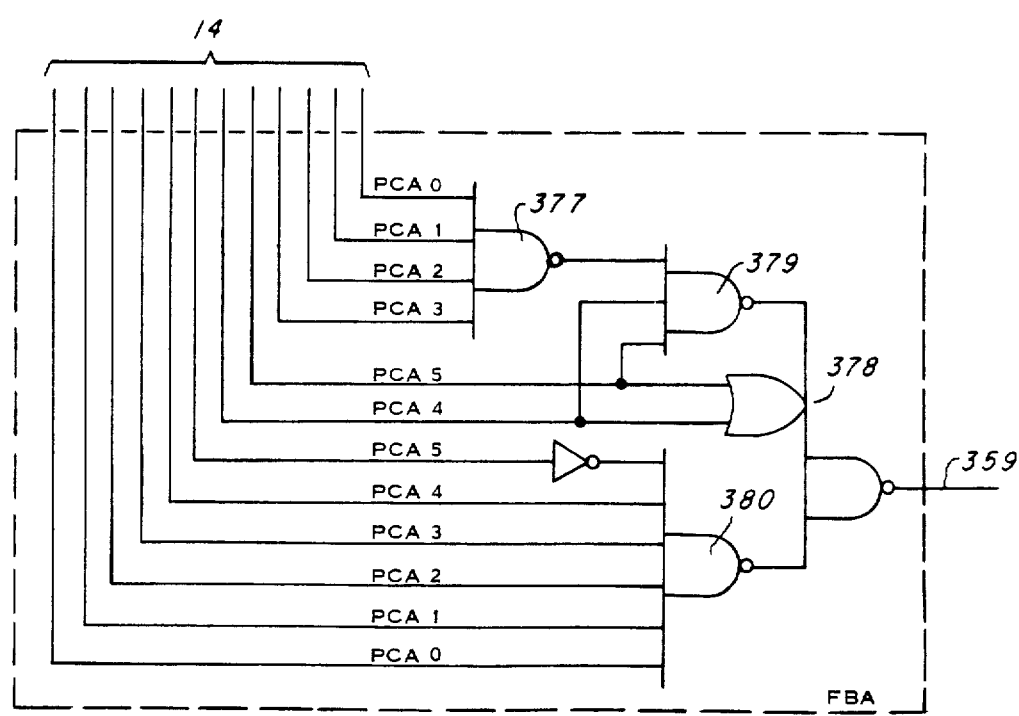
FIG. 19 is a schematic diagram of the feedback circuitry included in the program counter 19.

Referring now to FIG. 19, the feedback circuitry is made up of a set of complex gates 377, 378, 379 and 380. These gates function to feed the output of the program counter and provide the incremented signal on line 359 as previously discussed.

SUBROUTINE LATCHES

Figure 20:
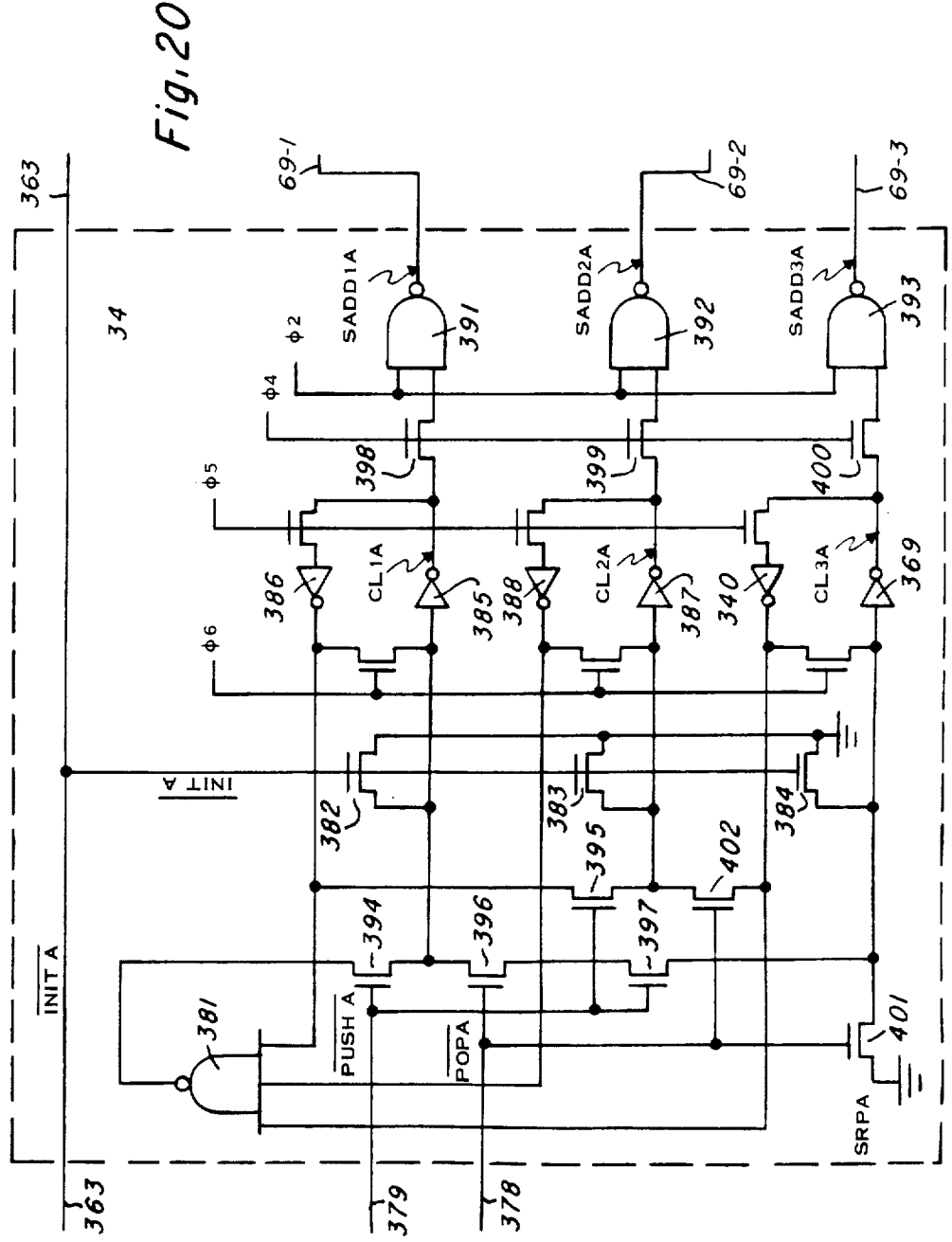
FIG. 20 is a schematic diagram of the CPU A subroutine latches 34.

FIG. 20 illustrates the subroutine latches 34 for CPU A. The subroutine latches 55 for CPU B are similar. Thus only subroutine latches 34 will be illustrated and discussed.

Subroutine latches 34 contain three levels of subroutines. The highest subroutine level occupied is signified by this circuitry through lines 364, 365 or 366 outputting a "0" whereas the others output a "1". In other words, if level 1 is occupied, 69-1 will output a "0" and lines 69-2 and 69-3 will be "1". If level 3 is occupied, then lines 69-1 and 69-2 will be "1" and line 69-3 will be "0". Upon initialization devices 382, 383 and 384 are activated from the initialize signal on line 363 thus grounding inverters 385, 387 and 389 causing the outputs of the subroutine latches 69-1, 69-2 and 69-3 to be "1". Line 379 becomes active when a valid call has been executed. A valid call is defined as a call instruction occurring and when the status line is high. When line 379 becomes active, device 395, 394 and 397 are activated. At that time, a "0" is loaded into inverter 385. The output of inverters 385 and subroutine latches CL1A is then passed through device 398 upon the occurrence of φ4 and through gate 391 when φ2 goes low (when φ1 goes low for CPU B) onto line 69-1 which cause the first level of subroutine registers to be addressed. The incremented program counter address is now copied into the subroutine Register 33. Subordinate latches CL1A is a shift register latch known as a mster/slave register latch. The contents of inverter 385 is transferred into inverter 386 upon the occurrence of φ5. The contents of 386 is the complement of the contents of 385. Upon the occurrence of φ6, the contents of 386 is then stored in 385 again. Upon the occurrence of another valid call, line 379 becomes low again activating device 395. Gate 381 becomes a "1" because the output of inverter 386, 388 and 390 are not all "1". When level 1 is occupied, the contents of 386 is "0" and thus the activation of device 395 will cause a "1" to be stored in inverter 387. At this time a "0" is then stored in inverter 385. Therefore, the output of CL2A becomes a "1" and is transmitted through device 399 upon the occurrence of φ4 and through gate 392 when φ2 drops and line 69-2 goes low. Upon the occurrence of a third valid call line, 379 becomes low again thus activating device 397 which loads a "1" into inverter 389 and "0"s inveter 387, thus the "1" travels to the third level causing line 69-2 to be "1" in order to load the third subroutine RAMs in the subroutine register A 33. If an additional call is executed, the circuitry will not change and the program counter will branch to the new call address. When a return statment is encountered, as in this case with all three levels occupied, line 378 becomes high, activating gate 401 allowing the contents of inverter 389 to be grounded. Therefore, the output on line 366 will become "0". Likewise when another return is executed, device 402 becomes active thus zeroing the contents of inverter 387 and causing line 365 to return to "0". A third return will cause line 378 to become low and device 396 to become active which zeros inverter 385 and thus the three latches will return to their original state. Additional returns will be treated as "No ops".

CHAPTER ADDRESS REGISTER AND CHAPTER BUFFER REGISTER

Figure 21:
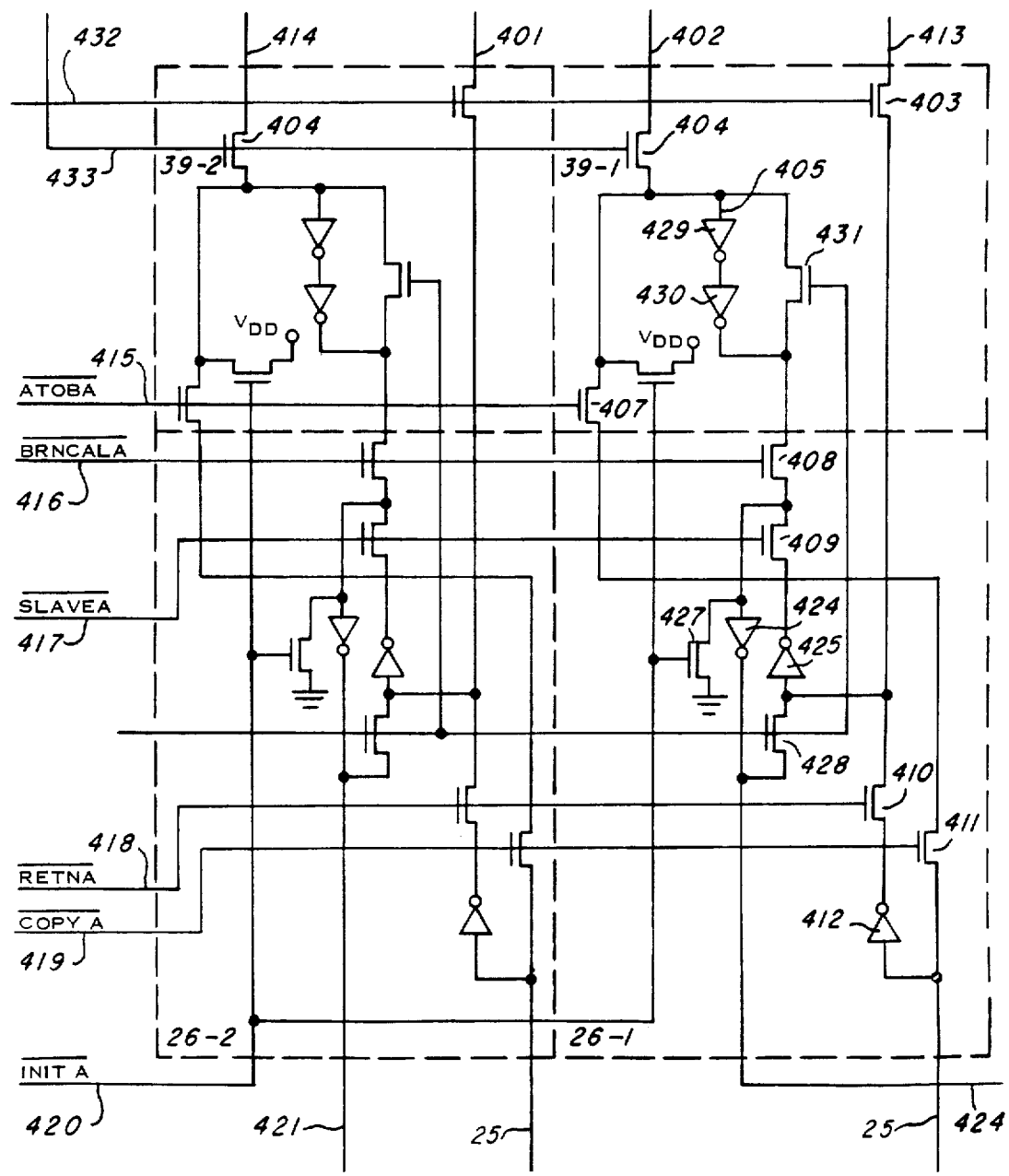
FIG. 21 is a schematic diagram of the CPU A chapter address register 26 and chapter buffer register 39.

FIG. 21 illustrates the chapter register 26 and chapter buffer register A 39 shown in FIG. 3b. Chapter register 26 and chapter buffer register B 39 are dedicated to CPU A. Chapter buffer register B 61 and chapter register B 47 are dedicated to CPU B and are identical to the CPU A chapter registers.

Referring now to FIG. 21, the chapter register and chapter buffer register are shown in sections. The chapter buffer register is shown as 39-2 and 39-1 in the upper part of the drawing. Each section in the chapter buffer register is responsible for 1 bit of information to be transferred to the chapter register. Each section is identical to the other, so therefore, only 39-1 will be discussed. Likewise in the bottom part of the drawing, the chapter register consists of two sections, 26-1 and 26-2, which are identical and therefore only 26-1 will be discussed.

In 26-1 the actual storage of bit information in the chapter register is contained in inverters 425 and 426 which operate in a master/slave register latch similar to that discussed earlier. During normal operations, a signal from line 417 which corresponds to $\overline{\phi 2}$ ($\overline{\phi 1}$ in CPU B) recirculates the data from inverter 425 into inverter 426. This is done through device 409 which is active when line 417 is low. The data is refreshed back into inverter 425 upon the occurrence of $\overline{\phi 1}$ ($\overline{\phi 2}$ in CPU B) causing the device 428 to pass the information from inverter 426 to inverter 425. The output of the contents of the chapter register is available on line 424 which is the contents of the inverter 426. Likewise, for chapter register section 26-2, the output is on line 421. During normal operation the chapter address in inverter 426 is simply refreshed with inverter 425 and remains constant. During a branch operation, the new address must be loaded from the chapter buffer register A 39-1. The information in the chapter buffer register is contained in inverter 430. Inverter 429 is refreshed by inverter 430 during $\overline{\phi 1}$ ($\overline{\phi 2}$ for CPU B) by device 431. During a branch operation, line 416 goes low thus activating device 408 allowing the address contained in inverter 430 to be loaded into inverter 426. The address that is originally loaded into the chapter buffer inverter 430 originates from line 420 which is the output of the page buffer. The transfer occurs when device 404 is active upon the execution of a TPC instruction, transfer of page buffer to chapter buffer instruction, thus activating line 433. The data from line 402 is then refreshed again when $\overline{\phi 1}$ ($\overline{\phi 2}$ for CPU B) activates device 431. When a branch occurs and the information in inverter 430 is transferred into the chapter address register and inverter 426. Line 415 becomes low during $\overline{\phi 2}$ ($\overline{\phi 1}$ for CPU B) of the branch operation; therefore, the information transferred from the page address buffer register into the chapter buffer register is inverted at first into inverter 429 and then inverted in inverter 430. Upon execution of a branch instruction the contents of inverter 430 is loaded through device 408 during $\overline{\phi 2}$ into inverter 426 of the chapter address register.

During a long subroutine call execution, the subroutine chapter must be loaded prior to the execution of the call instruction with the TPC instruction. This will cause the subroutine chapter to be loaded into the chapter buffer inverters 429 and 430 as previously discussed. Upon the execution of the call instruction then, the address is the chapter address register inverter 426. During the call mode the chapter is loaded into the subroutine RAM via line 25 through device 411 which becomes active during the execution of the call instruction, thus line 419 is a "0" during $\phi 5$ contained within the low time of $\phi 2$. At the same time, line 416 is low thus device 408 passes the chapter subroutine address from inverter 430 into the chapter address register inverter 426.

During the return mode the chapter address register is loaded with the contents of the chapter subroutine register via line 25 through inverter 412 and device 410 which becomes active when line 418 goes low as the result of the execution of the return instruction. This occurs during $\overline{\phi 2}$ ($\overline{\phi 1}$ for CPU B). The original address is thus loaded into chapter address register inverter 425 to be circulated into the chapter address inverter 426. In addition, the contents of the chapter subroutine register is loaded into the chapter buffer register through device 407 which becomes active during ithe execution of the return instruction.

During initialization, the chapter buffer register A 39 is set to "0" by activating line 420 which causes device 406 to input a "1" into chapter buffer register inverter 429, thus causing a "0" to be loaded in the chapter buffer register inverter 430. The chapter buffer register data becomes "0". At the same time, line 420 causes device 427 to become active thus grounding chapter address register inverter 426 thus the output on line 424 will be "0". Lastly during a test phase, the contents of the chapter address register inverter 425 can be loaded from line 413 when device 403 becomes active. This allows the address to be loaded from the keyboard inputs during a ROM test.

CHAPTER SUBROUTINE REGISTER

Figure 22:
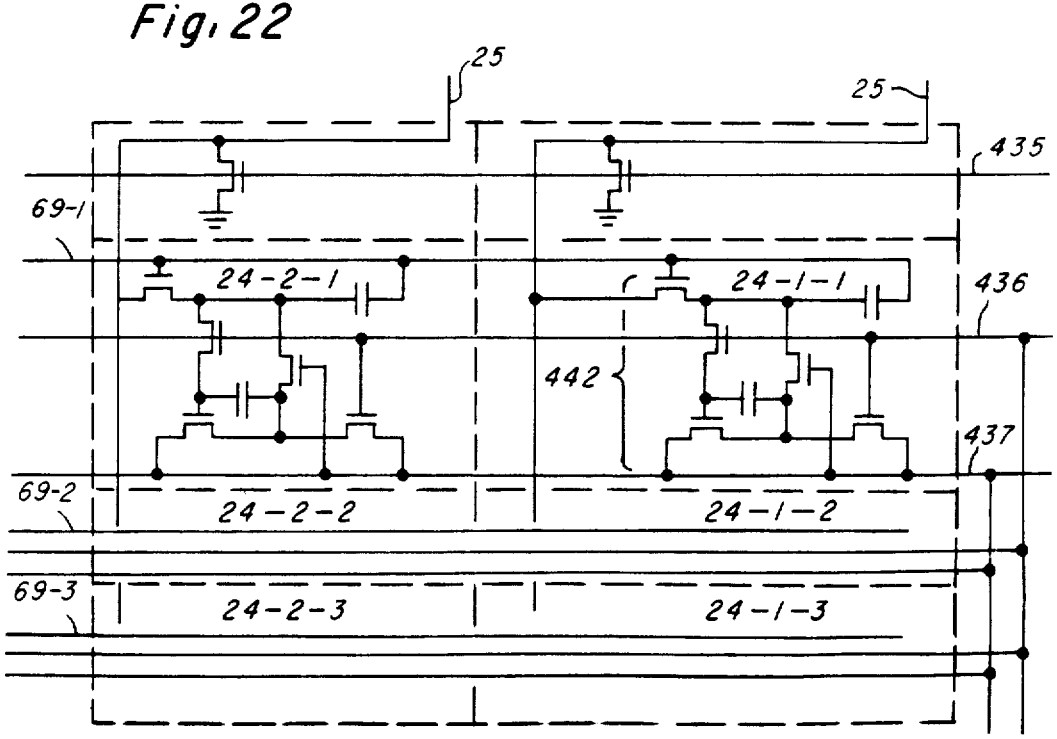
FIG. 22 is a schematic diagram of the CPU A chapter subroutine register 24.

FIG. 22 illustrates chapter subroutine register A 24 shown in FIG. 3B' and similar to chapter subroutine register B 45. This chapter subroutine register is divided into two sections, 24-1 and 24-2. Each section of the chapter subroutine register is further divided into the three levels of subroutine. For section 24-1, the division of three levels become 24-1-1, 24-1-2 and 24-1-3. Each level is identical to the first level as section 24-1 is identical to 24-2. Therefore, only section 24-1, level 1 will be discussed, i.e., 24-1-1.

The subroutine contains a RAM structure 422 and is similar to the RAM cell structure previously discussed. This RAM receives its input on line 423 from the chapter address register 425 previously discussed. This RAM cell is allowed to be loaded with this bit information when line 69-1 becomes low. Line 69-1 originates from the subroutine latches CLA 1-3 34 as previously discussed. The RAM cell is recycled and the Write to cell time is $\phi 5$ and Read from cell is $\overline{\phi 4}$ upon lines 436 and 437 as shown. Likewise the RAM cell in 24-1-2 may be loaded when line 365 is low from the subroutine latch and section 24-1-3 may be loaded when line 366 is low. Only one of these lines, 69-1, 69-2 or 69-3, will be a "0" during a subroutine cell as discussed previously.

PAGE ADDRESS REGISTER AND PAGE BUFFER REGISTER

Figure 23:
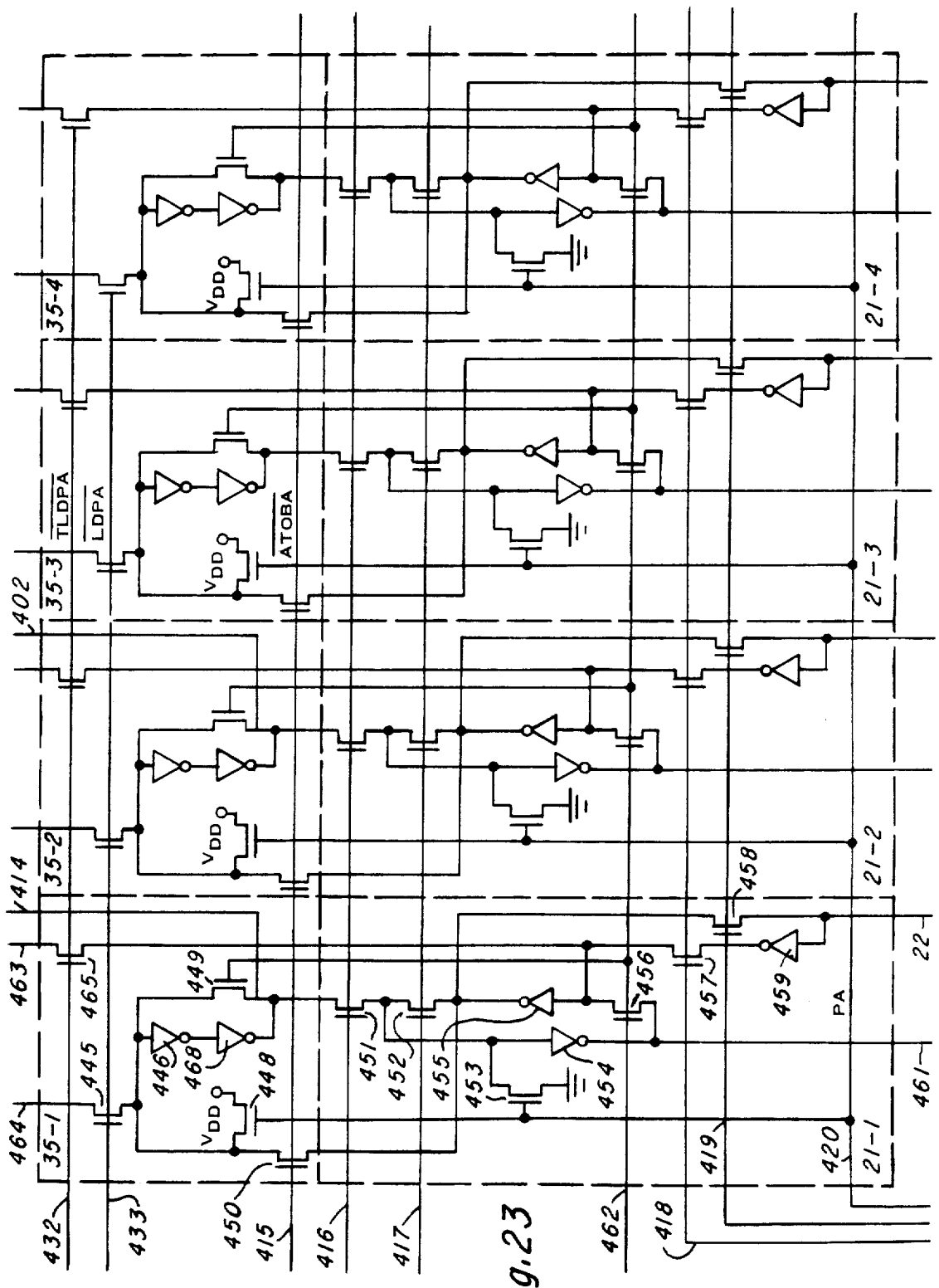
FIG. 23 is a schematic diagram of the CPU A page address registers 21 and the CPU A page buffer register 35.

FIG. 23 illustrates the page address register A 21 and page buffer register B 35 as shown in FIG. 3B' and similar to page address Register A 42 and page buffer Register B 47. The page address register A 21 can be divided into four sections, 21-1, 21-2, 21-3 and 21-4. representing the four bits of information contained in the page address register. Each section is identical and therefore only section 21-1 will be discussed. Likewise the page buffer register 35 can be divided into four sections, 35-1, 35-2, 35-3 and 35-4. Buffer registers 35-1 and 35-2 are identical. Buffer registers 35-3 and 35-4 differ from 35-1 and 35-2 in that the first two sections transfer their bit information into the chapter buffer register as previously discussed. Other than this small difference, these four sections are identical. Therefore, only 35-1 will be explained.

In normal operation, line 417 becomes low when $\phi2$ ($\phi1$ in CPU B) goes low, thus activating device 452. Device 452 is connected to inverter 455 and inverter 454 which is connected to another device, 456. These four elements make up master/slave latch a as previously discussed. The actual contents of the page address register for this section is contained in inverter 454 and is updated from inverter 455. Therefore, when device 452 becomes active, inverter 455 updates inverter 454. During the occurrence of $\phi1$ ($\phi2$ in CPU B), device 456 then takes the information from inverter 454 and updates inverter 455. As long as the CPU A is in normal operation, the circular refreshing cycle will continue. For the proper execution of a long branch instruction, the address of the new branch page must have been loaded into the page buffer register 35. The load page instruction lowers line 433 which activates device 455 to input the information on line 464 into the page address inverter pair 446 and 447. The information contained in 477 is always updated with the contents of inverter 446 and inverter 446 is updated with the information in inverter 447 when $\phi1$ is low ($\phi2$ in CPU B), thus activating line 462 which activates device 449. When the branch address is loaded, it remains in the page buffer register A 35. The branch command is executed which activates line 416 and device 451. This in turn allows the information on the page buffer register inverter 447 to be loaded through device 451 into the page address register inverter 454.

During the execution of a call subroutine instruction, the address of the subroutine page must have been loaded into the page buffer register A 35 prior to the execution of the long call instruction. This is accomplished by the load page into buffer instruction, LDP, which activates line 433, thus activating device 455 allowing the forthcoming subroutine address to be loaded over 464 into the page buffer register inverter 446. Upon loading the new subroutine address into the page buffer register inverter 446, the page buffer register inverter 447 is updated from page buffer register inverter 446 and the cycle is refreshed through device 449 when $\phi1$ ($\phi2$ for CPU B) on line 462 goes low. Upon the execution of the call instruction, line 416 becomes low thus activating device 451. Therefore, the new subroutine address contained in page buffer register inverter 447 is loaded into page address register inverter 454 through device 451. During $\phi5$ within $\overline{\phi2}$ ($\overline{\phi1}$ for CPU B), 419 goes low causing device 458 to be activated allowing the page address contained in inverter 455 to be loaded into the page address subroutine RAMs via line 22. The new page address loaded into inverter 454 of a page address register which is later output on line 461 to the ROM 6. Upon the execution of a return statement, the contents of the subroutine page RAM is loaded back via line 22 into the page address register A 21 and page buffer register A 35. When the return instruction is executed, line 418 becomes low, activating device 457. Therefore, the address contained within the subroutine RAM is transmitted through inverter 459 and device 457 back into the page address register inverter 455 and through device 452 into invertor 454. The page address is loaded into the page buffer register inverter 46 through device 450 which is active during the return instruction execution that covers line 415.

During initialization, the CPU A page address register state becomes 0000. The CPU A page buffer register contents becomes 0000. The CPU B page address buffer becomes 1111 and the CPU B page buffer register becomes 1111.

During a test mode, the page address can be loaded via the keyboard. In particular, line 432 is low during the test mode, activating device 465 thus allowing the keyboard information contained on line 463 to be input into the page address register inverter 455. Therefore, the ROM can be read out through the ROM lines by specifying the page address using the keyboard.

Lastly, the page buffer register section 35-1 and 35-2 can be loaded into the chapter buffer register 39 via line 414 and 402 as discussed previously.

PAGE SUBROUTINE REGISTERS

Figure 24:
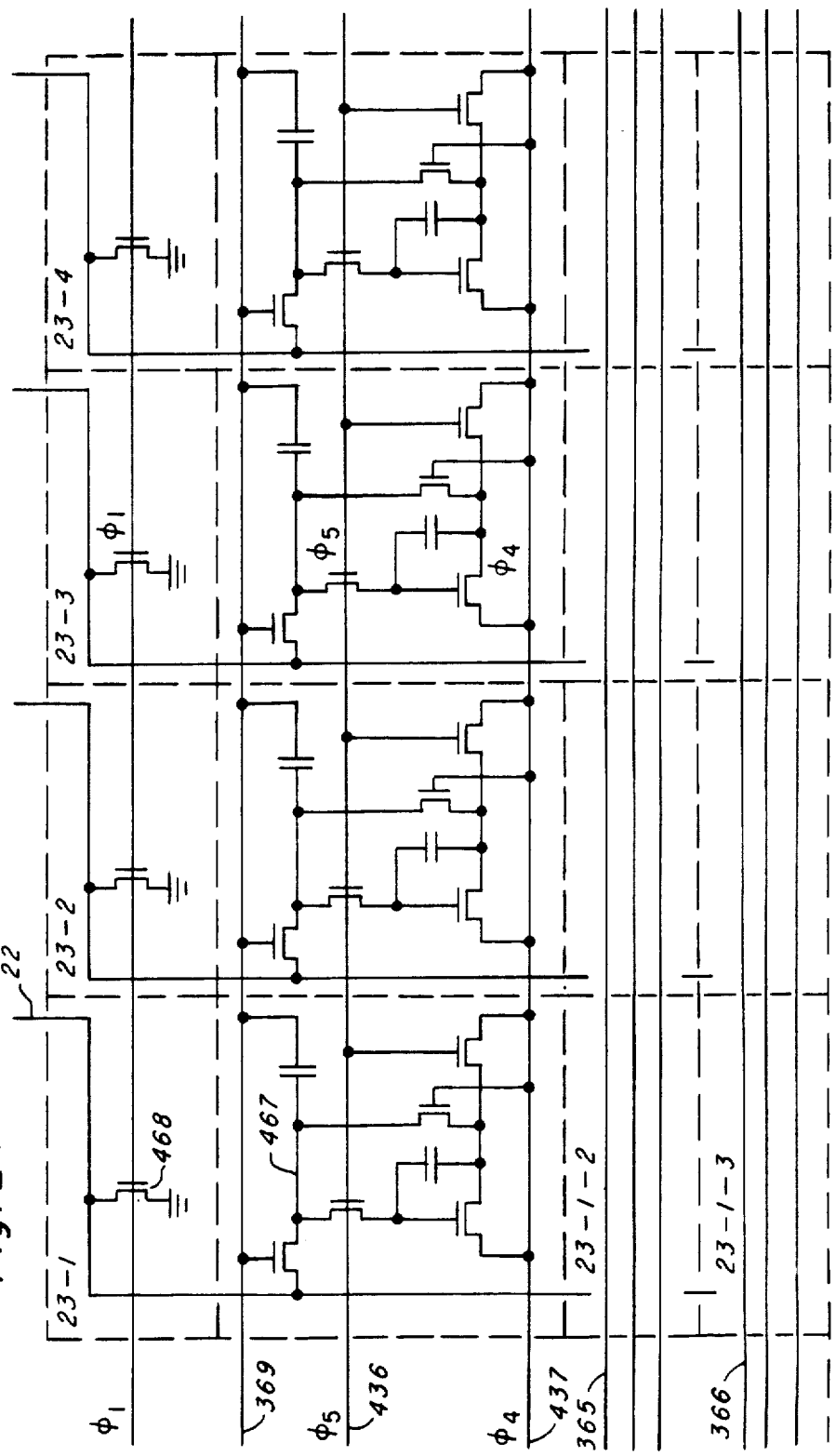
FIG. 24 is a schematic diagram of the CPU A page subroutine registers 23.

FIG. 24 illustrates the page subroutine register A 23 shown in FIG. 3b similar to page subroutine Register B 44 for CPU B. The page subroutine register can be divided into four sections, 23-1, 23-2, 23-3 and 23-4, which contain the four address bits. All sections in the page subroutine register are similar therefore only section 23-1 will be discussed. Each section is in turn comprised of three subroutine levels. Since all three levels 23-1 through 23-3 are similar, only the first level, 23-1 will be discussed.

Each level of each section is basically made up of a RAM cell 467 similar to the RAM previously discussed. The input to the cell and output from the cell pass over line 22 into the page address register A 21. The determination of which cell contains the address to be loaded when a new address is to be loaded into the page subroutine register A 23 is determined by the subroutine latches CLA 1-3 34 which activates one of the three lines, 369, 365 and 376. When the line is activated the RAM cells in that level are activated and are allowed to receive and store the address from the page address register. Likewise when this line is low, the RAM can load the stored address into the page address register over the same line 22. For example, if the first level of subroutine is to be activated, line 369 will become low. Therefore when the subroutine call is executed and the address in the page address register is to be stored in the page subroutine register 23, the address for section 23-1 will be loaded via line 460 into RAM cell 467 since line 369 from the subroutine latch will be low. Likewise, when a return statement is executed and line 369 is low from the subroutine latch, the contents of RAM cell 467 will be loaded back into the page address register A 21 via line 22. The RAM cell is read when $\phi4$ is low and is written into when $\phi5$ is low. $\phi1$ ($\phi2$ for CPU B) is provided to activate device 468 to discharge the RAM bit lines.

THE RAM WRITE MULTIPLEXER

Figure 25:
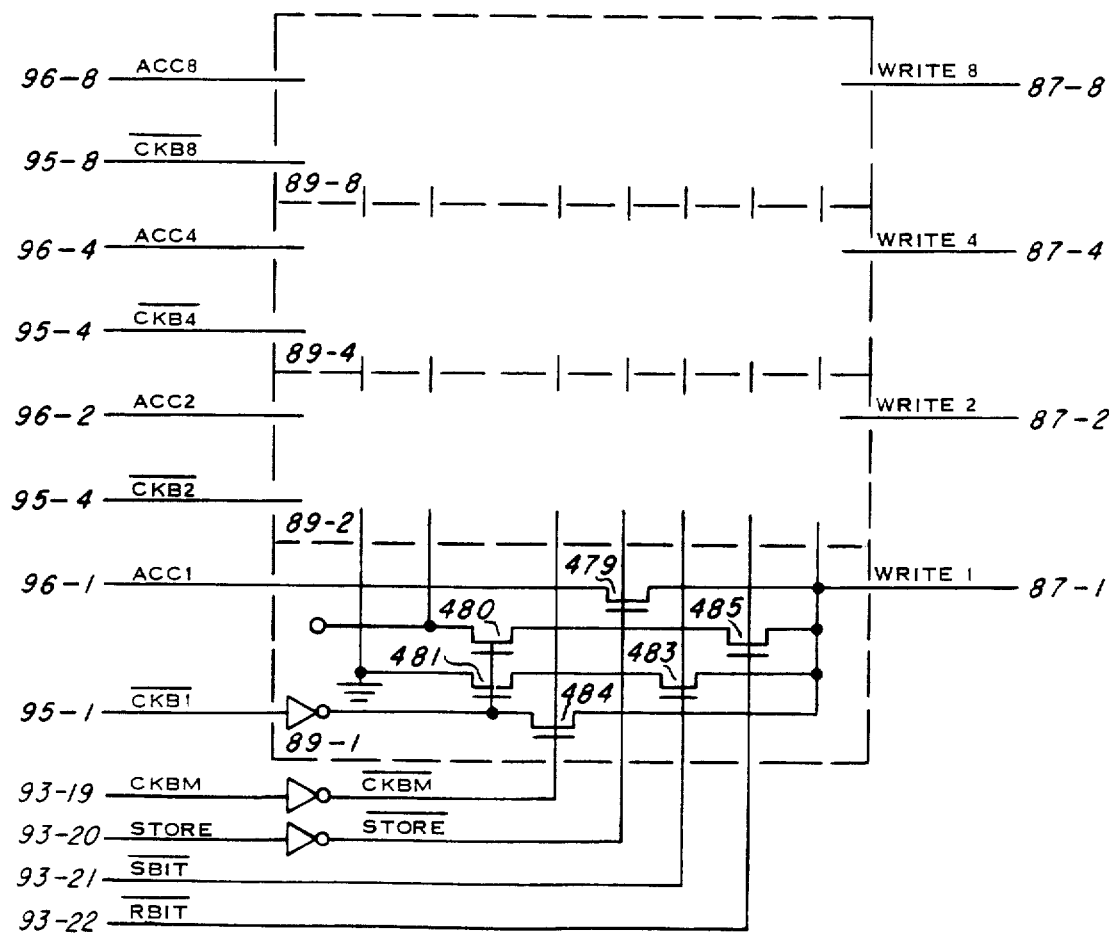
FIG. 25 is a schematic diagram of the RAM write multiplex circuitry 89.

FIG. 25 illustrates the WRITE MUX 89 as shown in FIG. 3a. The RIGHT MUX 89 can be divided into four separate sections, each section providing a line of information to RAM 81 on a set of lines 87. Likewise each section receives two inputs, one from the accumulator on line 96 and the other from the constant and keyboard logic on lines 95. Each section also receives one of four control signals on lines 93-19, 93-20, 93-21 93-22. Since all sections are identical, only section 89-1 will be explained.

When the output of the accumulator A 150 or B 151 is to be stored in memory, the contents of the accumulator A 150 or B 151 is placed in section 89-1 of the WRITE MUX 89 onto line 96-1. A store command activates line 476 which in turn activates device 479 allowing the information contained on line 96-1 to be output onto line 887-1. Likewise when the contents of the constant keyboard logic is desired to be written into memory, the contents is placed on line 95-1 and upon execution of the CKBM microinstruction, which is the load constant into memory microinstruction, line 93-19 is activated which in turn activates device 484 allowing the contents of line 95-1 to be transmitted over line 87-1. For the set bit operations, line 93-21 and 93-22 are used. For set bit, line 93-21 is low and 93-22 is high. Line 93-21 then activates devices 482 which inputs a Vss of "1" onto line 87-1 provided that the $\overline{CKB\,1}$ data coming into the cell is a "1" which will, in turn, be inverted to a "0" turns on device 481 providing a complete path to ground from line 87-1. Additionally, it should be noted that only one bit may be set, i.e., 4 $\overline{CKB\,1}$ is "1" then $\overline{CKB\,2}$, $\overline{CKB\,4}$ and $\overline{CKB\,8}$ will be "0". When the reset bit is executed, line 477 becomes high and line 43-22 goes low. Device 485 is turned on from line 93-21 and device 480 is turned on by CKB 1 providing a path from line 87-1 to Vdd, resetting the bit to "0". Likewise only one bit may be reset per instruction.

THE RAM Y DECODER

Figure 26:
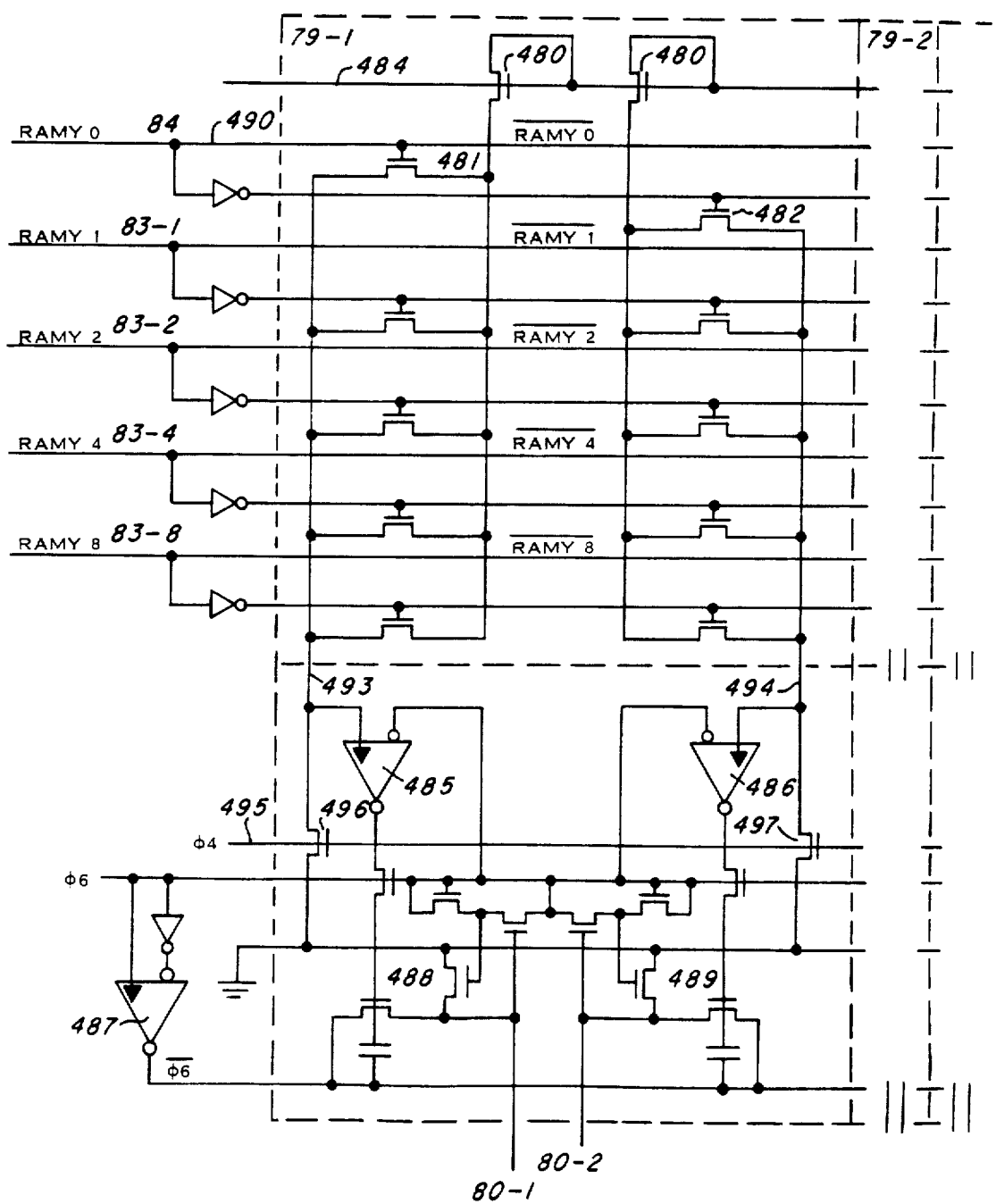
FIG. 26 is a schematic diagram of the RAM Y decode circuitry 79.

FIG. 26 illustrates the RAM Y decoder 79 as shown in FIG. 3A. The RAM Y decoder receives four of the RAM Y register outputs, 83-1, 83-2, 83-4 and 83-8. Line 84 originates from the X register 99 whereas lines 83-1 to 83-8 originate from the Y register A 148 or B 149. These lines are input into the RAM Y deocder 79 and becomes the data and its complement and are input into RAM 81. The RAM Y decoder 79 can be divided into 16 sections, 79-1 to 79-16; each section is identical except for the gate code therefore only section 79-1 will be explained.

The output from section 79-1 are two lines, 80-1 and 80-1. The output of the RAM Y decoder 79 consists of lines of 80-1 to 80-32. Each of the inputs line 84 and lines 83-1 to 83-8 are coupled to the RAM Y decoder 79 through a true line and an inverter. In the case of the line 84, the input is on line 490 and line 491 through inverter 483. The actual decoding of the five main input lines is done with transistor devices, such as 481 and 482, by placing these devices in a position to be controlled by either the true line or the complement line in some specified combination. During $\phi 4$ line 495 is active low and thus devices 496 and 497 pass their charge to ground. However, the address previously loaded into the circuitry 488 and 489 remain. At $\phi 5$ devices 480 become active thus allowing the Vdd to pass through the selected devices similar to 481 or 482, depending on which of the lines 84 or 83-1 to 83-8 are active. Then during $\phi 6$ from device 487 the addresses contained in the circuitry 488 and 489 are transmitted over line 80-1 and 82-2, respectively, to RAM 81. The output of the initial stage of RAM Y decoder 79-1 then are lines 493 and 494 which are input to two devices 485 and 486 which are gated-load amplifiers. A gated load amplifier is a device which will only transmit a valid signal to its output when the load is energized. Inverters 485 and 486 are used to transmit the address data from lines 493 and 494 into a circuitry 488 and 489. Circuit 489 is a mirror image of 488. Circuitry 488 and 489 retain the data transferred by lines 493 and 494 during the next decode phase consisting of $\phi 4$ and $\phi 5$.

RAM X CIRCUITRY

Figure 27:
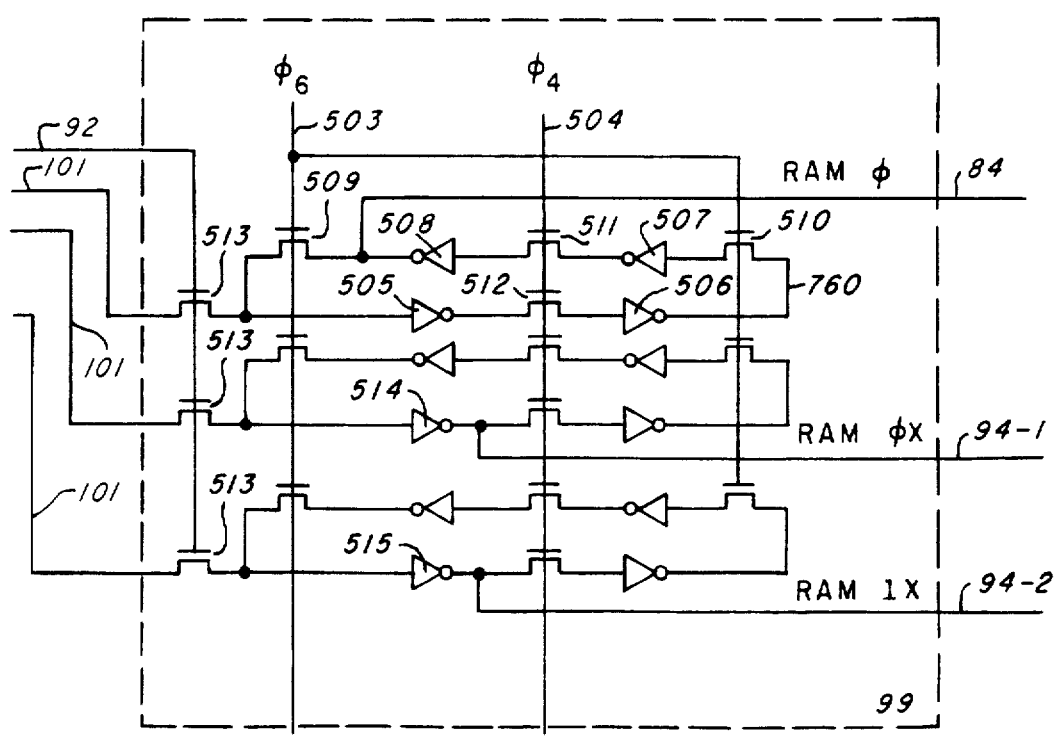
FIG. 27 is a schematic diagram of the CPU A and CPU B X registers 99.

FIG. 27 illustrates the X register 99 as shown in FIG. 3a. The X register contains three rotating registers as previoulsy discussed in FIG. 2. The X registers are loaded via lines 101-0 to 101-2 when 499 becomes active thus activating devices 513 allowing the lines to input into the rotating register. Since the operation of all three rotating registers are basically the same, only the rotating register outputting line 84 will be discussed.

The register 760 receives its input on line 500 which is input into inverter 505 through device 513 as previously discussed. When $\overline{\phi 4}$ occurs, the information in inverter 505 is transferred into inverter 506 through device 512. When $\phi 6$ occurs, device 510 becomes active and the information in inverter 506 is then transferred to 507. This circular transfer of information continues as previously discussed for rotating registers. The output to line 84 is then maintained in inverter 508. For lines 94-1 and 94-2 the information is maintained on inverters 514 and 515, respectively. It should be noted that the register circuits on lines 101-1 and 101-2 differ from the above in that the output lines 94-1 and 94- are coupled to inverters 514 and 515. It also should be noted as previously discussed that line 84 goes to the RAM Y decoder 79 whereas lines 94-1 and 94-2 go to the X decoder.

Figure 28:
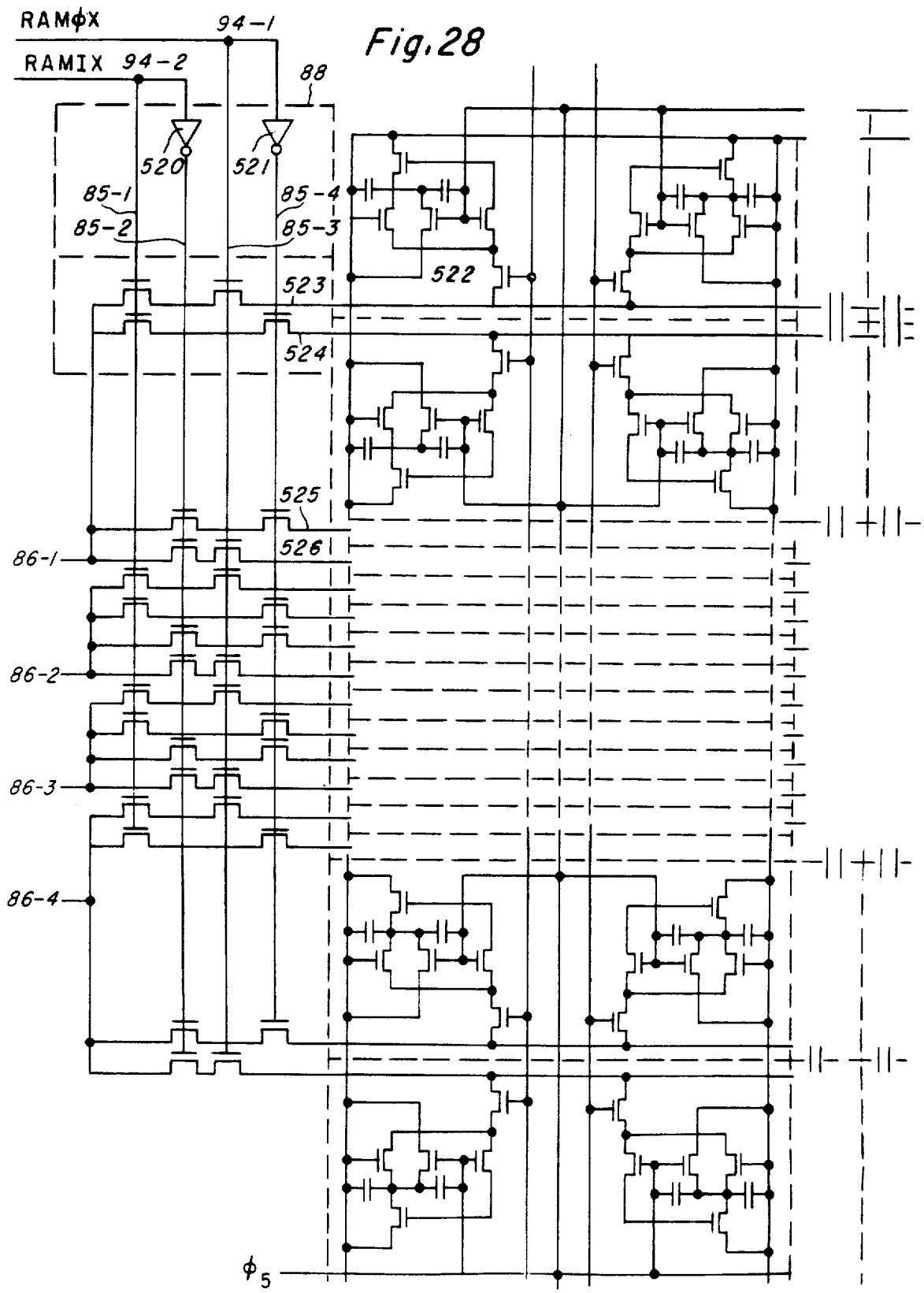
FIG. 28 is a schematic diagram of the X decode circuitry 88 and a partial diagram of the RAM array 81.

FIG. 28 illustrates the X decoder 88 and a section of the RAM 81. The X decoder 88 consists of two lines, 94-1 and 94-2 entering the decoder and the two inverters, 520 and 521, coupled with these lines in order to generate the data and its complement such that the lines output are 85-1, 85-2, 85-3 and 85-4. This two to four decoding allows the lines such as 523, 524, 525 and 526 to act as a selector into the RAM 81 to select the bit lines to be accessed. When the bit lines are selected, the RAM outputs on lines 516, 517, 518 and 519 as shown.

RAM

The RAM 81, illustrated in FIG. 28, consists of elements such as 522 which have been disclosed in U.S. Pat. No. 3,919,181, assigned to Texas Instruments in an array 16 elements by 32 elements. The timing for the RAm involves $\phi 4$, $\phi 5$ and $\phi 6$. During $\phi 6$ of the RAM bit lines are discharged. During $\phi 4$, the following cycle, the RAM is read. $\phi 5$ is the Write cycle where the RAM is conditionally discharged according to whether a "0" or a "1" is to be stored from lines 86-1 to 86-4

R REGISTERS

Figure 29:
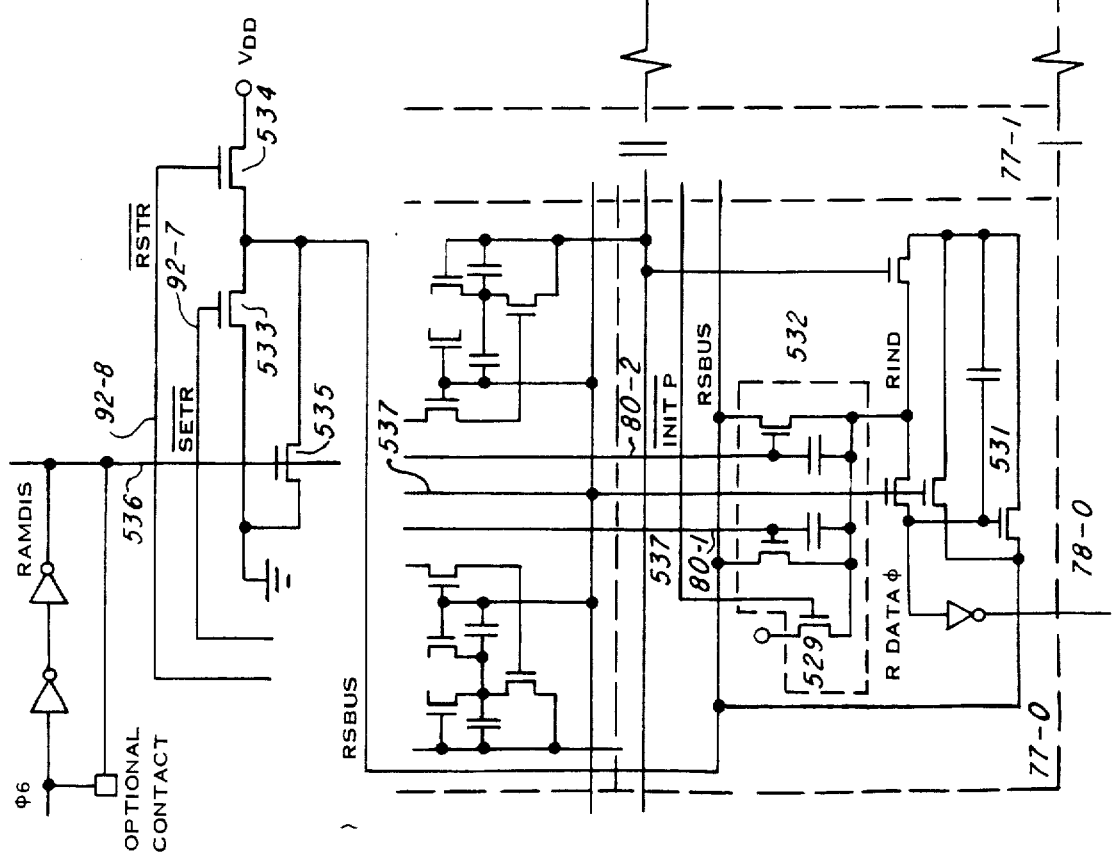
FIG. 29 is a partial schematic diagram of the R register circuitry 77.

FIG. 29 illustrates the R register 77 with RAM 81 and input lines through the RAM 81. R-register 77 consists of 16 sections. All of these sections are similar to the sections shown in 77-0. Therefore, only section 77-0 will be discussed. The register receives the data from line 537 which is termed the reset/set bus. This bus is activated by either device 534 or 533. When the set register command is executed, the line 92-7 goes low causing device 533 to become active, thus grounding the line 537. In a similar fashion, when the reset register instruction is executed line 528 goes low causing device 534 to become active and Vdd is coupled into the RS bus line 537. Device 535 is activated by line 536 which is a RAM discharge line. When the RAM is discharged, 536 goes low activating device 535 thus discharging the RS bus line 537. Register section 77-0 inputs the RS bus along with the two address lines, 80-1 and 80-2. The R-register 77 is addressed by the Y decoder in such a manner that two address lines determine which register is to receive the bit information from the RS bus line 537. Due to the nature of the Y decoding circuitry, lines 80-1 and 80-2 will contain either a 11 to 10 or a 01. If the lines are 11, then that R-register 77 is not selected to receive the bit information from the RS bus line 537. However, if lines 80-1 and 80-2 are 10 or 01 then the circuitry 532 which is a wired OR couples the latch circuitry 531 to receive the input RS bus 537 that is clocked in at $\phi 5$. Using this scheme only one of the register sections in 77 may be loaded at any one time with the RS bus line 537 with the RAM Y decoder 79.

RAM REGISTER OUTPUT

Figure 30:
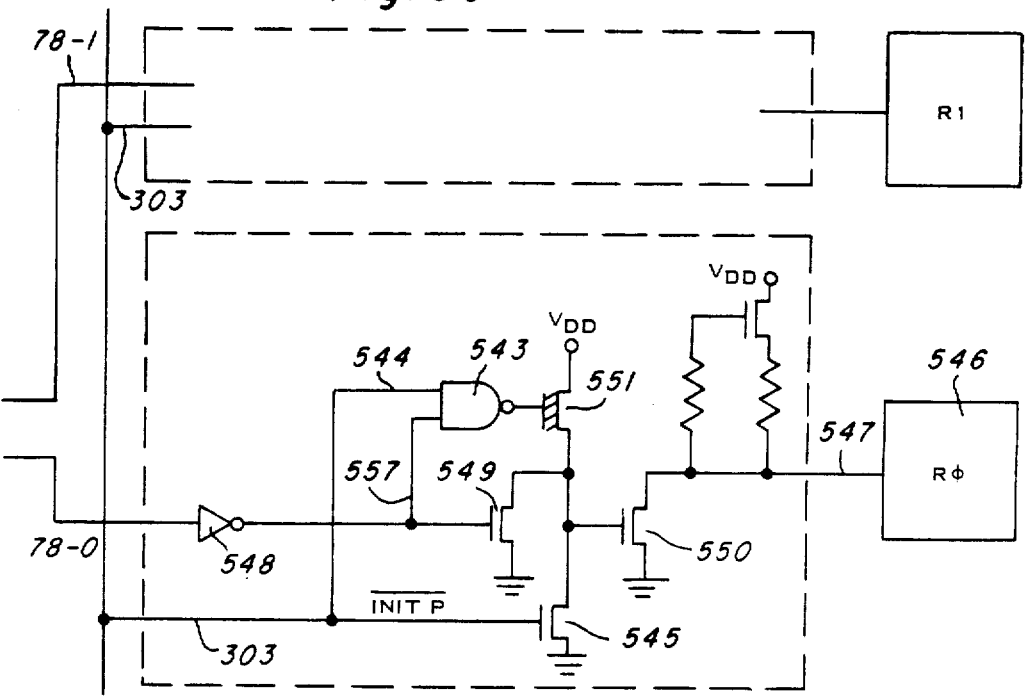
FIG. 30 is a schematic diagram of the R register output buffers for R0 and R1.

FIG. 30 illustrates the R0 output buffer and R1 output buffer. Register output buffers, R0 to R13 are similar to that illustrated in R0. Therefore only the R0 circuitry will be discussed.

The register buffers for R14 and R15 are different since they are used in initialization and testing and will be discussed later. Referring to FIG. 30, the circuitry for the buffer consists of two inputs, 78-0 and line 303. Line 78-0 is the input from the R register 77-0. Line 303 is an initialization line. When the data is transmitted over line 78-0, it is input through an inverter 548 and activates device 549 causing the output voltage to go to ground, thus deactivating device 550 and causing a voltage of Vdd to appear through line 547 onto register pad 546 for R0. During installation, line 303 becomes active causing device 545 to become active. In addition line 544 and input line 78-0, coupled through inverter 548, are input into NAND gate 543 and into device 551 potentially passing Vdd which causes device 550 to become active thus line 547 will go to ground instead of Vdd. Therefore the register pad 546 will be initialized to a "0".

Figure 31:
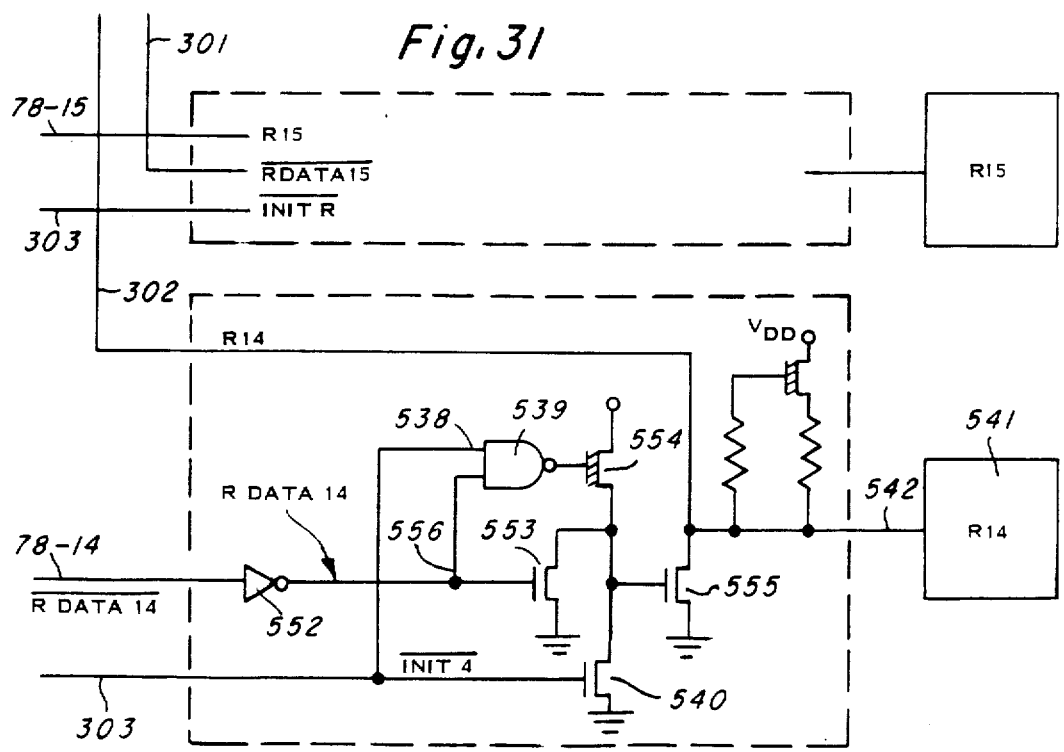
FIG. 31 is a schematic diagram of the output buffer for R14 and R15.

FIG. 31 illustrates the circuitry for the register buffers for R14 and R15. R15 is identical to R14 so only the circuitry associated with R14 will be explained.

The circuitry in R14 is similar to the circuitry in R0 in that the input for the register is coupled to line 78-14 and into an inverter 552 to activate device 553. This, in turn, causes device 555 to be inactive allowing the line 542 potential to be Vdd. Therefore Vdd appears on line 542 register pad 541 causing a "0" to be output. If the register data is "1", then line 78-14 will couple a "1" into inverter 552 which will couple a "1" into device 553 causing the device 553 to be inactive. Therefore, Vdd will activate device 555 thus grounding line 542 and coupling a "1" into register pad 541. In addition to this circuitry, R14 contains line 302 which is an input line from register pad R 14 541 pad R14. This input pad is used during tests. During initialization, R14 will be initialized by line 303 which is then coupled into gate 539 via line 538 along with the data. If the data is "1", then the line 556 will be "0" and the output of the NAND gate will be a "1". If, however, the data is "1" and the line 303 is "1", the output of the NAND gate will be a "0" thus activating device 554. The line 303 will activate device 540 thus causing the gate of device 555 to go to ground inactivating device 555 and coupling a "0" through line 542 onto the register pad 541.

ROM Y DECODER

Figure 32:
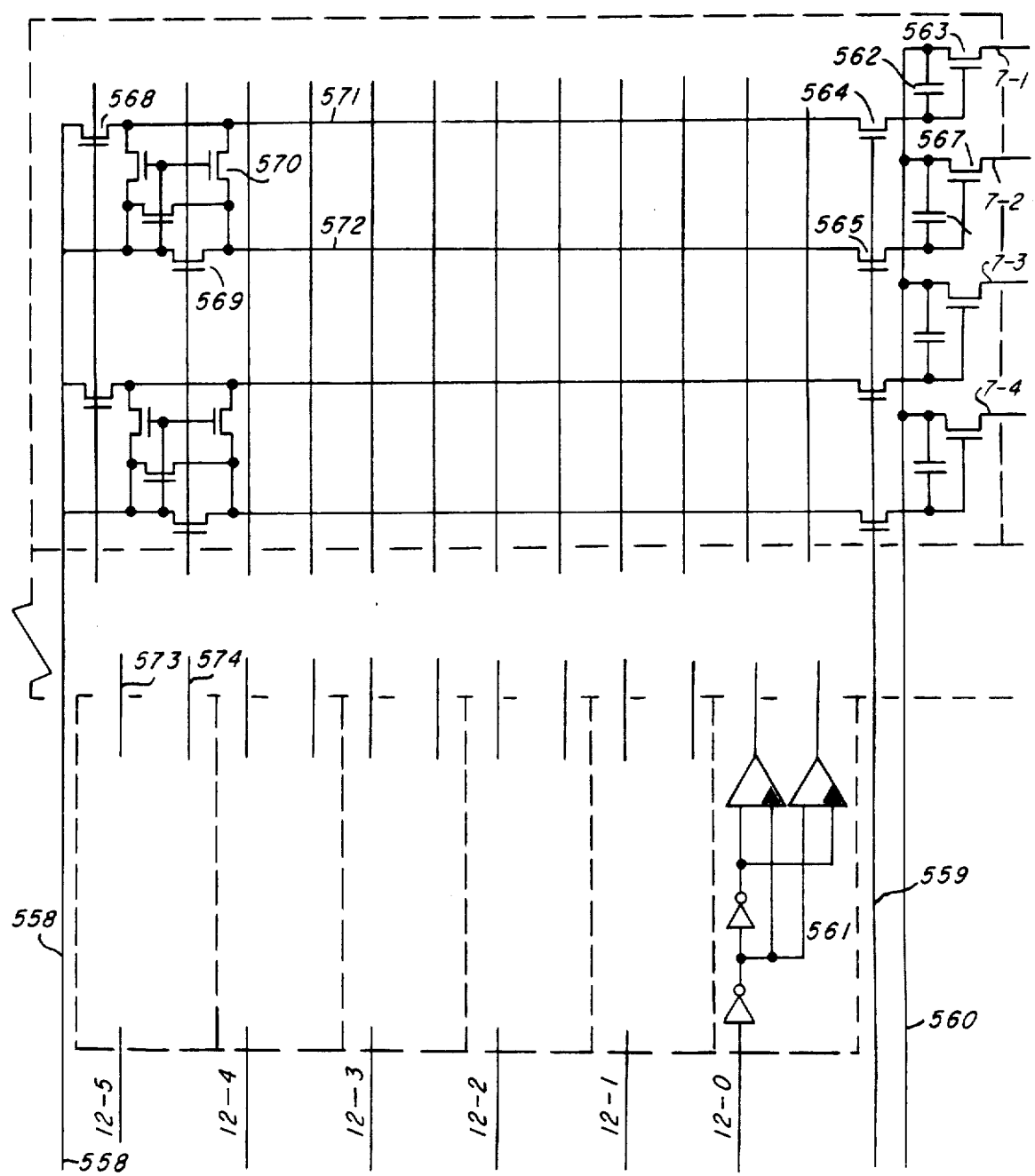
FIG. 32 is a schematic diagram of the ROM PC decoder 8.

FIG. 32 illustrates the ROM PC decoder 8 as shown in FIG. 3b. The ROM PC decoder receives 6 inputs lines 12 and outputs 64 lines 7 to the ROM 6. In FIG. 32 the input lines are numbered 12-0 to 12-5 and represent the 6 bits of the multiplexed program counter, either for CPU A or CPU B. Each of these lines is input to a section similar to Section 561. The line in 561 12-0 is divided into true and complement line as shown. The output of 561 is similar to line 573 and 574 for line 12-5. The function of the ROM PC decoder 8 is to take the 6 inputs and decode them into 1 of the 64 lines 7 for the ROM six. Line 573 is coupled to the device 568 of the gate circuitry 570. Line 574 is coupled to device 569 of circuitry 570. Line 571 and 572 are outputs from the circuitry 570 and couple through devices 564 and 565 respectively to the circuitry including capacitors 562 and 566 and devices 563 and 567. In the ROM PC decoder 8, there are 64 capacitors similar to 562. However, in this figure only four are shown. These capacitors are termed "BOOT STRAP" capacitors and provide the charge for the gate which will drive the Y address into the ROM 6. During $\phi 4$, line 558 becomes active, thus providing charge to the BOOT STRAP capacitors. During $\phi 5$ all but one of the 64 capacitors will be selectively discharged. This is accomplished by use of the true and complement lines 573 and 574 for all the addresses 12-0 through 12-5. When $\phi 4$ is inactive and ground, active lines such as 573 would provide a path to ground through device 568 for capacitor 562 since $\overline{\phi 6}$ via line 559 will be active and thus device 564 will allow the passage of the charge from capacitor 562 through any path to ground. If, however, line 573 was inactive, then line 574 would become active thus activating device 569 and thus discharging capacitor 566 through device 565. Therefore, since either line 573 or 574 will be active during the period of $\phi 5$, 32 of the 64 capacitors will immediately be discharged. Circuit 570 is repeated for 64 rows even though only 2 rows are shown. All rows will connect to lines such as 571 and 572. To discharge the remaining 31 capacitors, a path to ground is provided through one of the remaining 5 decode devices. In other words, the 4 devices within circuitry 570 will combine with either of the devices such as 568 or 569 depending on which line is not active to provide a path to precharge both capacitors across the row of lines 571 or 572. For the one capacitor that will remain charged, none of the devices in that row will provide a path to ground. This particular row is, of course, determined by the address on lines 12-0 to 12-5. Therefore at the end of $\phi 5$, only 1 of the BOOT STRAP capacitors will remain charged. Than at $\phi 6$ line 560 will become active thus activating one of the devices such as 563 to drive the line charged by the BOOT STRAP capacitor into the ROM 6. Therefore, the 1 of the 64 lines determined by the multiplexed program counter address is selected.

ROM PAGE DECODER

Figure 33:
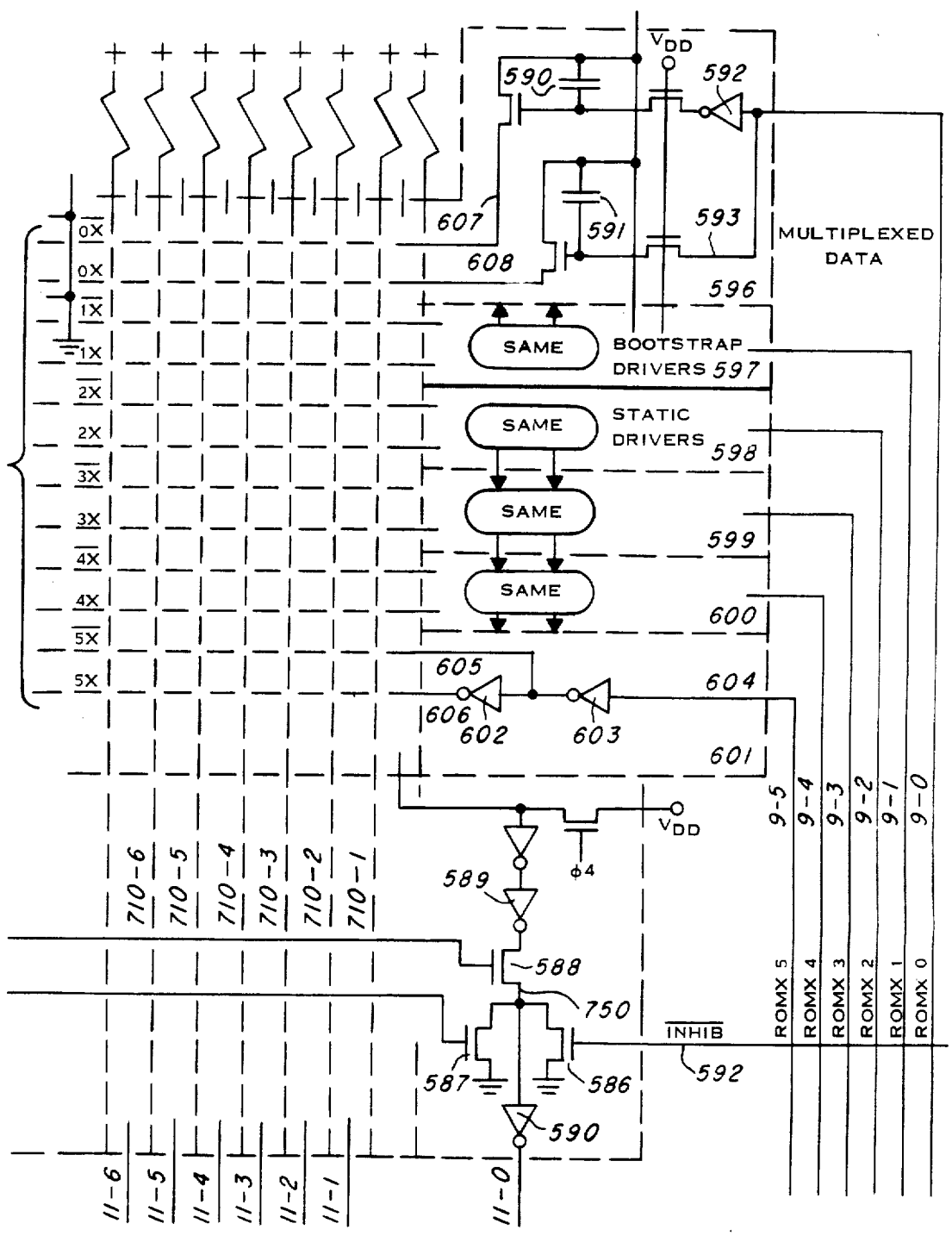
FIG. 33 is a schematic diagram of the ROM page decoder 10 and a partial schematic diagram of the ROM output drivers.

FIG. 33 illustrates the ROM page decoder 10 as shown in FIG. 3b. The ROM page decoder consists of 6 sections shown as 596 through 601. Sections 596 and 597 are the same, but are different from the other four sections, 598 through 601. Section 596 is shown as consisting of two BOOT STRAP capacitors 590 and 591.

These BOOT STRAP capacitors provide extra charge for driving the devices in the ROM. This is required for the ROM X0 line 9-0 and the ROM X1 line 9-1 as will be shown.

In Section 596, line 9-0 is divided into a true and complement line, the true being 593 and the complement line coupling through inverter 592; therefore, either the true or the complement line will be active for a selected address. The selected address will charge either capacitor 590 or 591 when the $\overline{\phi 4}$ line is inactive, allowing for a fast charge on line 607 or 608 when $\phi 4$ is active.

Sections 598 through 601 are similar and therefore only 601 is shown. Section 601 is coupled to an input ROM 5 via line 9-5 or line 604 which is coupled through device 603 to produce line 605 and line 606 which has been coupled again through another inverter 602. The inverter 603 is provided for driving purposes. The lines ROM X0 through ROM X5 are the page and chapter address of the instructions to be accessed.

ROM SENSE AMPLIFIER

Figure 34A:
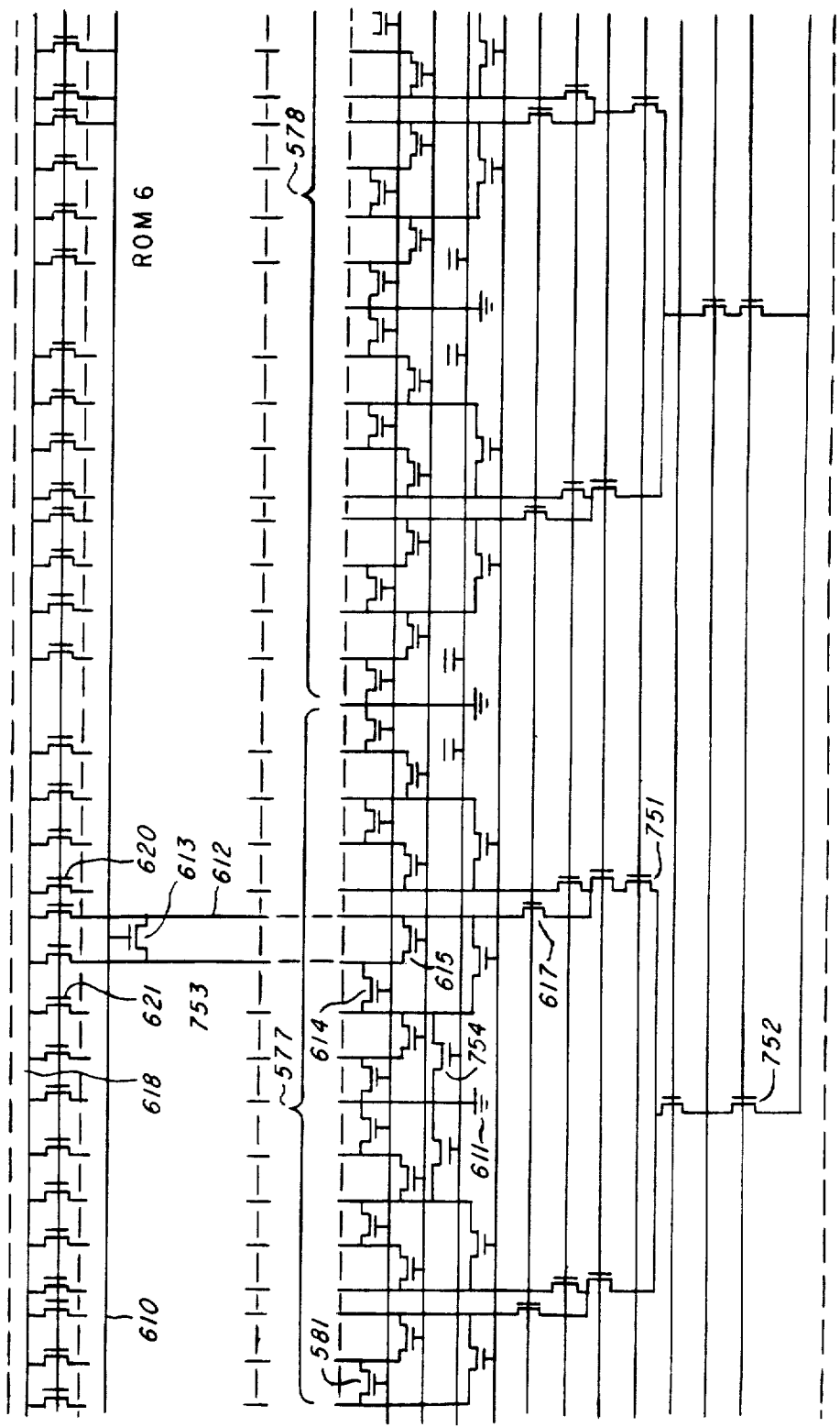
FIG. 34a is a partial schematic of the ROM array 6 and the ROM array drivers for the ROM output lines 11.

FIG. 33 partially illustrates the ROM sense amplifier 710 which drives the ROM output lines 11. FIG. 33 shows the ROM sense amplifier 710 in Sections 710-0 to 710-6. Section 710 is also illustrated in FIG. 34a. Section 710-0 is unique from the other sections 710-1 to 710-7. As shown the ROM output in Section 710-0 is coupled through two inverters, 589, provided for driving purposes. Device 588 and device 587 are used during the testing sequence to zero all the outputs from the ROM. Lines 11 contain inverted ROM data. Device 588 traps the ROM data when $\phi 6$ is low. Device 587 zeros the output of the section when the random memory test is being conducted. Line 592 grounds this one input 750 during the initialization forcing a "0" on line 11-0 which will become a "1" on the R0 line of the instruction bus. During normal operations, the ROM which is precharged during $\phi 4$ will be read in $\phi 6$ therefore device 588 will become active allowing data to flow from the ROM through inverter 589 into inverter 760 onto line 11-0.

Referring now to FIG. 34A, 34A' section 710-7 is illustrated. As mentioned earlier, Section 710-7 is identical to Sections 710-1 through Section 710-6. In Section 710-7 the ROM is output through inverter 581 through device 582 which become active during $\phi 6$ and through inverter 584 onto line 11-7. Device 583 is provided to zero the ROM complement output during the test sequences as discussed earlier.

ROM

FIG. 34a also illustrates the Read Only Memory (ROM) array 6. The ROM is precharged during $\phi 4$, and read during $\phi 6$. The charge is provided by devices 622 which are connected to Vdd and provide power to the ROM via lines 616. During $\phi 4$, line 620 becomes active thus allowing the bit lines within the ROM to be charged through device 621. A typical device in the ROM is device 613. In the ROM the cells containing devices such as 613, when addressed, will provide a discharge, where there is to be no discharge at that address, no device such as device 613 will be provided. The ROM address lines of the page decoder shown as 580 are shown for 1 of the 8 sections of ROM 6. All other 7 sections of the ROM are similar. In the section shown, the X lines are divided into 3 sections, 577, 578 and 579, which represent the 3 chapters that may be addressed by the page decoder 10. During $\phi 5$ power is provided to the address lines 580 such that the address devices will selectively provide paths to ground to discharge the selected ROM cells. The lines in 580 consists of pairs of true and complement of the X address as previously discussed. The top four lines $\overline{0X}$, 0X, 1X and $\overline{1X}$ select the first two major sections of the ROM address and are coupled to the several transistor devices as shown. When one line is active, the other line will be inactive; thus, one device such as 614 when active will provide a path to ground thus discharging the selected ROM bit line cell. These two sets of lines $\overline{0X}$, 0X, $\overline{1X}$ and 1X provide the discharging of the ROM bit lines. Lines $\overline{2X}$, 2X through $\overline{5X}$ and 5X provide the addressing of the cells for the specified ROM output line. For example, if line $\overline{0X}$ is active, then line 0X will be inactive, therefore device 614 and device 615 will be inactive. Device 614 will provide a ground path for bit line 753 and ROM bit 613. This path will continue through device 754 to ground 611.

Figure 34B:
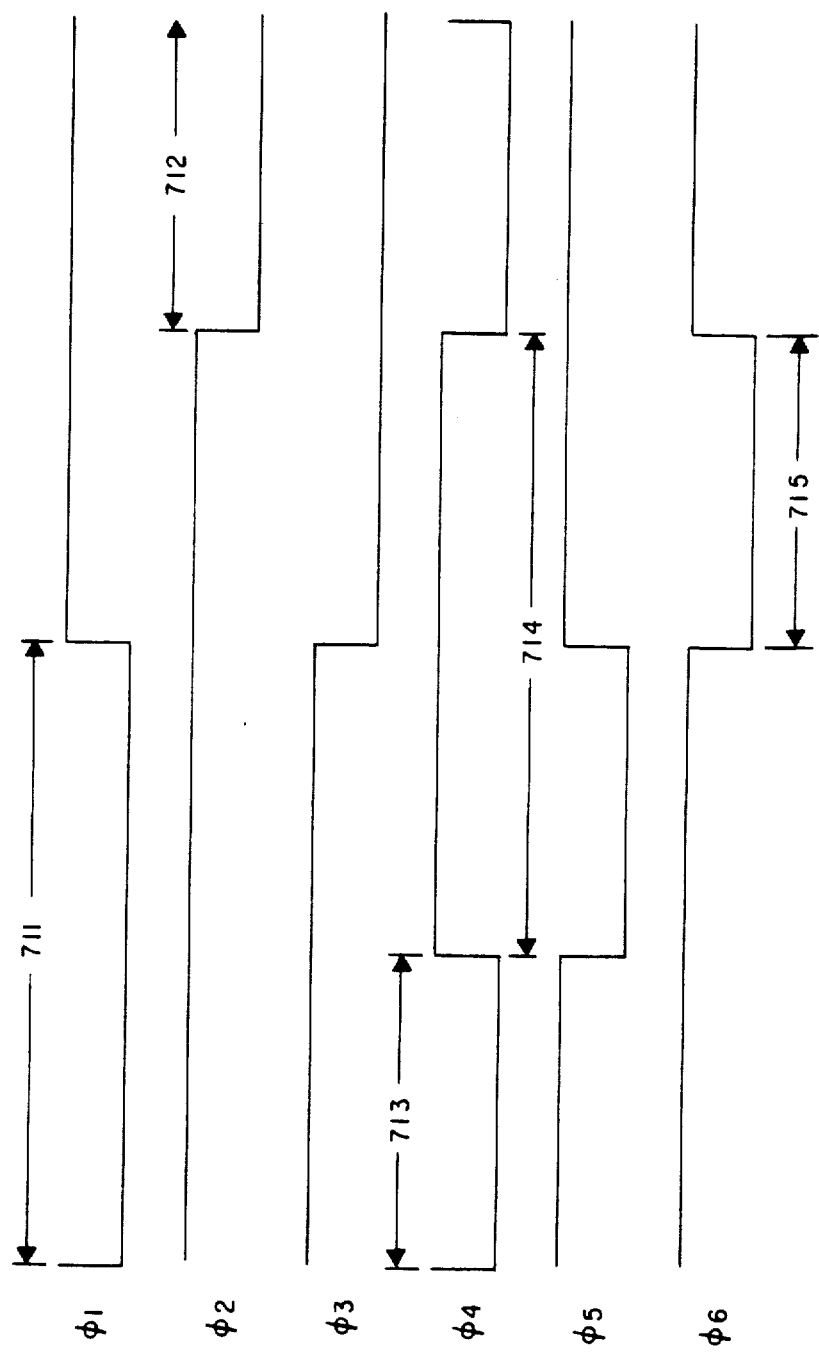
FIG. 34b is a timing diagram for the operation of the ROM array 6.

FIG. 34b illustrates the timing of the Read Only Memory (ROM). The fall of $\phi 1$ initiates the selection of the ROM instruction for CPU A. Specifically the address for the ROM location is selected and driven for the ROM X most significant bits for $\phi 4$ and $\phi 5$ as shown in interval 711. Also during the fall time for $\phi 4$, 713, the bit paths and the Y decode circuitry is precharged. During the same time the address lines for the X lines of the Read Only Memory least significant bits are discharged. At the rise of $\phi 4$, 714, the boot strap capacitors in the ROM Y decoder 79 are discharged and the address lines for the ROM X least significant bits are driven, 714. At the fall of the $\phi 6$, 715, the ROM Y address lines are driven and the ROM word is sampled in the sense amplifier. At the fall of $\phi 2$, 712, the fetching cycle for CPU A ends and the fetching cycle for the CPU B begins, repeating the $\phi 4$, 5 and 6 sequences for CPU B.

INITIALIZATION CIRCUITRY

Figure 35A:
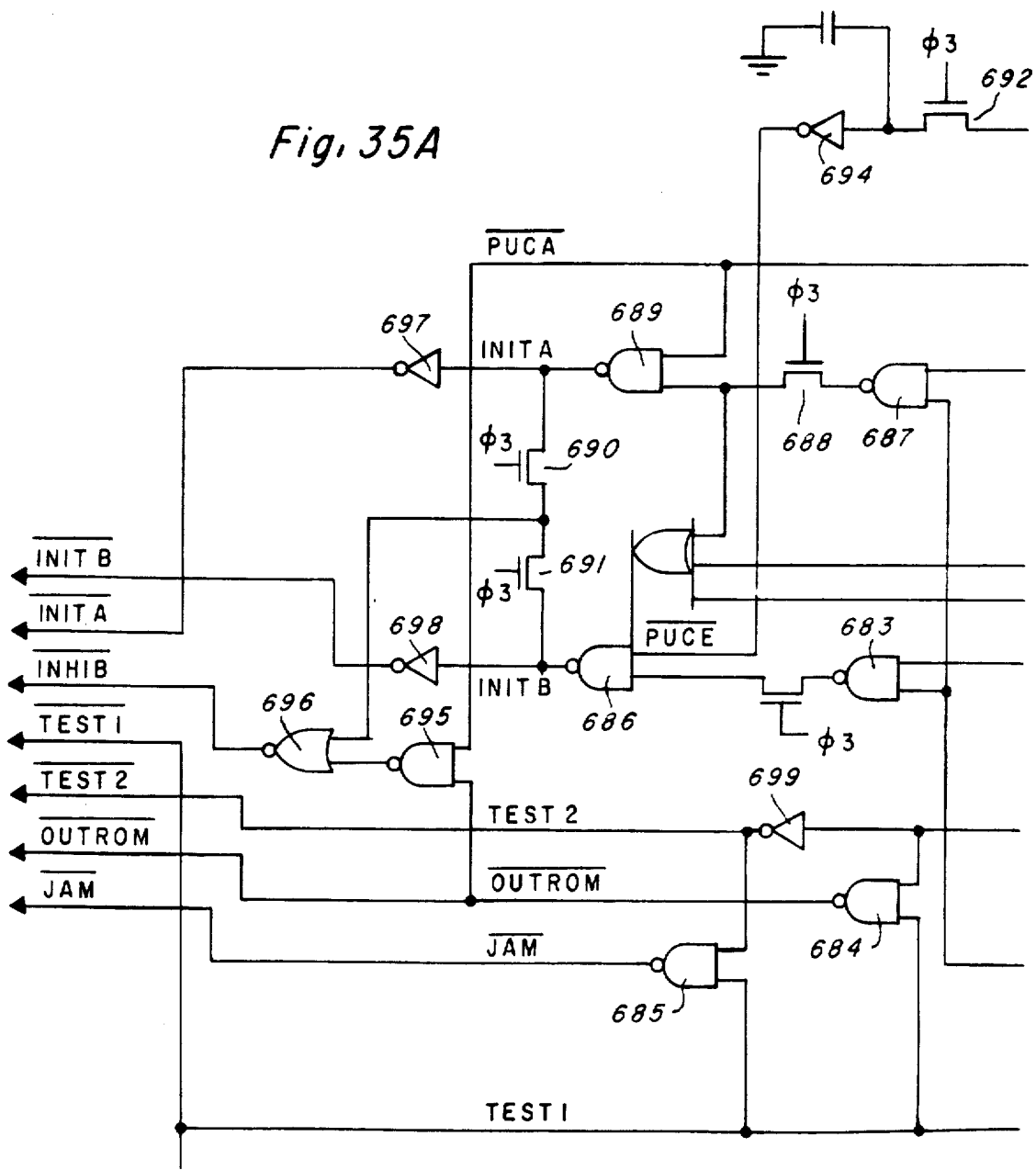
FIG. 35 is a schematic diagram of the initialization and test circuitry for the digital processor system.

FIG. 35 illustrates the initialization circuitry for the multiprocessor system. When power is first applied, circuitry 654 is activated which transmits a signal, PUCA, or the power up for the CPU A when $\phi 3$ goes low. This signal is output from inverter 693 and is input into complex gate 653. Likewise when $\overline{\phi 3}$ goes high, device 692 is activated and the power up signal for the CPU B is transmitted from inverter 694 into complex gate 686. Complex gate 655 also receives inputs from the initialization A pad 650 and the initialization B pad 651 together with inputs from inverter 693 in order to set the valid condition for test. Upon power up the output of gate 653 zeros the registers R14 and R15 which are aso used in test modes.

The INITR signal originating from gates 655 is used to alter registers R14 and R15 from output to input and enable the test modes. The INITP signal output from complex gate 653 is used to initialize the register for pads R0 to R13. The power up procedure initializes both CPUs and starts the CPUs according to the system timing diagram in FIG. 3d. After power up, if only one CPU is to be initialized only one INIT pad should receive a low to high transaction signal. In other words, if the user desires to initialize CPU A but allows CPU B to continue running, then CPU A would be initialized setting pad 650 to a logical "1". The same is true for intializing CPU B in that pad 651 would receive the logical "1" signal. The initialization of one CPU and not the other CPU or the initialization of the CPUs together with some testing mode specified with R15 and R14 would result in the output of gate 653 being a "0" but the initialization of both CPU A and CPU B would result in an output from gate 655 which would allow inputs from the two registers, R14 and R15, to be input into gates 669 and 668, respectively. The devices 681 and 682 clock in the initialization signals into the CPUs at the proper time. Device 681 receives a signal when $\phi 4$ occurs during $\phi 3$. Device 682 is activated when $\phi 4$ occurs and $\phi 3$ occurs receiving that signal through inverter 667. Gates 687 and 683 receive the initialization signal from the CPU A INIT pad 650 and CPU B pad INIT 651, respectively, together with indication of the initialization inhibit during test from gate 680. The output of gate 686 is the initialization signal for CPU B. The output of gate 689 is the initialization signal for CPU A.

The initialization circuitry in conjunction with R14 and R15 initiates the test conditions for the multiprocessor system. Three tests are provided: the ROM test, the random logic input test and the random logic output test. To specify a test, the user inputs a combination of "1"s or "0"s into R14 and R15 as inputs. As discussed earlier during one of the initialization modes, R14 and R15 become input buffers rather than their normal function as output buffers.

To begin the ROM test, a "1" is input into R14 and a "0" is input to R15 and both initialization pads 650 and 651 must receive "1"s. During the ROM test, the contents of the ROM 6 are transmitted over the instruction bus and output to the user through the output buffers 165. To accomplish this, the instruction PLA as shown in FIG. 8B receives the output ROM signal which inputs the ROM data onto the CPU A output bus which is in turn routed into the output buffers 165. During the execution of the ROM test, an inhibit signal must be generated to inhibit the execution of any branch or call instructions. This is accomplished in the initialization circuitry through gates 696 and 695. The "1" from the register R14 is input into gate 669 together with a signal test initialization and the output of gate 669 is input into gate 684 together with the "0" that is input into Register 15 to define the ROM test. The output of gate 684 signifies the ROM test to be performed. This is then input into gate 695 together with the signal that the initialization circuitry is not in power up. The output then of gate 695 is input into gate 696 together with the clocking to produce the inhibit signal. This test enables the user to step through all the instructions contained on the ROM in this multiprocessor system.

To execute the random logic input test, both pads 650 and 651 must receive "1"s and pads R14 and R15 must receive "1"s. The random logic input test allows the microprocessor system to be executed with instructions from outside of the immediate system by allowing the output buffer pads 165 to be used as inputs for execution of these instructions from some outside source. The instructions are executed as those instructions would normally be executed if contained in the ROM 6. The "1" in pad 15 and the "1" in the pad 14 are input into the initialization circuitry through gates 668 and 669, respectively. These generate signals which are then input into gate 685 to produce a jam signal. The jam signal is used to switch the O-output pads 165 into an input mode and to drive the instruction bus 71 from the output paths 165. It is also used to switch the circuitry for the status output pad 157 to output the status for both CPU A and CPU B. This capability is quite unique in that it allows the user to test the microprocessor system with an externally defined sequence of instructions. External memory access is initiated by synchronizing the external memory system with phase clocks ($\phi 1$ through $\phi 6$) of the multiprocessor system. The KA input 104 and KB input 155 are used as the instruction input. KA input 104 and KB input 155 must be multiplexed to allow the CPU A input and CPU B input functions to be accomplished during the same macroinstruction cycles. It should be obvious to one skilled in the art that this is accomplished by adding transfer gates to the KA input 104 and KB input 155 circuitry which connects the KA input 104 and KB input 155 circuitry to the instruction bus 71. These transfer gates are controlled by the external memory clocks and a synchronizing input signal to allow the inputs to the instruction bus to be multiplexed with the inputs to CPU A and CPU B. In addition to the synchronizing input signal and the phase clocks, the external memory system must also include a program counter and page register with associated controls.

The output test 2 from the initialization circuitry also serves to remove the ROM from the instruction bus and thus preventing any of the instructions from the ROM to be transmitted on the instruction bus. If the user inputs a "0" and "1" on pads 14 and 15, respectively, and a "1" into the two initization pads 650 and 651, then the random logic output test will be specified. The object of the random logic output test is to allow an output through the CPU A output paths 165 while the CPU is executing instructions that have been input on those same set of lines. This is accomplished by first performing the random logic input test and inputting an instruction into the CPU for execution and then forcing the CPU into an output mode with an output instruction and then changing the initialization and test circuitry to perform the random logic output test, allowing the output pads 165 to transmit the results of the instructions that had been previously executed with the random logic input test. The "0" and "1" input into R14 and R15 are entered into the initialization circuitry through gates 669 and 668, respectively. Gate 668 affects the TEST 2 signal which disables the JAM signal in order to allow the O-output buffers 165 to be used as inputs.

During the execution of the random logic test, both input and output, the $\phi 6$ time slot is used as the dead time allowing the toggling between the random logic input test and the random logic output test.

TWO PLAYER GAME CONFIGURATION

Figure 36:
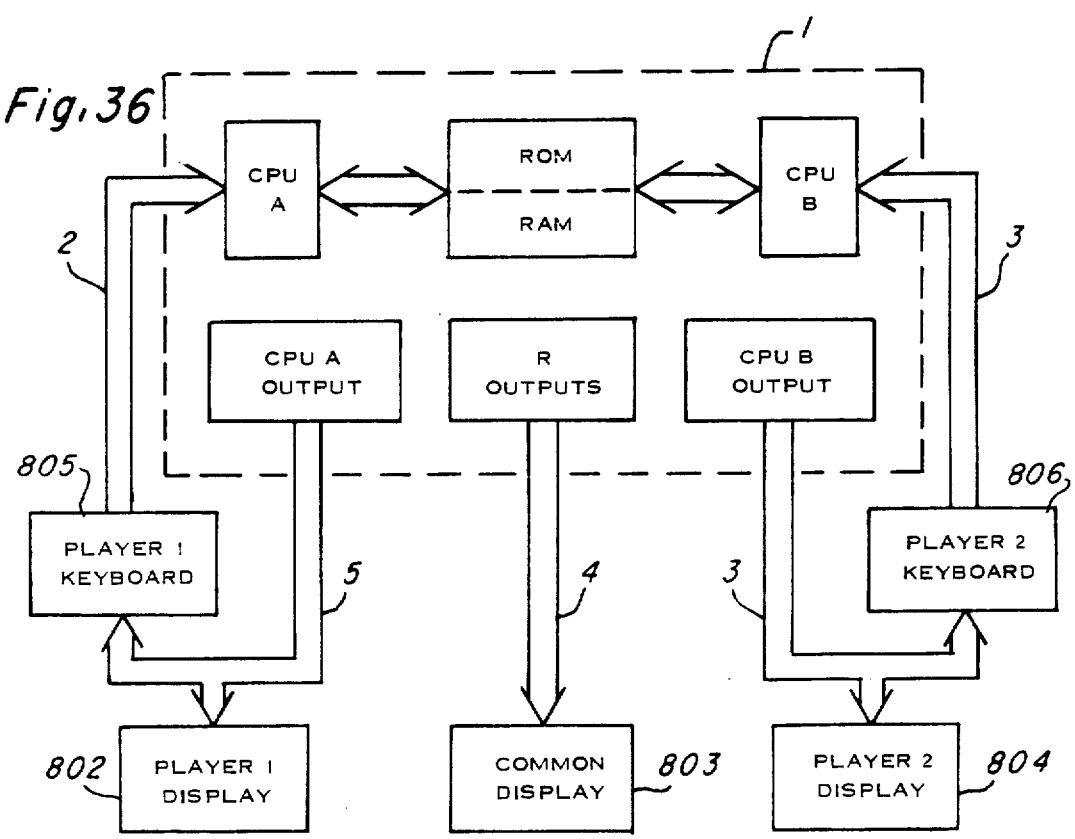
FIG. 36 is a block diagram of the two player game configuration illustrating the player displays that are dedicated to individual central processing units together with a common display.

FIG. 36 illustrates the configuration of a two player game apparatus including a player one input shown as the player one keyboard 800, a player two input shown as player two keyboard 801, three displays, 802, 803 and 804, all connected to the electronic digital proccessor system microprocessor chip 1. The input from the player one keyboard 800 to the microprocessor unit 1 is shown as the signal group 2 which corresponds to the signal group for the central processing unit A in FIG. 1. Likewise, the input for central processing unit B is shown as 3, corresponding to the central processing unit B inputs in FIG. 1. It should also be noted that the same signal lines provide output to the player two display 804, further including the SB line as described previously. The outputs for the central processing unit A is shown as signal group 5 and is coupled to the player 1 display 802. The R outputs or register outputs are shown as signal group 4 and is coupled to the common game display, 803. In this configuration each central processing unit is dedicated to the update of the display on the player keyboard and also the individual player display showing to the player that player's individual status. In addition, both central processing units provide the output to the common display 803. In this configuration each player is allowed to see that player's individual player status and the common display. Therefore, player 1 should not be able to view the player 2 display 804. Since both central processing units access the same read-only memory and the same random-access memory, both central processing units can execute the game algorithm for the same read-only memory while storing the individual player's data in the RAM that is partitioned for that central processing unit. This arrangement allows for the simultaneous and independent execution of the same game algorithm by two different players. While the execution of these algorithms are independent, these algorithms are permitted to output to a common game display 803. It is this common game display 803 that informs the players of the game status, or in other words, the status of the algorithms of both central processing units.

Figure 38:
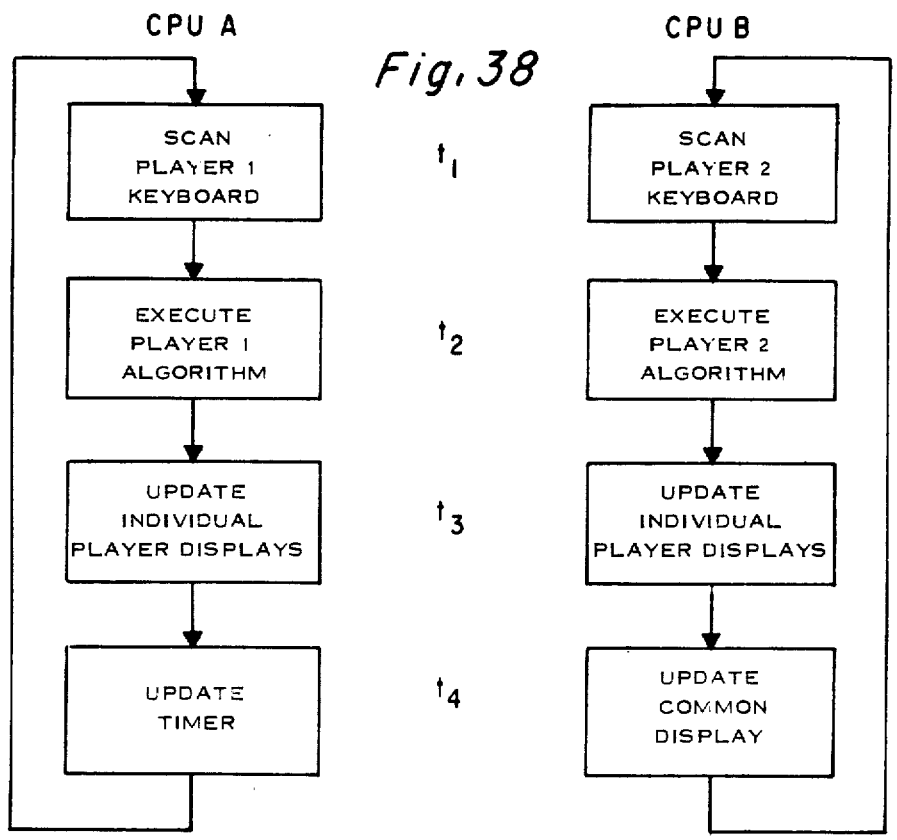
FIG. 38 is a block diagram of software that is executed in the two central processing units for the configuration shown in FIG. 36.

FIG. 38 illustrates the two game algorithms. The algorithms for CPU A includes a set of instructions to scan the player 1 keyboard and thus input data from the player 1 keyboard. While this embodiment illustrates the player 1 input as a keyboard, it should be obvious to one skilled in the art that other forms of inputs beside a keyboard may be used. The inputs from the player 1 keyboard are then placed in memory for the execution of the algorithm whch is the next block in sequence. As a result of the execution of this algorithm, the output data is updated. A third block provides for the updating of the displays with this algorithm output. In this particular embodiment, only the player 1 display is updated by the execution of the algorithm in the CPU A. Finally, a timer is updated. The timer is optional and provided to signal the exploration of time for a player or to shut down the game apparatus when not in use. The algorithm for CPU B includes a scan of the player to input keyboard. Next, the data that is input is placed into memory for the execution of the player 2 algorithm. The output of this algorithm is then provided to the individual player display as in the CPU A configuration. In addition, CPU B is to provide data provided by CPU A and CPU B to the common game display. This is accomplished by taking data from the CPU A portion of RAM and data from the CPU B portion of RAM and outputting that data to the R register as shown in FIG. 3A block 77 onto the signal lines 4 as shown in FIG. 36 to the common display 803. As illustrated in FIG. 38, the execution of the CPU A algorithm and the CPU B algorithm are continuous and simultaneous. While both central processing units may use the same algorithms contained in the ROM 6 in FIG. 3B, these two central processing units are independent in that they are storing data in their individual partitioned locations in the RAM 81 as shown in FIG. 3A. The time division for the execution of these algorithms is shown in FIG. 38 as time slots, T1 through T4.

Figure 37:
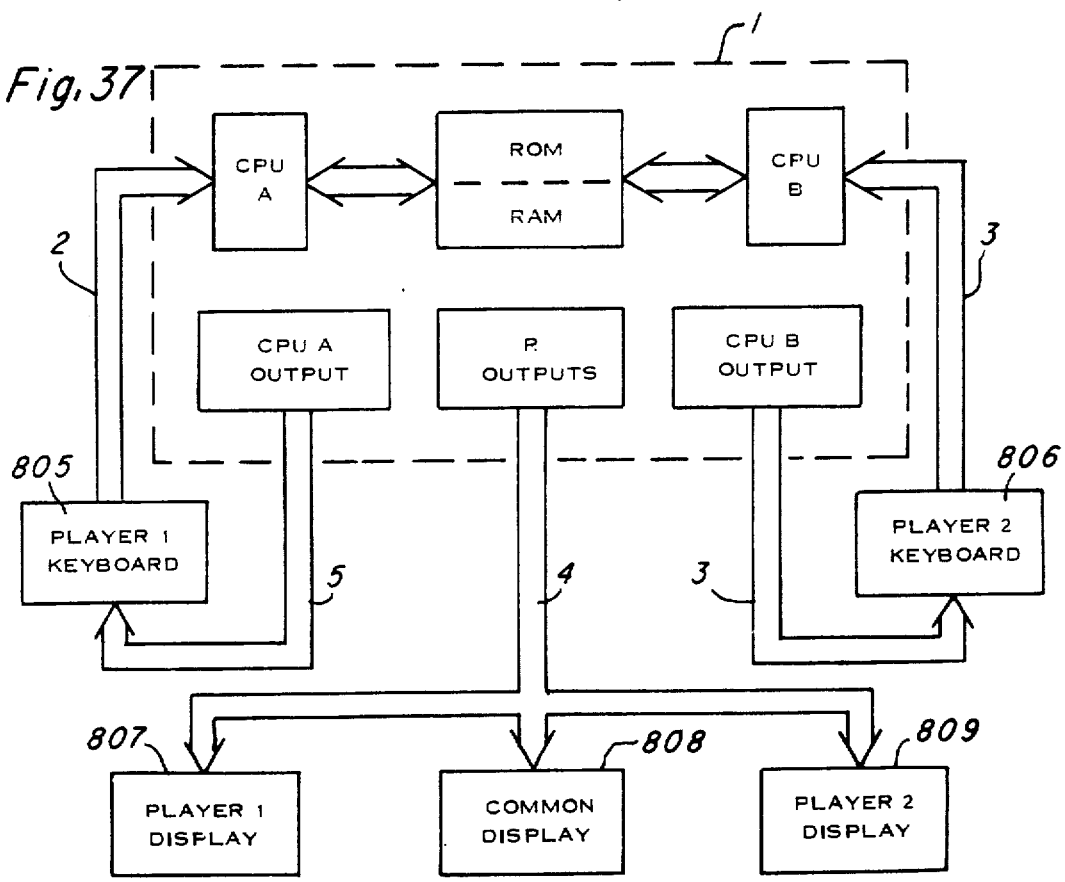
FIG. 37 is a block diagram of the two player game apparatus illustrating a two player display and common game display coupled to a common CPU output.

FIG. 37 illustrates another configuration of the two player game apparatus. Like the configuration in FIG. 36, the configuration of FIG. 37 includes a player 1 keyboard 805 connected to CPU A; a player 2 keyboard 806 connected to CPU B; and 3 games display, 807, 808 and 809. The difference in the FIG. 37 configuration is that all three displays are output from the register outputs over the signal lines 4. The output for the individual CPUs are used only to update what displays exist on the player keyboards. This configuration is appropriate when the individual player displays are fairly simple, such as a small number of discrete LED lights together with a fairly simple game display.

Figure 39:
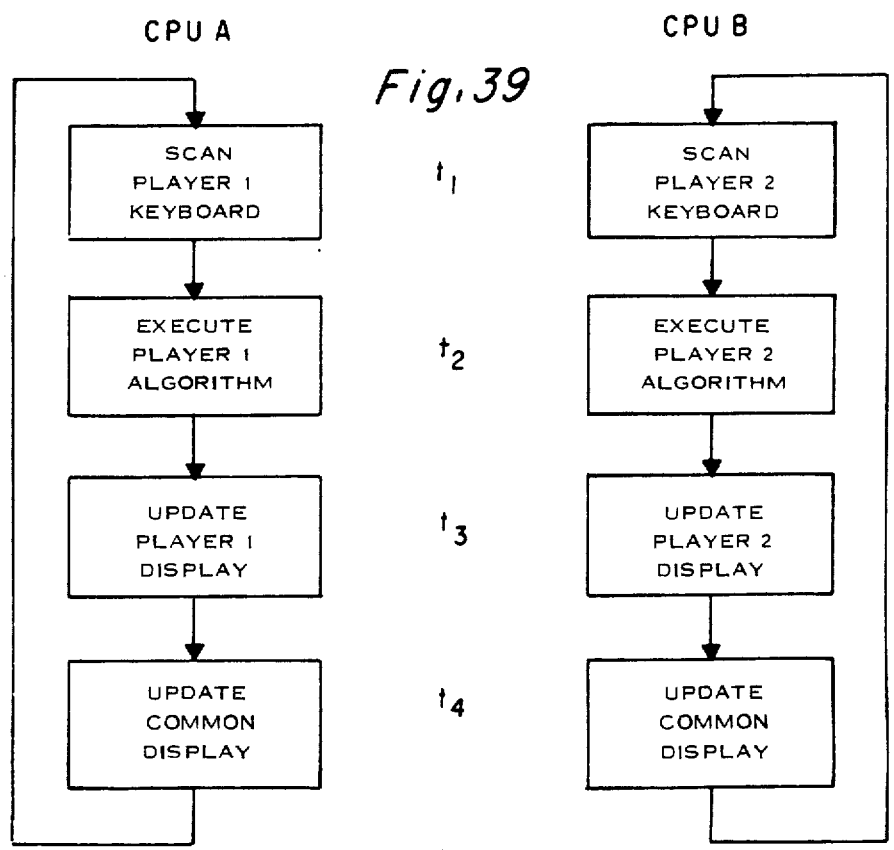
FIG. 39 is a block diagram of the software executed in the central processing unit for the configuration shown in FIG. 37.

The software for the configuration in FIG. 37 is shown in block diagram form in FIG. 39. Note that FIG. 39 is similar to FIG. 38. For CPU A the first block describes software that is used to scan the player 1 keyboard for input data. This data is placed in the RAM for execution of the player 1 algorithm as specified in the second block. The third block describes the software that is used to take the algorithm output data from the RAM and display that data on the player 1 display. Likewise, the last block takes data from the RAM and displays the data on the common display through the register outputs as previously discussed. Likewise, for CPU B the first block consists of reading the player inputs; the second block consists of the execution of the player algorithm using input data stored in the RAM and outputting data from the algorithm to the RAM; updating the player 2 display from the output data contained in the RAM and updating the common display. Like the software in FIG. 38, the software in FIG. 39 is executed simultaneously and independently as shown by the timing nomenclature T1 through T4.

It should be obvious to one skilled in the art that the configurations for the player outputs may be modified using the capability of the electronic digital processor system 1 in FIG. 37, that is, an individual CPU output may fed 1, 2, 3 or more displays, depending upon the complexity involved. Of course, the same is true for the register output. In addition the unique feature of this apparatus provides for the simultaneous and independent execution of game algorithms. However, the execution of the game algorithms may be made nonsimultaneous and nonindependent by the appropriate program contrained within the read-only memory.

TABLE I

Table of Microinstructions

STO

ACC to MEM; applied to the write MUX 86, the four-bit output from the accumulator A 150 or 5 B 151 is applied by the write MUX 89 and line 87 where it is written into the current addressed word location in the RAM 81;

CKM

CKB to MEM; the four bits on CKB output lines are applied via write MUX 89 and lines 87 where it is written into the currently addressed word location in the RAM 81;

$\overline{\text{CKP}}$

CKB to +AU; the four bits on CKB output lines 108 are applied to the positive input 123 of the adder/comparators 125 by P-MUX 119.

$\overline{\text{YTP}}$

Y to +AU; the four bits on the line 83 of the register A 148 and B 149 are applied to the positive input 123 of the adder/comparator 125 via input 107 and P-MUX 119.

$\overline{\text{MTP}}$

MEM to +AU; the four bits at the memory output lines 109 are applied to the positive input 123 of the adder/comparator 125 by the P-MUX 119.

ATN
ACC to −AU; the contents of the accumulator A 150 or B 151 are applied via lines 114 and 112 to the negative input 124 of the adder/comparator 125.

$\overline{\text{NATN}}$
$\overline{\text{ACC}}$ to −AU; the complement of the accumulator A 150 or B 151 is applied via lines 114 and 113 to the negative input 124 of the adder/comparator 125.

MTN
MEM to −AU; the four bits of the then-current word and page address in the RAM 81 appearing on the memory output lines 110 are applied to the input of the adder 125 by the negative N-MUX 120.

15TN
15 (-1) to −AU; a constant 15 or hex F is applied to the negative input 124 of the adder/comparator 125; this is used in substraction by two's complement addition, or in compare operations.

CKN
CKB to −AU; the four bits on the CKB output lines 111 are applied to the negative input 124 of the adder/comparator 125 by the N-MUX 120.

NE
COMP to STATUS; the compare output $\overline{\text{COMP}}$ if the adder/comparator 125 is applied by line 128 or 129 to the status register A 127 or B 127.

C8
CARRY 8 to STATUS; the carry output from the MSB of the adder/comparator 125 is applied via line 128 or 129 to the status register B 126 or A 127.

CIN
Carry In to AU; the carry input CIN on the line is allow to be applied to the carry circuit of the LSB of the adder/comparator 125.

AUTA
AU to ACC; the output of the adder/comparator 125 on the four lines 130 is applied to the input of the accumulator register A 150 or B 151.

AUTY
AU to Y; the output of the adder/comparator 125 on the four lines 130 is applied to the input of the Y register A 148 or B 149.

STSL
Status to status latch 143 or 144 upon execution of the YNEA instruction. If the Y Register A 148 or B 149 is not equal to the accumulator A 150 or B 151, the status latch 143 or 144 is set to logic "1". If the result is equal, the status latch 143 or 144 is set to logic "0".

TABLE II

THE INSTRUCTION SET

CALL: 11XXXXXX
Conditional on status; if status line 75 is a logic "0", then the call instruction is not performed. If the status is "1", the machine goes into the call mode. The contents of the program counter A 19 or B 40 are stored in the subroutine register A 33 or B 54. The page address in the page address register A 21 or B 42 is stored in page subroutine register A 23 or B 44, respectively. The contents of the page buffer register A 35 or B 57 is then loaded into the page address register A 21 or B 42. The chapter address in chapter address register A 26 or B 47 is stored in the chapter subroutine register A 24 or B 45 and the chapter buffer register A 39 or B 61 provides the new chapter address. The contents of the page address buffer register A 35 or B 57 and the chapter buffer register A 39 or B 61 is obtained from the ROM six by a line 11. The field R2 to R8 of the instruction word is loaded into the program counter A 19 or B 40 from lines 20. All instructions executed while in the call mode perform normal functions, except for the call and branch instructions; execution of a call within a call mode is valid up to three calls; branch is executed within a call mode may be off the present ROM page or chapter.

BRANCH (BR): 10XXXXXX
Conditional on status; if status is a logic "0", then the branch instruction is not performed. If the status on line 75 is "1", then the field R2-R8 of the instruction word is loaded into the program counter A 19 or B 40 from line 20, and the contents of the page buffer register A 35 or B 57 become the new page address in the page address register A 21 or B 42. Likewise the address in the chapter buffer register A 39 or B 61 become the new chapter address in the chapter address register A 26 or B 47. Branch as well as call can be unconditional because of the nature of the status logic B 126 or A 127. Status is normally in logic "1" which is the proper condition for successfully performing a branch or a call. If the branch immediately preceeding the branch or call does not affect status, then the operation will be successful. The status is only valid for one instruction cycle. It is therefore invalid to perform multiple tests before a branch operation. Only that instruction that immediately preceeds the branch call instruction will determine whether branching calling is successful. Status always returns to a logic "1" after a branch instruction.

Return (RETN): 00001111
Changes the pointer of the subroutine latch A(1-3) 34 or B(1-3) 55. When executed in the call mode, the contents of subroutine register A 33 or B 54 are transferred into program counter A 19 or B 40. Simultaneously the contents of the page subroutine register A 23 or B 44 are transferred into the page address register A 21 or B 42. The contents of the chapter subroutine register A 24 or B 45 is transferred into the chapter address register A 26 or B 47. This operation will return the system to a proper point after the subroutine has been executed.

Load P Register (LDP): 0001XXXX
The ROM page buffer register A 35 or B 57 is loaded with 4 bits of the field of R5-R8 in the instruction word on lines 56 and 11. This is unconditional and neither carry nor compare go to status. R5 is LSB and R8 is MSB.

Transfer Page to Chapter Register (TPC): 00001011
The two lowest significant bits in page buffer register A 35 or B 57 are loaded via lines 36 or 58 into chapter buffer register A 39 or B 61.

Transfer ACC to Y Register (TAY): 00100000
Accumulator A 150 or B 151 is unconditionally transferred into the Y register A 148 or B 149. Accumulator contents are unaltered. Microinstructions generated are $\overline{\text{ATN}}$, AUTOY.

Transfer Y Register to Accumulator (TYA): 00100011
The Y register A 148 or B 149 is unconditionally transferred into the accumulator A 150 or B 151. Contents of the Y register A 148 or B 149 are not altered.
Microinstructions Generated: $\overline{\text{YTP}}$, AUTOA.

Clear Accumulator (CLA): 0111111
The contents of accumulator A 150 or B 151 are unconditionally set to "0". Microinstructions generated: AUTOA.

Transfer Accumulator to Memory (TAM): 00100111

The contents of accumulator A 150 or B 151 are stored in the RAM memory location address by the X register 99 and Y register A 148 or B 149. Accumulator A 150 or B 151 contents are unaffected. Microinstructions generated: STO.

Transfer Accumulator to Memory and increment Y(-TAMIYC): 00100101

The contents of accumulator A 150 or B 151 are stored in the RAM memory location addressed by the X register A 99 and Y register 148 or B 149. After completion of the store operation, the Y register A 148 or B 149 is incremented by "1". If the initial Y=15, status is set to "1". Unconditional. Microinstructions generated: STO, $\overline{\text{YTP}}$, $\overline{\text{CIN}}$, C8, AUTOY.

Transfer Accumulator to Memory, Decrement Y (TAMDYN): 00100100

The contents of accumulator A 150 or B 151 are transferred to the currently addressed location in RAM 81, and the Y register A 148 or B 149 is decremented. If the initial Y=0, the status is set to "1". Microinstructions generated: STO, $\overline{\text{YTP}}$, $\overline{\text{15TN}}$, AUTOY, C8.

Transfer Accumulator to Memory and Clear Accumulator (TAMZA): 00100110

The contents of accumulator A 150 or B 151 are stored in the RAM memory location addressed by the X register 99 and Y register A 148 or B 149. The accumulator A 150 or B 151 is then reset to "0". Microinstructions generated: STO, AUTOA.

Transfer Memory to Y Register (TMY): 00100010

The contents of RAM memory location currently addressed by the X register 99 and Y register A 148 or B 149 are unconditionally transferred into the Y register A 148 or B 149. Memory data in the RAM is unaltered. Microinstructions generated: $\overline{\text{MTP}}$, AUTOY.

Transfer Memory to Accumulator (TMA): 00100001

The four bit contents of the RAM memory location currently addressed by X register 99 and Y register A 148 or B 149 are unconditionally transferred into the accumulator A 150 or B 151. Memory data in the RAM A1 is unaltered. Unconditional, and carry and compare to do not go to status. Microinstructions generated: $\overline{\text{MTP}}$, AUTOA.

Exchange Memory and Accumulator (XMA): 0000011

The contents of RAM memory location addressed by the X register 99 and Y register A 148 or B 149 are exchanged with accumulator A 150 or B 151. That is, the accumulator is stored into memory and memory is stored into the accumulator. Microinstructions generated: $\overline{\text{MTP}}$, STO, AUTOA.

ADD Memory and Accumulator (AMAAC): 0000110

The contents of the accumulator A 150 or B 151 are added to the contents of the RAM 81 location address by X register 99 and Y register A 148 or B 149 with the resulting sum into the accumulator A 150 or B 151. Resulting carrying information is input into status logic B 126 or A 127. A sum that is greater than 15 will set clear accumulator. The contents of memory location is the RAM 81 are unaltered. Microinstructions generated: $\overline{\text{ATN}}$, $\overline{\text{MTP}}$, AUTOA, C8.

Subtract Accumulator from Memory (SAMAN): 00111100

The contents of accumulator A 150 or B 151 are substracted from the contents of RAM memory location addressed by the X register 99 or Y register A 148 or B 149 using 2's complement addition with the difference stored in the accumulator A 150 or B 151. To do this, the memory is added to the complement of the accumulator plus 1 (or CIN) and the sum is stored in the accumulator 150 or 151. Result and carry information is input into status 126 or 127. Status will be set to logic "1" if the accumulator is less than 1 or equal to the memory. Microinstructions generated: $\overline{\text{MTP}}$, $\overline{\text{NATN}}$, $\overline{\text{CIN}}$, C8, AUTOA.

Increment Memory and Load into Accumulator (IMAC): 00111110

The contents of RAM memory 81 location address by X register 99 and Y register A 148 or B 149 is incremented by 1 and stored into accumulator A 150 or B 151. The original contents of the RAM 81 are unaltered. Resulting carry information is input via line 128 or 129 into status logic B 126 or A 127. Status will be set to a logic "1" if the sum is greater than 15. Microinstructions generated: $\overline{\text{MTP}}$, $\overline{\text{CIN}}$, C8, AUTA.

Decrement Memory and Load into Accumulator (DMAN): 00000111

The contents of RAM memory 81 location currently addressed by X register 99 and Y register A 148 or B 149 are decremented by 1 and loaded into accumulator A 150 or B 151. Memory contents are unaltered. Resulting carry information is input into status logic B 126 or A 127. If memory is greater than or equal to 1, status will be set to logic "1". Microinstructions generated: $\overline{\text{MTP}}$, 15TN. C8, Increment Accumulator (IAC): 01110000

The contents of the accumulator A 150 or B 151 is incremented by 1. If the previous contents was 15, then a carry is generated. Status 126 or 127 is set to logic "1". Microinstructions generated CKP, ATN, CIN, C8, Decrement Accumulator (DAN): 01110001

The accumulator A 150 or B 151 is decremented by "−1". If the previous contents of the accumulator was 0, the status logics B 126 and A 127 is set to "1". Microinstructions generated CKP, ATN, CIN, C8, Accumulator Plus Constant to Accumulator (AXAAC): 0111XXXX The above instruction is actually a set of 13 instructions which load a specific constant into the accumulator A 150 or B 151. The results are left in the accumulator A 150 or B 151. If there is a carry, a logic "1" is sent to status logic B 126 or A 127. These instructions include A2ACC, A3ACC, A4ACC, . . . A14ACC with the OP code changing from 01110010 to 01111110, respectively. The actual contents of the OP code is added to the accumulator from the R5 to the R8 field of the instruction words on line 71 via line 91. If a carry is generated, the status logic B 126 or A 127 is set to a logic "1". Microinstructions generated: $\overline{\text{CKP}}$, $\overline{\text{ATN}}$, CA, Increment Y Register (IYC): 00000101

The contents of the Y register A 148 or B 149 are incremented by 1. Resulting carry information is input into the status logic B 126 or A 127. A sum greater than 15 will set status to a logic "1". Microinstructions generated: $\overline{\text{YTP}}$, $\overline{\text{CIN}}$, C8, AUTOY.

Decrement Y Register (DYN): 00001000

The Y register A 148 or B 149 is decremented by 1. If there is no need to borrow, then the status logics B 126 and A 127 is set to "1".

Complement Accumulator Increment (CPAIZ): 01111101

The contents of accumulator B 151 is complemented and incremented by 1. If the contents is 0, then the status logics B 126 and A 127 is set to "1".

Accumulator Compare (ALEM): 00000001

If the accumulator A 150 or B 151 is less than or equal to memory, the status logics B 126 and A 127 is set to "1".

Memory Comparison to Accumulator (MNEA): 0000000

If the memory location is not equal to the accumulator A 150 or B 151, then the status logics B 126 and A 127 is set to a "1".

Memory not Equal to Zero (MNEZ): 00111111

If the memory location specified is not equal to zero, the status logics B 126 or A 127 is set to a "1".

Y Register Not Equal to Accumulator (YNEA): 00000010

If the Y register A 148 or B 149 is not equal to the accumulator A 150 or B 151, then the status circuitry 126 and 127 is set to a "1".

Y Register Not Equal to Constant (YNEC): 0101XXXX

If the Y register A 148 or B 149 is not equal to the specified constant, the status logic B 126 or A 127 is set to "1".

Test Memory Bit (TSBIT): 00110000

A memory bit is tested and if equal to 1, the status logic B 126 or A 127 is set to "1". The memory bit specified is unconditionally set to a "1".

Reset Memory Bit (RBIT): 00111000

A specified memory bit is reset.

Test Memory Bit (TBIT): 00111000

A specified memory bit is tested. If equal to 1, the status logic B 126 or A 127 is set to "1".

Transfer Constant to Y Register (TCY): 0100XXXX

A specified constant is transferred into Y register A 148 or B 149.

Transfer Constant to Memory and Increment Y A 148 or B 149 (PCMIY): 0110XXXX The specified constant is transferred to memory and the Y register A 148 or B 149 is increment by "1".

Test K Inputs (KNEZ): 00001110

If the K inputs from CPU B keyboard inputs 155 or CPU A keyboard inputs 104 are not equal to zero, the status logic B 126 or A 127 is set to a "1".

Transfer K Inputs to Accumulator (TKA): 00001000

The K inputs from CPU B keyboard inputs 104 or 155 are transferred to accumulator A 150 or B 151.

Set R Output (SETR): 00001101

The R-register 77 specified by Y register A 148 or B 149 is set.

Reset R Output (RSTR): 00001100

The R register 77 specified by Y register A 148 or B 149 is reset.

Transfer data from Accumulator and Status Latch to O Outputs (TDO): 00001010

The contents of accumulator A 150 and B 151 and the contents of status latch 144 or 143 is transferred to the output registers A 162 or B 159.

Toggle I/O Port of CPU B (IOC): 00001001

The CPU B keyboard inputs 155 is toggled from input to output.

Load X with File Address (LDX): 00101000

The X register 99 is loaded with the file address.

Complement the MSB of X (COMX): 00001001

The most significant bit of the X register 99 is complemented.

What is claimed is:

1. A game apparatus comprising:
   input means for inputting of data;
   memory means for storing of the data;
   processing means for processing of data and having first and second set of terminals with the first set of terminals being connected to the input means and memory means;
   display means for displaying of the processed data, the display means being connected to the second set of terminals, and the processor means includes:
   a control and timing means for providing two sets of program sequences that define operation of the game apparatus;
   coupling means for receiving data from the memory means via the first set of terminals and includes an arithmetic means for performing operations in accordance with instructions of the two sets of program sequences on the received data;
   first output storage means for receiving data from the memory means through the arithmetic means for passing the data via a first member of the second set of terminals to the display means during the execution of a first set of program sequences of the two sets of program sequences;
   a second output storage means for receiving data from the input means through the arithmetic means and for passing the data to the second member of the second set of terminals during the execution of a second set of program sequences of the two sets of program sequences;
   a first register means for storing data from the memory means via the arithmetic means during the execution of the first set of program sequences and for addressing the memory means with the stored data during the execution of the second set of program sequences; and
   a second register means for storing data from the memory means via the arithmetic means during the execution of the second set of program sequences and for addressing the memory means with the stored data during the execution of the first set of program sequences.

2. The game apparatus according to claim 1 wherein the processor means is monolithically integrated on a single semiconductor chip.

3. The game apparatus according to claim 2, wherein the control and timing means includes a read-only memory containing a game algorithm.

4. The game apparatus according to claim 3, wherein the memory means also includes a random access memory for the storage of game inputs, game data and game outputs.

* * * * *